US006064994A

United States Patent [19]

Kubatzki et al.

[11] Patent Number: 6,064,994

[45] Date of Patent: May 16, 2000

[54] METHOD AND ARRANGEMENT FOR DATA PROCESSING IN A MAIL-SHIPPING SYSTEM WITH A POSTAGE METER MACHINE

[75] Inventors: Ralf Kubatzki; Wolfgang Thiel, both of Berlin, Germany

[73] Assignee: Francotyp-Postalia A.G. & Co., Birkenwerder, Germany

[21] Appl. No.: 08/850,788

[22] Filed: May 2, 1997

[30] Foreign Application Priority Data

May 2, 1996 [DE] Germany ........................ 196 17 473

[51] Int. Cl.[7] ........................ G06F 17/00

[52] U.S. Cl. ........................ 705/410; 364/478.15; 235/375

[58] Field of Search ........................ 705/410, 408, 705/409; 364/478.01, 478.08, 478.1, 478.11, 478.12, 478.13, 478.14, 478.15; 235/375

[56] References Cited

U.S. PATENT DOCUMENTS

| | | | |
|---|---|---|---|
| 4,122,532 | 10/1978 | Dlugos et al. | 705/409 |
| 4,430,716 | 2/1984 | Dlugos et al. | 705/409 |
| 4,511,793 | 4/1985 | Racanelli | 705/404 |
| 4,743,747 | 5/1988 | Fougere et al. | 235/494 |
| 4,800,505 | 1/1989 | Axelrod et al. | 364/478.09 |
| 4,800,506 | 1/1989 | Axelrod et al. | 364/478.15 |
| 4,831,554 | 5/1989 | Storace et al. | 705/403 |
| 4,839,813 | 6/1989 | Hills et al. | 705/404 |
| 5,111,030 | 5/1992 | Brasington et al. | 235/375 |
| 5,257,197 | 10/1993 | Günther et al. | 705/406 |
| 5,325,303 | 6/1994 | Walz et al. | 705/404 |
| 5,362,947 | 11/1994 | Dietrich et al. | 235/375 |
| 5,490,077 | 2/1996 | Freytag | 705/405 |
| 5,493,106 | 2/1996 | Hunter | 235/375 |
| 5,602,743 | 2/1997 | Freytag | 705/408 |
| 5,606,508 | 2/1997 | Thiel | 705/410 |

FOREIGN PATENT DOCUMENTS

| | | |
|---|---|---|
| 0 493 948 | 7/1992 | European Pat. Off. . |
| 41 07 030 | 9/1992 | Germany . |
| 44 19 430 | 12/1995 | Germany . |
| 44 22 263 | 1/1996 | Germany . |
| 2 215 670 | 9/1989 | United Kingdom . |

*Primary Examiner*—Emanuel Todd Voeltz
*Assistant Examiner*—Thomas A. Dixon
*Attorney, Agent, or Firm*—Hill & Simpson

[57] ABSTRACT

In an arrangement and method for data processing in a mail shipping system, a document is supplied to the mail shipping system having information printed thereon identifying a recipient of the document. The printed information is scanned at a postage meter machine to identify the recipient. The postage meter machine is in communication with at least one personal computer. In the personal computer, the contents of various documents to be mailed using the mail shipping system are stored in respective data files, and can be searched according to the respective recipient and the current date. The mail contents are stored in the personal computer allocated to instructional data; such as shipping information identifying a carrier and/or cost center information for use in accounting purposes for charging the fee for shipping the document. The postage meter machine, by searching the memories in the personal computer, obtains the instructional data, and the instructional data are automatically entered into the postage meter machine, and are then used for producing the franking imprint and/or conducting an accounting routine. The amount of data which must be permanently stored in the postage meter machine is therefore significantly reduced.

106 Claims, 20 Drawing Sheets

POSTAL REGISTER VALUES Ri:

| priv.Carrier-Number m-▸ | 1 | 2 | 3 | 4 | ... | 7 | ... | l | $\sum_{m=1}^{l} R_{i,m}$ |
|---|---|---|---|---|---|---|---|---|---|
| Register $R_1$ | 200 | - | 78 | - | ... | 150 | ... | 34 | |
| $R_2$ | 100 | 50 | 43 | - | ... | 240 | ... | 57 | |
| ................................ | | | | | | | | | |
| ↓ i ↓ | | | | | ... | | ... | | |
| $R_{80}$ | 500 | 80 | 40 | - | ... | 360 | ... | 200 | |
| $R_{81}$ | 300 | 160 | 22 | - | ... | 100 | ... | 140 | |
| ................................ | | | | | | | | | |
| $R_h$ | 700 | 320 | 28 | - | ... | 121 | ... | 10 | |

Legend:

Register R1 := remaining value (descending register)
Register R2 := accum.used amount(ascending register)
Register R3 := total reset amount(total reset. reg.)
Register R4 := no. of valid imprints (piece count Σ printing with value ≠ zero),
Register R8 := no. of all imprints (R4 + piece count Σ printing with value = zero),
Register Ri
for further Register with i = 1 to h priv.Carrier-No.1 := Deutsche Post AG, CIN = 100.000.000.000
priv.Carrier-No.2 := DPD, CIN = 200.000.000.000
priv.Carrier-No.3 := UPS, CIN = 300.000.000.000
priv.Carrier-No.m
for further Carrier with m = 1 to l KST-No. 1 := ALPHA_100,
KST-No. 2 := BETHA_200,
KST-No. n
for further Cost Center with n = 1 to k

Fig. 7c

USED POSTAGE p:

| priv.Carrier-Number m-► | 1 | 2 | 3 | 4 | ... | 7 | ... | 1 | $\sum_{m=1}^{1} p_{n,m}$ |
|---|---|---|---|---|---|---|---|---|---|
| KST-No.1 | 200 | - | 78 | - | ... | 150 | ... | 34 | |
| KST-No.2 | 100 | 50 | 43 | - | ... | 240 | ... | 57 | |
| ↓ n ↓ | ........ | ........ | ........ | ........ | ... | ........ | ... | ........ | |
| KST-No.7 | 500 | 80 | 40 | - | ... | 360 | ... | - | |
| KST-No.8 | 300 | 160 | 22 | - | ... | 100 | ... | - | |
| | ........ | ........ | ........ | ........ | ........ | ........ | ........ | ........ | |
| KST-No.k | 700 | 320 | 28 | - | ... | 121 | ... | 10 | |
| $\sum_{n=1}^{k} p_{n,m}$ | | | | | ... | | ... | | $\sum\sum_{mn} p_{n,m}$ |

USED PIECE COUNT z:

| priv.Carrier-Number m-► | 1 | 2 | 3 | 4 | ... | 7 | ... | 1 | $\sum_{m=1}^{1} z_{n,m}$ |
|---|---|---|---|---|---|---|---|---|---|
| KST-Nr.1 | 1 | - | 2 | - | ... | 10 | ... | 2 | |
| KST-Nr.2 | 1 | 1 | 1 | - | ... | 16 | ... | 3 | |
| | ........ | ........ | ........ | ........ | ... | ........ | ... | ........ | |
| KST-Nr.7 | 1 | 1 | 1 | - | ... | 24 | ... | - | |
| KST-Nr.8 | 2 | 4 | 1 | - | ... | 5 | ... | - | |
| | ........ | ........ | ........ | ........ | ........ | ........ | ........ | ........ | |
| KST-Nr.k | 7 | 4 | 1 | - | ... | 7 | ... | 1 | |
| $\sum_{n=1}^{k} z_{n,m}$ | | | | | ... | | ... | | $\sum\sum_{mn} z_{n,m}$ |

Fig. 7d

METHOD AND ARRANGEMENT FOR DATA PROCESSING IN A MAIL-SHIPPING SYSTEM WITH A POSTAGE METER MACHINE

BACKGROUND OF THE INVENTION

1. Field of the Invention

The present invention is directed to a method for data processing in a mail-shipping system with a postage meter machine as well as to an arrangement for implementing the method.

2. Description of the Prior Art

In modern offices, producing documents such as letters ensues at the personal computer. The printed documents are manually placed in envelopes or are automatically stuffed in envelopes in a mail station with an envelope-stuffing system. Such mail stations also have postage meter machines available for use.

A postage meter machine is used for franking postal matter and can be equipped with a control unit, a memory arrangement, an input stage, a modem or other data reception means, an input/output control stage, a display and a printer. For example, a stationary print head prints the franking impression column-by-column with simultaneous conveying of the letter past (beneath) the print head. A printing width of approximately 1" is thereby achieved.

If the post meter machine contains a postage calculator, weight information can be entered via a connected scale. In European application 566 225, a method for data input into a postage meter machine disclosed for such a system that employs chip cards, a cellular communication network in order to enter fee schedule changes. Such chip cards, which contain a number of non-volatile memories or, separately accessible memory areas and a microprocessor, are successively plugged into a single write/read unit of the postage meter machine in order to serially transmit data representing different information into the postage meter machine. These data stored in the postage meter machine can then be accessed during the operation thereof. Such a postage meter machine constitutes a stand-alone postage meter machine and is not adapted for integration into a mail-processing system with a number of other devices.

If the scale contains a postage calculator, the postage values determined in the scale are communicated from the scale to the postage meter machine. German application (Serial No. P 44 47 404.0-53) discloses a method and an arrangement for data entry into a scale, whereby fee schedule table data of the carrier are communicated to the scale via the postage meter machine so that the postage values can be calculated according to a current fee schedule. The postage meter machine checks whether the fee schedule table data of the carrier stored in the scale are still valid and automatically decides whether a reloading or an updating is required. A switch to normal operation is only made after initialization when the fee schedule table data in the scale are current. The updating ensues after activation, preferably with a chip card, and is dependent on conditions such as, for example, when data of a clock/date module called at the beginning but modified due to the passage of time, are considered to be appropriate by the microprocessor for triggering a reloading requirement. As a result, a communication is conducted with a data control in which fee schedule table data, and possibly further data files, are transmitted to the postage meter machine from the data central as a result of the communicated request. The postage meter machine is equipped with a routine for display and automatic print data input. The modification is displayed as a clear text presentation of the print format. This, however, requires a relatively expensive user interface (keyboard and picture screen) at least in the postage meter machine.

All of the aforementioned, individual solutions for postage meter machines thus require an expensive, separate user interface, or a coupling to a personal computer in order to employ the user interface (keyboard and picture screen) thereof.

European Application 493 948 discloses a coupling to a personal computer in order to use this as an input means. The postage fees are stored in various registers that are allocated to various authorities, however, this publication does not describe whether and how these authorities are selected by the customer or how an allocation ensues. This specific solution for a postage meter machine stores the debiting data for various services. A disadvantage of this known system is the outlay arising due to the need for a separate interface between the postage meter machine and a work station used as the input means. A separate printer is connected to the separate interface in order to print out debiting (accounting) reports.

German OS 39 03 718 also discloses a coupling to a personal computer in order to print out department-related accounting data via a separate printer. A disadvantage is that a control unit must be connected as a separate device between the individual devices such as the scale, the postage meter machine and the personal computer. The employment of manually plugged chip cards in order to enter accounting reports into the personal computer, moreover, represents an impediment for automation of the production of accounting reports.

European Application 600 749 discloses a mail processing machine with a bar code user interface. Commands for controlling the mail processing machine are entered via a bar code reader pen (wand). This, however, requires a catalog having a list of bar code commands, and manual sampling thereof. A manual positioning of a reader pen and sampling for entering commands reduces the input dependability as well as an assumption of responsibility on the part of the user, i.e., one must assume that the user would not undertake any manipulation with fraudulent intent. As a guard against misuse, no commands that could be misused with fraudulent intent can be found in the list. An entry of unlisted commands effecting a falsification, i.e., a correspondingly generated bar code, however, cannot be prevented. Most steps have been taken to insure that the sequence of the bar code inputs can only ensue according to the sequence of pieces of mail supplied.

German OS 40 18 166 discloses that frankings and/or an address printing be undertaken with a franking module integrated in a personal computer. To that end, the franking module is arranged in a slot of a drive insert of a personal computer. Such a solution, however, limits the universal utilization of the personal computer as a result of the occupation of the slot of the drive insert and, moreover does not accommodate other postal matter conveyor means for other envelope formats and is therefore mainly suitable for standard mail in offices with low to moderate mail volume. A number of personal computers equipped in this way would have to be utilized in an office having a higher mail volume. The integration of the franking module in the personal computer, however, is more expensive than a solution in which a commercially available personal computer and a commercially available postage meter machine are coupled to one another via a data line.

A German OS 40 18 166 discloses that frankings and/or an address printing can be undertaken using a franking module integrated in a personal computer. For this purpose, the franking module is arranged at one of the disk or CD insertion slots in the drive unit of a personal computer. This approach, however, limits the universal utilization of the personal computer, since the drive slot is dedicated to the franking module, and does not allow adaption for use with a postal item conveyor or feeder for other envelope formats, and therefore this approach is primarily suitable for franking and/or addressing standardized mail in offices with low to moderate mail volume. A number of different personal computers equipped in this manner would have to be utilized in an office having a higher mail volume. Integration of such a franking module into a personal computer, however, is more expensive than the aforementioned approach of coupling a commercially available (unmodified) personal computer to a commercially available postage meter machine via a data line.

U.S. Pat. No. 4,800,506 discloses a mail processing system with a number of devices that operate in a PC-supported manner and already have connected postage meter machines available. The individual devices carry out functions for recompilation of the letters, namely in the sequence of the postal area codes of their addresses. The aforementioned functions includes opening letters, sensing specific locations, possibly reprinting the letter or comments, folding, envelope-stuffing, postage calculation and sorted deposit or, bundling. Some public mail carriers offer discounts for postal matter pre-sorted in this way. This method is complicated insofar as it may require another printout of the letter. Installation of a high-performance computer is required in the mail station, which must be operated by appropriately trained personnel.

German OS 38 08 178 discloses a mail processing system with a first computer that produces the documents on fan-fold paper and that is in communication with a second computer that controls devices in the mail station. The communication is achieved by markings printed on the document and, by a communication element. The envelope stuffing, addressing and franking of the mail can be indirectly controlled by a printed coding identifying the respective piece of mail. Parameter values that are employed for controlling the envelope stuffing, addressing and franking of the mail are allocated to these identification codings in a data bank. The data bank is connected to the second computer to which the respective identification coding of the piece of mail is communicated via a connected sensor means. The address printing in the mail station is emphasized in this document as an advantage in view of the easy, subsequent modification of, among other things, the addressing of stuffed envelopes, and thus avoiding a bill-like appearance of the envelopes that is associated with window envelopes.

Such window envelopes are allegedly not opened by some recipients because they may contain bills. Apart from the fact that it would be senseless not to open window envelopes because they may contain bills, since cost-increasing reminders would be delivered anyway to such companies or persons, window envelopes nonetheless are not favored by many mailers. This disfavor against printing an address when preparing the letter at a location which will be visible through an envelope window, and against employing window envelops per se, leads to the aforementioned equipping of the mail station with complicated technology. When settings must be undertaken in the mail station in order to utilize beneficial services of a different private carrier, however, even the aforementioned equipping of the mail station with complicated technology still proves inadequate because correspondingly more highly qualified employees are then required. The weight and the postage amount are identified before resending postal matter. In conjunction with the increasing proliferation of private carriers competing with one another, beneficial special fee schedules for transport services and service performances related thereto are also being increasingly offered. A reduction of the weight by reducing the number of inserts for the envelope often suffices for meeting the prerequisites for making use of such special fee schedules. A great deal of redundancy and design latitude in the informational offering exists in direct marketing. For example, the format, the number of lines, letter height, etc., could be optimized for cost reasons. The number of pages could also be reduced when preparing the letter. The employees in the mail station, however, are not in a position to undertake such entries or modifications in the data bank. The employees of the mail station would then have to instruct the other employees whose produce the letter contents, or these mail station employees would have to make such changes themselves. Such a procedure, however, would only lead to unnecessary delays in the mail processing.

SUMMARY OF THE INVENTION

An object of the present invention is to overcome the above-discussed disadvantages of the prior art and to provide a more flexible mail processing system with a postage meter machine that, without favoring or disfavoring any type of format of the postal matter, can be expanded to future services of various private mail carriers and also assures a reliable and largely automatic mail processing.

The occurrence of manual input errors into the postage meter machine of the mail station also should be reduced. A further object is thus to provide a mail processing method which upon production of a letter, supplies significant data for subsequent debiting of the postage fee in a postage meter machine before the printout of the letter.

The conducting data processing in a postage meter machine allows an automatic means for setting critical data to be employed as well as an automatic means for the debiting of postage fees ordered according to cost centers, so that it is unnecessary to undertake manual postage meter machine inputs.

Despite a multitude of mail carriers, an accounting should ensue surveyably and reduplicatably in the interest of the customer. An additional object is thus to enable the presentation of accounting statements according to cost centers, as well as according to public and private mail carriers on the basis of displays and print outs.

The invention avoids limitations in the financing and implementation of the mail processing insofar as possible. Window envelopes, standard envelopes, as well as other envelope shapes such as are preferred by private carriers, can be employed in order to implement an envelope stuffing in the office. Moreover, an addressing of the mailings is already implemented in the office. An optimization program is run on the personal computer which makes proposals to the user for low mail carrier costs. This provides the advantage that changes in the letter content, the number of pages of the letter, or the addressing of the letter can be undertaken and monitored directly by the employee responsible for producing the letter.

Only the franking ensues as before in the mail station with a postage meter machine, for which the possibility has now been created of generating arbitrary imprints in the way required by private carriers.

A letter produced at a personal computer has a format with a respective area for a specific, imprinted return address and another area for a recipient address. The information for an automatic data entry into the postage meter machine for franking or other purposes can then be derived from the return address and the recipient address. Inventively, at least the recipient address that is printed out together with the letter content and that is visible in the window of a window envelope is scanned in the office mail station responsible for shipping the letter. The clear text recognition ensues in the scanner itself (which may be an optical character reader (OCR)) or in the postage meter machine, which then electronically communicates the recipient address, thus converted into electronic data, to the personal computer via a communication means as search request data. The personal computer searches all data files (letter files) to which a letter content is allocated according to recipient address and electronically communicates the allocated cost center and carrier information to the postage meter machine via the communication means.

A mail carrier selected with the keyboard/display unit of the personal computer is stored as mail carrier information allocated to the letter recipient address in the letter file every time a letter is produced but is not printed out together with a contents of the letter. The allocated carrier information can thus be determined again later using the recipient address as a search request and can be electronically transmitted from the personal computer to the postage meter machine via the communication means.

Another, alternative solution proceeds from the capability of modern office printers of printing the letter recipient address as well as a return address on an envelope. Some mail carriers require that a bar code be printed in addition to the clear text address in order to achieve a machine-readability of the addresses in a simpler way.

The invention also allows scanning the addresses from the letter or envelope in the mail station, remote from the location of the personal computer used to prepare the letter, with a commercially obtainable scanner and automatically entering them into the postage meter machine. More than one scanner can be arranged in the mail delivery stream so that different formats can be scanned. After the clear text recognition such as using an OCR, or after bar code recognition, formation of a search request data ensues in the postage meter machine, the search request data being electronically communicated to the personal computer via the communication means. The allocated carrier information can thus be determined again later using the recipient address as a search request and can be electronically transmitted from the personal computer to the postage meter machine via the communication means. The invention also allows measures that, with little outlay, produce a correlation of the department-related accounting in the personal computer to the department-related accounting of postage fees according to cost centers in the postage meter machine.

It is typical in a modern office for a mail station to be provided which is remote from the locations within the office at which documents are produced respectively on personal computers. The overall office, however, may be divided into a number of departments, all of which use the same mail station to dispatch the documents produced in those departments. It is also common for a number of independent offices to share a common mail station in a building. For accounting purposes, particularly in the case of a number of independent users sharing a single mail station, it is necessary to identify the office, and sometimes the department within an office, which produced a document in order to debit an account for that document-producing entity by the cost of shipping the document. For this purpose, each document-producing entity, such as an independent office, or a department within an office, can be identified with a cost center number which can be scanned at the mail station in order to automatically implement an office-specific or department-specific accounting in the postage meter machine.

A return address selected by the user interface of the personal computer is automatically allocated to a corresponding cost center or department every time a letter is produced. Before being stored, the letter file is supplemented by this cost center information.

In general, the inventive method for data processing in a mail shipping system includes steps for printing out a letter together with an address field, for sensing the address field in a mail station and for processing the data as well as for franking with a postage meter machine. A more detailed description of these steps is as follows.

A piece of mail is detected in the transport path (delivery path) to the postage meter machine, and the recipient address in the address field each supplied piece of mail, is sensed.

Search request data are formed and communicated to the personal computer which was used and a search is conducted in the memories of that personal computer with interrogations of every datafile allocated to a letter. As a result, information with respect to postal matter shipping, carrier and/or cost center is automatically entered into the postage meter machine, and at least one set of non-volatilely stored setting data is called (retrieved in the postage meter machine corresponding to the aforementioned information supplied from the personal computer. The retrieved data are used for form an automatic print data input into printer controller of the postage meter machine.

If necessary, a routine can be executed in the postage meter machine for automatic modification of the non-volatilely stored setting data, for automatic print data input and checking, as well as for display, for automatic or manual entry of data for changing the existing setting data.

The aforementioned setting data are processed in a franking mode in the postage meter machine to formulate a format for a franking imprint, and an accounting related to the carrier and/or cost center is made in the postage meter machine before the franking.

The routine for the automatic modification of the non-volatile stored setting data includes a formation of request data for the reloading of current carrier data and/or carrier fee schedules. After the communication of the cost center and/or carrier information from the personal computer to the postage meter machine, the latter automatically checks whether the selected carrier is available in its memories, or whether the fee schedule table data of the selected carrier are current.

If these checks show that additional information or updated information are needed to implement the request, a communication to the remote data central is undertaken. Specific request data are thereby sent to the data central and the required data are received from the data central and are loaded into the memories of the postage meter machine, before processing of data in the franking mode takes place. In this communication with a remote data central, on the basis of the communicated, aforementioned request data, carrier-specific datafiles containing at least carrier-identifying image datafiles and current fee schedule datafiles are transmitted from the data central to the postage meter machine.

The inventive method thus affords the capability of loading (at least) fee schedule tables of the respective carrier which are valid for the location of the requesting postage meter machine (i.e., the location of the mail shipping system of which the postage meter machine is a part) as needed as well as allowing them to be requested for a specified mail carrier (USPS, UPS, DEUTCHE POST AG or others).

As noted above, the various personal computers in one office belong to a common cost center. When non-volatilely stored setting data for entering the print data into the postage matter machine are called for shipping documents prepared by any of those personal computers in the same office, then the same cost center number is called, and consequently the same advertizing slogan is also printed out during franking. The letter recipient addresses and the letter files, created at different points in time, however, are different. Selected, different carriers can then be allocated to these letter, stored as a carrier identification number (CIN). The interrogation of the letter files by the postage meter machine on the basis of the sensed address enables the changes of a carrier selected for the shipping (mailing) of the postal matter to be automatically taken into consideration. A variable, carrier-specific logo can therefore be printed out during franking.

As also noted above, the personal computers which respectively prepare documents supplied to the mail station may not belong to a common cost center but always select the same carrier. When non-volatilely stored setting data are retrieved for forming the print data format in the postage meter machine, then the same carrier number or CIN is always called. The interrogation of the letter files created at different points in time by the postage meter machine on the basis of the scanned address enables the different cost centers to be automatically taken into account. The routine for automatic modification of non-volatilely stored setting data can contain a sub-routine for allocating a cost center number to a slogan (cliché) number for the automatic entry of the slogan number given entry of the allocated cost center number. It is thus possible that, using the slogan number allocated in this way, a variable, specific advertizing slogan for each cost center (department or small company) is automatically set in the print format and is printed out during franking.

On the basis of the address scanned by the postage meter machine, the aforementioned versions can be combined to enable both the different cost center and carrier selection to be automatically taken into consideration.

The inventive method is not limited to a cost center and carrier selection. The postage meter machine can also interrogate other selective print types (for example, air mail, return receipt, etc.) or other settings.

The inventive method is based on a relationship between the address of the letter printed out by a personal computer and allocated information in the letter files of the personal computer, whereby, after scanning of the address at the postage meter machine, formation and communication of search request data to the personal computer and a search in the memories of the personal computer ensue, and additional information for the aforementioned address required for the automatic data entry is electronically transmitted to the postage meter machine, for example via a data line. The allocation of the information to the address is fetchably stored in the personal computer, for example ordered according to time data, in order to enable an access to the most current (i.e., most recently prepared) datafile with the same address. The information in the personal computer is allocated to the addresses that are printed out with the letter contents. Thus, after a first preparatory step for creating a letter file within the framework of a letter production program in the personal computer, further preparatory steps sequence, and an allocation of the printed-out letter and the allocation to the address of the aforementioned, transmittable, additional information to the address is fetchably stored in the personal computer according to time data.

If the addresses are scanned through a window envelope with a scanner at the mail station, the allocated information with respect to the cost center and the carrier that are stored in the personal computer in the office can be electronically called by the scanning device in the mail station via the aforementioned communication line. The aforementioned, allocated information stored in the various personal computers serve for the automatic setting of the postage meter machine, which makes manual operation thereof virtually superfluous.

Of course, a carrier which is preset in this way can nonetheless be manually changed at the mail station when, for example, the carrier was not identified by the personal computer or if some other carrier is more beneficial. If shipping of a number of letters produced on the same day to the same postal area code is desired, it is generally assumed that it is more economic not to use a number of different private carriers, but instead to use only one carrier among the number of available carriers.

The communication of the required setting information to the remote postage meter machine is initiated via a data (communication) line on demand by the postage meter machine, whereupon the postage meter machine is supplied with data from the aforementioned personal computer.

The operations performed in the personal computer in the office include text production and processing, entry of the address and allocation of a cost center number for a cost-center-specific accounting, menu-prompted selection of the shipping types, shipping forms or further information about the most beneficial carrier, formation of carrier information, and the allocation of all information to the aforementioned address, as well as storage of the allocation. As needed or periodically, accounting reports that are correlated with the cost-center-specific accounting in the postage meter machine are printed out via an ordinary, connected printer.

In the scanning of the return address, the corresponding cost center or department can be identified in a manner analogous to that for the carrier information. The personal computers in the office are interrogated by the postage meter machine in the mail center for a cost station number that is respectively allocated to the return address. Such a method for data processing in a mail shipping system includes known steps for printing out a document together with an address field and a cost center-identifying mark, scanning the mark in a mail station, and processing the data as well as franking with a postage meter machine. In accordance with the invention, these general steps are implemented as follows.

The return address and/or the mark for the return address are scanned in the detection of pieces of mail supplied in the transport path to the print head of the postage meter machine. The personal computer on which a scanned piece of mail was produced is interrogated by the postage meter machine via a communication linked to obtain the stored cost center number allocated to the scanned return address, for accounting. As a result, the cost center number is automatically entered into the postage meter machine, and retrieval of at least one set of non-volatilely stored setting data ensues for an automatic entry of print data into the postage meter machine.

If necessary a processing routine can be executed in the postage meter machine, including at least one routine for automatic print data entry and checking, as well as for display thereof, for automatic or manual entry of data for changing the existing setting data. This processing routine may contain a sub-routine for allocating a cost center number to an imprint number, which identified a user-specific slogan or cliché for automatic entry of the imprint number upon entry of the cost center number.

The setting data in a franking mode in the postage meter machine to formulate a format for a franking imprint, and a debiting related to cost center and/or carrier is made in the postage meter machine before the franking.

In another version of the inventive method, a scanning of the return address as well as of the letter recipient address and/or of the corresponding mark take place in the detection of supplied pieces of mail in the transport path to the print head of the postage meter machine. Subsequently, the postage meter machine again asks a personal computer for allocated, stored information. The determination of the personal computer responsible for the storing of the letter file made on the basis of the return address is particularly advantageous in this version. The search process for the relevant letter file is thereby shortened significantly for a number of personal computers in the office.

The inventive arrangement employing a postage meter machine in a mail shipping system operating as described above achieves the advantages of a largely automatic processing of the letter, making use of different fee schedule structures of various carriers, while still allowing flexibility with respect to the debiting vis-a-vis different carriers. Given the disappearance of the governmental monopoly for shipping letters, one can expect on an increase in mail delivery by regional, national or international private carriers. It is already known from package shipping systems to prepare accounting statements for various carriers. The accounting statements for various carriers given utilization of package shipping systems generally ensues with a debit note (invoice) method, however, such an accounting procedure does not make any automatic processing, postage calculation and security monitoring available to the customer as is prescribed, for example, by postal authorities in the case of a postage meter machine into which a credit was loaded. An accounting vis-a-vis various private carriers is inventively established in the inventive postage meter machine in a postage fee module on the basis of a prepaid or credited amount. The inventive postage meter machine is employed in a mail shipping system as follows.

A letter is produced with a text processing system on a personal computer. This corresponds to the standard case as of now.

The most suitable carrier for sending this letter is selected. For example, this can be a regional courier service for local, rapid delivery but can also be a national (governmental) postal agency for standard mail. The carrier is stored in the letter file in the personal computer, allocated to the letter recipient address. This carrier information can be taken from a data file in which the user, menu-prompted, selects from an offering of carriers; the carrier can also be directly entered via the keyboard.

The letter together with address field is printed out and, from a subsequent interrogation of the letter file, the information with respect to carrier and/or cost center is automatically entered into the postage meter machine.

The letter is stuffed manually or by machine into a window envelope. Alternatively to the printout of the letter recipient address in the letterhead, a correspondingly produced address label or sticker can be adhered to the envelope or postal matter.

The address field together with at least the letter recipient address is scanned with a suitable scanner means. This scanner is either separate from, or (preferably) is arranged in the postage meter machine, for example in an automatic delivery means in the mail transport path.

The scanned pixel image is transmitted into a processing means. The letter recipient address is interpreted therein to form search request data. This processing means is integrated in the postage meter machine, or in a scale or in some other, peripheral device, for example in an automatic delivery means.

Search request data are formed and communicated to the personal computer on which a scanned letter (or label) was prepared.

A search is made in the memories of that personal computer, whereby, as a result, information about carrier and/or cost center is automatically entered into the postage meter machine.

Non-volatilely stored setting data are retrieved for forming a print data input into the postage meter machine.

The carrier information is transmitted to a postage calculator.

The postage calculator contains the stored postage table appertaining to the selected carrier. If a carrier or service was newly selected and the postage table for the selected service or carrier is not available, or does not belong to the permanently stored postage tables due to limited memory capacity, the postage meter machine automatically dials a data central operated, for example, by the postage meter machine manufacturer and the required postage table is loaded into the memories of the postage meter machine. Each postage table can have a date allocated to it identifying when it takes effect and/or the table's minimum validity duration. The postage meter machine contains a real-time clock to whose date the minimum validity duration of the corresponding postage table is compared in order, if necessary to initiate a request for a new table via the data central. A corresponding identifier can be printed in the franking field for identifying the postage table employed.

The specific postage for a particular item is calculated in the postage calculator on the basis of the data already present such as format and type of mailing as well as on the basis of the weight of the item. Alternatively, it is possible at any time to modify the postage value with a manual input. To that end, a specific postage table has to be visually displayed for the user via a display and the user subsequently selects the postage amount, as disclosed in German OS 42 17 478, however, no strict linking to the fee schedule and, thus, no accounting dependability, would thus be achieved.

The charge to the user of the specific postage amount is debited on the postage account of the carrier that is likewise automatically set. This is possible both in a debit note version as well as in a pre-paid version. In the debit note version, a debit account is read, and the stored value therein is incremented by the postage value to be franked. In the pre-paid version, a pre-paid amount is maintained in the credit account of the postage meter machine as an electronic credit. Another accounting version is to conduct the accounting using a specific chip card for the selected carrier (similar to a telephone card or credit card) brought into contact with the postage meter machine in a chip card reader. Because the selection of the carrier has already been undertaken, however, a universal carrier card can be employed instead of a carrier-specific credit card, with a memory area for each carrier in which that carrier's accounting data are stored, being provided in the card.

The postage meter machine may contain, or may be in communication with, a modem, so that an electronic communication of accounting data to the remote data central can ensue at time intervals, the remote data central implementing the accounting with the carrier in a commission agreement with the customer. Alternatively, the data central, after a credit (solvency) inquiry at the customer's bank, can grant the customer a credit and then communicate this credit to the postage meter machine. Information about the appertaining type of accounting and the respective logo that identifies the employment of a current carrier fee schedule are related to the selected carrier. The aforementioned data and their allocation are stored in the postage meter machine for each selectable carrier. As needed, a document (receipt) memorializing the successful recrediting can be printed out with the print head of the postage meter machine for each mail carrier after an a recrediting. This becomes possible by switching the postage meter machine to an internal printing mode. A listing regarding individual financial recrediting data within a time span and other register or service data, can be printed out as a document by the print head of the postage meter machine, when this is desired.

DESCRIPTION OF THE DRAWINGS

FIG. 7*c* illustrates a format for carrier-related accounting data in the postal registers in accordance with the invention.

FIG. 7*d* illustrates a format for a two-dimensional cost center/carrier matrix in accordance with the invention.

DESCRIPTION OF THE PREFERRED EMBODIMENTS

Figure 1:
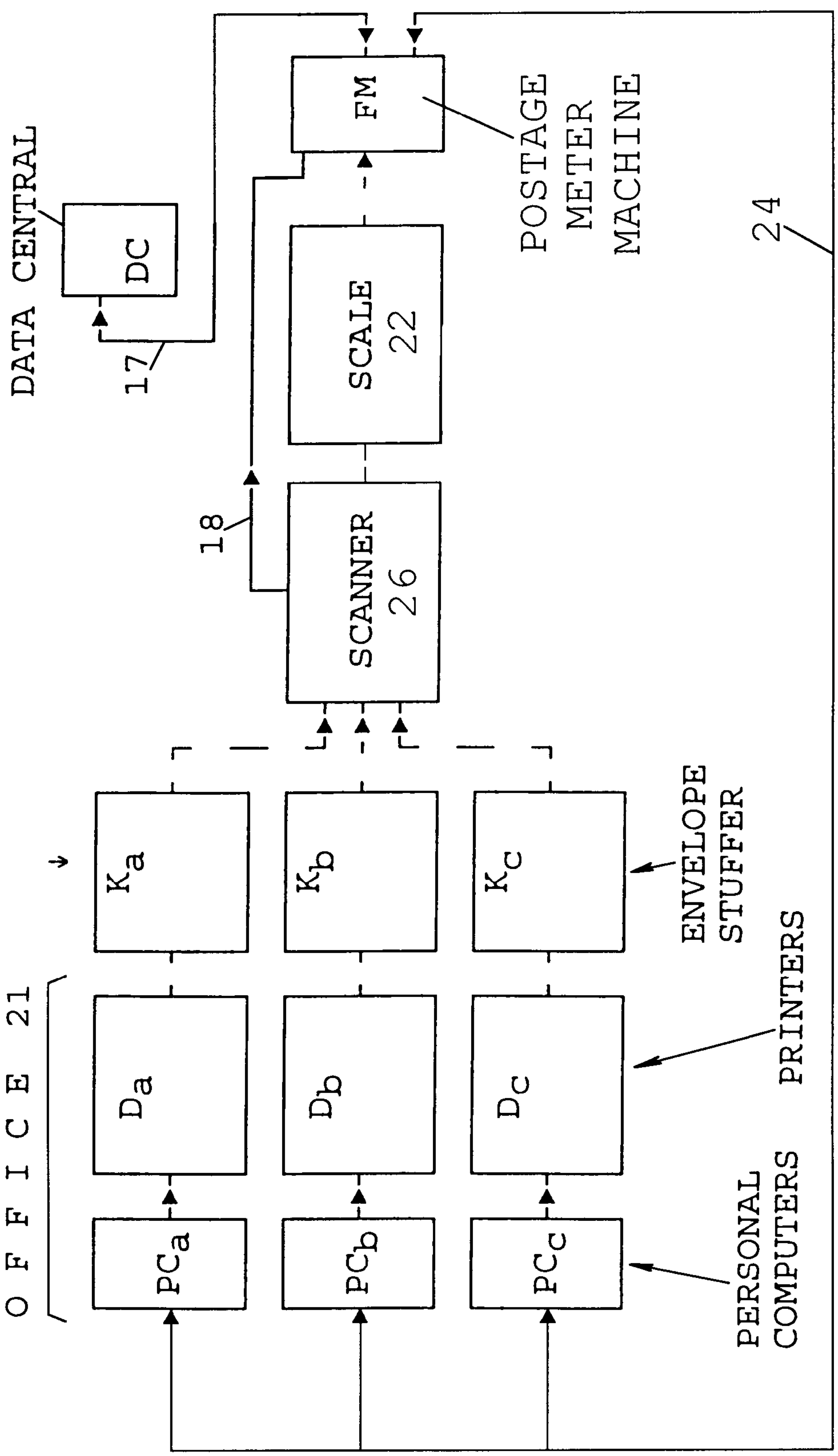
FIG. 1 is a block circuit diagram of a mail processing system with a postage meter machine constructed and operating in accordance with the principles of the present invention.

The block circuit diagram shown in FIG. 1 for a mail processing system with a postage meter machine shows the transport flow of mail from a modern office 21 to a mail center. In at least one such office 21, letters are produced on a number of personal computers $PC_a$, $PC_b$, $PC_c$, . . . , with associated printers $D_a$, $D_b$, $D_c$, . . . , and possibly other connected periphery devices.

A mail carrier can be selected and at least displayed with a user interface at each of a number of personal computers, of which personal computers $PC_a$, $PC_b$, $PC_c$ are shown. In the preferred version, the selected mail carrier information is additionally printed out in the address area with the letter contents. A window envelope can be employed for stuffing which takes place at respective automated or manual stuffing locations $K_a$, $K_b$, $K_c$ . . . . As warranted, the information about the selected mail carrier can be pasted on the envelope in the form of a label or sticker within the framework of this manual envelope stuffing. A version is also possible wherein pre-printed or prepared envelopes are employed for the identification of a private carrier. The printer, in particular, can be a commercially available printer equipped for printing envelopes that is connected to the personal computer.

In the mail station, at least one scanner scans the carrier and/or cost center information that is printed in the address field that can be scanned through a window of a window envelope or which is printed on the envelope or on a label or sticker adhered thereto. The scanner is electrically connected to the postage meter machine via a data line 18. Moreover, an additional scale can be arranged in the transport path to the postage meter machine in order to determine (at least) the weight data of the letter. Such a scanner 26, for example, can be arranged in the delivery path to a scale 22. The postage meter machine FM can communicate as needed with a remote data center DC via a suitable communication path 17.

As can be seen in FIG. 1, the scanner 26 connected to the postage meter machine FM scans the address data of the letter recipient in the mail station. The postage meter machine FM can form request data therefrom, in order to request additional data from the office 21, the request being communicated to one of the personal computers $PC_a$, $PC_b$ or $PC_c$ via a data line 24. The scanner 26 (as well as other scanners if multiple scanners are used, as described in more detail below) can be a component of an automatic delivery station, as can the scale 22. The automatic delivery station is arranged at the mail station at the start of the letter transport (delivery) path preceding the postage meter machine FM.

When the postage meter machine is equipped with an internal, dynamic scale 22 and when the internal mail path cannot be influenced from the outside, then the scanner 26 can also be arranged at a suitable location in the mail path preceding the postage meter machine. This latter requirement is necessary as a result of uniform mail regulations for the position of the address. Cost finding programs for the position of the address and of the other information exist in memories of the respective personal computers $PC_a$, $PC_b$ or $PC_c$ in the office 21 that drive a printer in common, or separate printers, according to the aforementioned areas to be printed. An additional line is provided on the cover or in the address field of the cover as an area to be printed. Further scanner (not shown can be provided to respectively scan other envelope formats, if necessary. A further scanner 26.1, for a different type of envelope format is connected together with a first mail sensor 16 to a register unit 19 that intermediately stores data and implements a parallel-to-serial conversion. Other scanners, if present would also be connected to the register unit 19. For serial data transmission, the register unit 19 is electronically connected via the data line 18 to an input/output control unit 4 of the postage meter machine.

Figure 2:
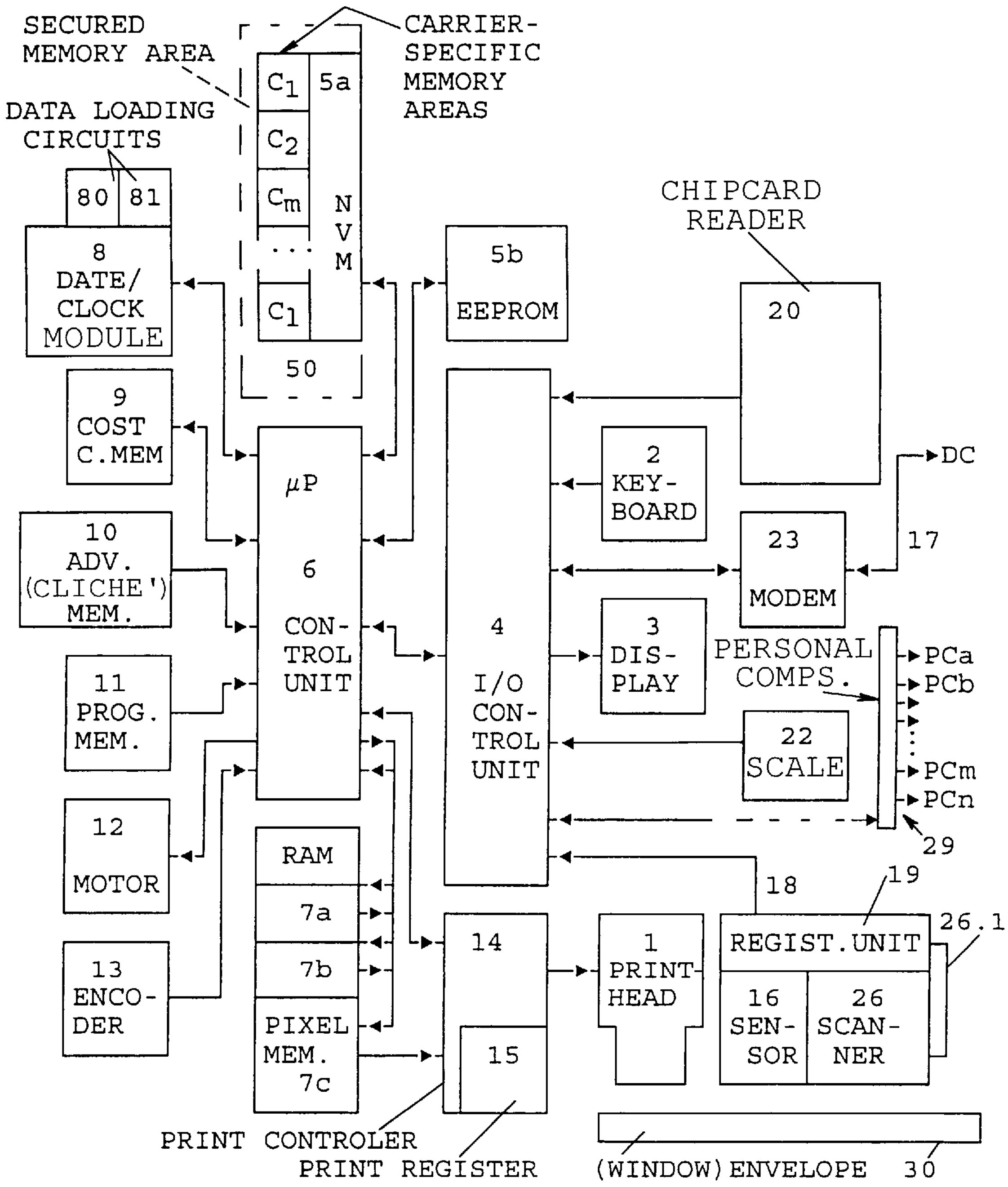
FIG. 2 is a block circuit diagram of a postage meter machine constructed and operating in accordance with the principles of the present invention with automatic data processing, in a first embodiment.

The block circuit diagram of a postage meter machine shown in FIG. 2 has a programmable processor system that is connected to at least one scanner 26 and a modem 23, a scale 22, a chip card write/read unit 20 and/or other, corresponding reception means or input means. The scanner 26 is positioned at the start of the secure wheel gap (conveyor hip) in the mail station.

It is, of course, possible for each of the personal computers in the office 21 to communicate with a single postage meter machine FM, these personal computers being successively interrogated by the postage meter machine FM to search their respective files stored, for example, based on time data, for the relevant letter recipient address and allocated cost center and/or carrier information. Files having the same recipient address in the address data area are not relevant if the contents thereof were not stored on the same day as the interrogation from the postage meter machine FM. In other words, it is assumed that if a letter to a particular recipient is prepared in one of the personal computers, it is desired that this letter is to be dispatched to the recipient on the same day it was prepared. Therefore, even if multiple letters to a particular recipient are stored in a personal computer, it is assumed that only one of those letters will have been prepared on the same day as the interrogation from the postage meter machine takes place. The requested carrier and/or cost center information are then electronically communicated to the postage meter machine FM via the data line 24.

In the postage meter machine housing, input and output units such as a keyboard 2, a display 3, a chip card write/read unit 20, a scale 22 and a modem 23 are connected via the input/output control unit 4 to a processor system having a postal-oriented security region 50, by a direct connection or via a bus (not shown). The processor system is composed of at least one memory means having a non-volatile memory (NVM) 5*a*, with carrier specific memory areas $C_i$, $C_m$, and an EEPROM 56, a clock/date module 8 and a processing unit (CPU) functioning as a control unit 6 and, possibly a specific circuit or program source 80 and/or 81 for automating the loading of data from a data central via modem or chip card, or some other suitable transmission means. The special circuit and/or program source 80 and 81 are preferably a component part of a battery-supported, non-volatile memory (CMOS-NV-RAM) in the clock/date module 8. Further supporting programs can be present in the program memory 11 and/or in a non-volatile EEPROM stored in the memory 5*b*. A print controller 14 is fashioned, for example, as an ASIC and is matched to the respective, preferably digital, printing process, and operates with a print register 15.

The input/output control unit 4 may include the print controller 14 and be connected in to the control unit 6 of the postage meter machine via a bus and, for example, can be fashioned as an ASIC. A print head 1 is connected to the print controller 14.

The various memories are usually composed of a number of permanent and temporary, non-volatile memories. Together with the control unit 6, one part of the memories forms a postage calculator in a known way an another part forms a protected postal region within the processor system. Work is carried out with the non-volatile memories of the aforementioned, other part of the memories for accounting. It is particularly provided that the protected postal region 50 be equipped with a specific accounting unit that works in a completely counterfeit-proof way and relieves the control unit 6 of this task job. The protected postal region 50 of the processor system of the postage meter machine can be fashioned as a hardware-controlled accounting unit in the form of a special circuit module or, for example, as an ASIC, so that the executive sequence during accounting cannot be manipulated in an unauthorized way, as disclosed in German patent application 196 03 467.1, corresponding to co-pending U.S. application Ser. No. 08/788,188, filed Jan. 24, 1997, entitled "Postage Meter Machine."

In addition, an area organized according to carrier and cost centers can be provided in a special cost center memory 9 in order to execute operations related to the cost center or cost centers. Additional cost centers can thus being established or deleted without the reliability against manipulation be diminished. The protected postal region 50 within the processor system can only be read, but not overwritten. During the service life of the postage meter machine, data such as the number of pieces franked and total amount used for franking with a postage value can always only be incremented but never decremented. In particular, the postage calculator can be formed of the control unit 6 and memory areas of the EEPROM 5*b* and/or other non-volatile memories. Some of the memory areas of the EEPROM 5*b* are intended for the acceptance of fee schedule tables of the individual carriers.

Differing therefrom, individual costs and their data (number of pieces, total amount used) in the cost center memory 9 can be reduced by a predetermined amount, or can be set to zero at the start of an accounting period. The correspondingly actuated keys of the keyboard 2 and/or other input means produce a connection to external memories in order to execute operations related to cost centers.

The program memory 11 of the memory means of the postage meter machine contains programs for initiating and conducting a communication via interfaces in the input/output control unit 4 with the scanner 26 and with input units

20 through 23 and with at least one of the personal computers $PC_a$, $PC_b$ and/or $PC_c$ at the office 21. In this context each of these personal computers with its connected keyboard and monitor can be considered as a peripheral input/output means for the postage meter machine FM for searching for and entering data. Other peripheral input/output means (not shown in detail) can be connected to the processor system of the postage meter machine. At least one parallel interface to the display unit 3 and, in conjunction with the print controller 14, at least one serial interface for print data control and data transmission to the drive electronics arranged on the print head 1, can be provided in the input/output control unit 4. A further serial interface can be connected via the aforementioned register unit 19 to a number of scanners or sensors. At least one scanner 26 is a pixel sensor with a high resolution. Its data bits are output in parallel and are converted into serially fetchable data bits with a sensor shift register in the register unit 19 driven by the input/output control unit 4. The input/output control unit 4 is preferably fashioned such that a number of sensors or actuators with one or more connected sensors or actuator shift registers can be connected via a shared serial interface data line 18 to a single shared shift register in an actuator/sensor controller in the input/output control unit 4, as disclosed in greater detail in the German application No. P 44 45 053.2, corresponding to co-pending U.S. application Ser. No. 08/568,019 ("Internal Postage Meter Machine Interface Circuit" Rieckhoff et al) filed Dec. 6, 1995 and assigned to the same assignee as the present application.

The base (not shown in detail) of the postage meter machine is composed of the print head 1 and a power electronic/sensor/actuator module 12 that contains an energy supply and control for the drives (paper transport, printer, tape, tape dispenser) and the required drive motor. The print head and the module 12 and an encoder 13 for acquiring the transport speed of the piece of mail lie in the base and are coupled to the processor system directly and/or to the scale 22 and, possibly to other peripheral input/output means in the mail station or in the office 21 via the input/output control unit 4 via appropriate interfaces.

The postage meter machine has a reception means such as an external modem 23 and a modem interface in the postage meter machine for the external modem 23 or for an internal modem. A communication with the remote data center DC is enabled via modem. An electronically stored credit thus can not only be replenished in the postage meter machine, but also current fee schedule table data and other data can be communicated.

In another version, a telecommunication network is provided that externally contains a memory with the fetchable data and/or flags for reloading of auxiliary functions and information into the postage meter machine. The external memory is supplied with updating data from the public postal authority and/or private carriers, preferably via the aforementioned data center DC.

Alternatively, an external memory with required updating data can be provided in a mobile radiotelephone communication network and can be addressed by a corresponding communication storage on and communication means. An intermediate storage in the transmission means ensues, and data packets are then transmitted under the control of the postage meter machine and an automatic transfer of the current fee schedule by the postage meter machine is thereby potentially assured. The storage of the fee schedules ensues according to various public mail carriers or private carriers in separate memory areas of the aforementioned postage calculator.

Specific inputs can be undertaken with an alternative input means, particularly a chip card. This is brought into contact with the chip card write/read unit 20 serving as an input means. The interface board of the chip card write/read unit 20 is connected to a serial interface of the postage meter machine. The contacting means in the write/read unit 20 comprises at least six contacts and the data exchange between the unprotected and/or the protected card memory area and a non-volatile memory of the program memory 11 of the postage meter machine is automatically serially undertaken in the framework of a communication protocol as soon as the chip card has been plugged into the plug-in slot of the write/read unit 20.

Such a special mail station chip card for the employees in the mail station can be advantageously utilized for entering location data. A correspondingly programmed chip card is delivered to the user after authorization of a new location or a change in location. Before the machines of the mail station are transported to a new location, it is necessary to turn them off. A location-specific initialization of the postage meter machine automatically ensues after turn-on. So that the postage meter machine need not be switched on or off often at the same location, a standby mode is provided.

With the same chip card delivered to the user, a corresponding postmark imprint text part for the modified name of the municipality and, if needed, for the modified postal zip code is loaded into the postage meter machine in addition to the setting in order to be able to modify the print image data already stored in conformity with the change in location, as is disclosed by European Application 566 225.

Every allocation of semi-variable print image data (window data) that fill up a specific window in the print format (frame data) is stored in specific memory areas of, for example, the EEPROM 5*b* and/or of another non-volatile memory of the postage meter machine FM.

In the franking mode a cost center-specific accounting of the automatically or manually set postage value ensues before the printout of the franking format, this being explained in greater detail in connection with FIGS. 7*a* through 7*d*. It is also provided that a printout can be produced for the cost center-specific accounting by the postage meter machine, as disclosed in German OS 42 24 955. In the first embodiment of inventive mail shipping system, a print requirement upon introduction of a sheet of paper into the printing region is recognized by a standard, second mail sensor 16.1 and, as a reaction to a preceding, manual input including entry of the cost center number in conjunction with a function key, the postage meter machine then produces a printout. The postage values that have been used are listed individually and cumulatively related to various carriers. The cost center printout is regularly sent to the appertaining department in the office 21 or in response to a specific request.

Documents (receipts) memorializing credit reloadings, fee schedules, imaging data and other data can be printed out in a carrier-specific manner at the mail station using the printhead of the postage meter machine FM. As needed, a receipt regarding a completed reloading can be produced separately for each carrier after the postage meter machine FM has been switched to an internal printing mode. Preferably, for franking, a self-adhesive franking tape is printed. It is also possible to provide a listing showing individual financial reloading data within a selected or predetermined time span at the printhead of the postage meter machine FM, as well as printing out register or service data.

As needed, data for a carrier are also produced, for whom the postage values of all cost centers serviced by this carrier are compiled. This is meaningful when the departments are fiscally independent units, i.e., when a number of small companies use an office 21 and the mail station in common but must carry out separate accounting at the carriers.

In the second embodiment of the inventive mail shipping system, an automatic entry of the cost center number into the postage meter machine FM occurs as a reaction to an inquiry made via one of the personal computers in the office 21 via the data line 24. By means of a program stored in the program memory 11, a data communication to the requesting personal computer in the office 21 can be undertaken which provides for the printout of a listing of the cost center-specific accounting. The cost center-specific printout can be made at a printer connected to the requesting personal computer in the office 21.

The communicated listing can also be compared in a personal computer of the office 21 to an internally stored listing. Only modifications of the setting of the carrier are undertaken by the mail center in order, for example, to use favorable offers to obtain rebates from carriers, so that this can be checked by such a comparison.

Figure 3:
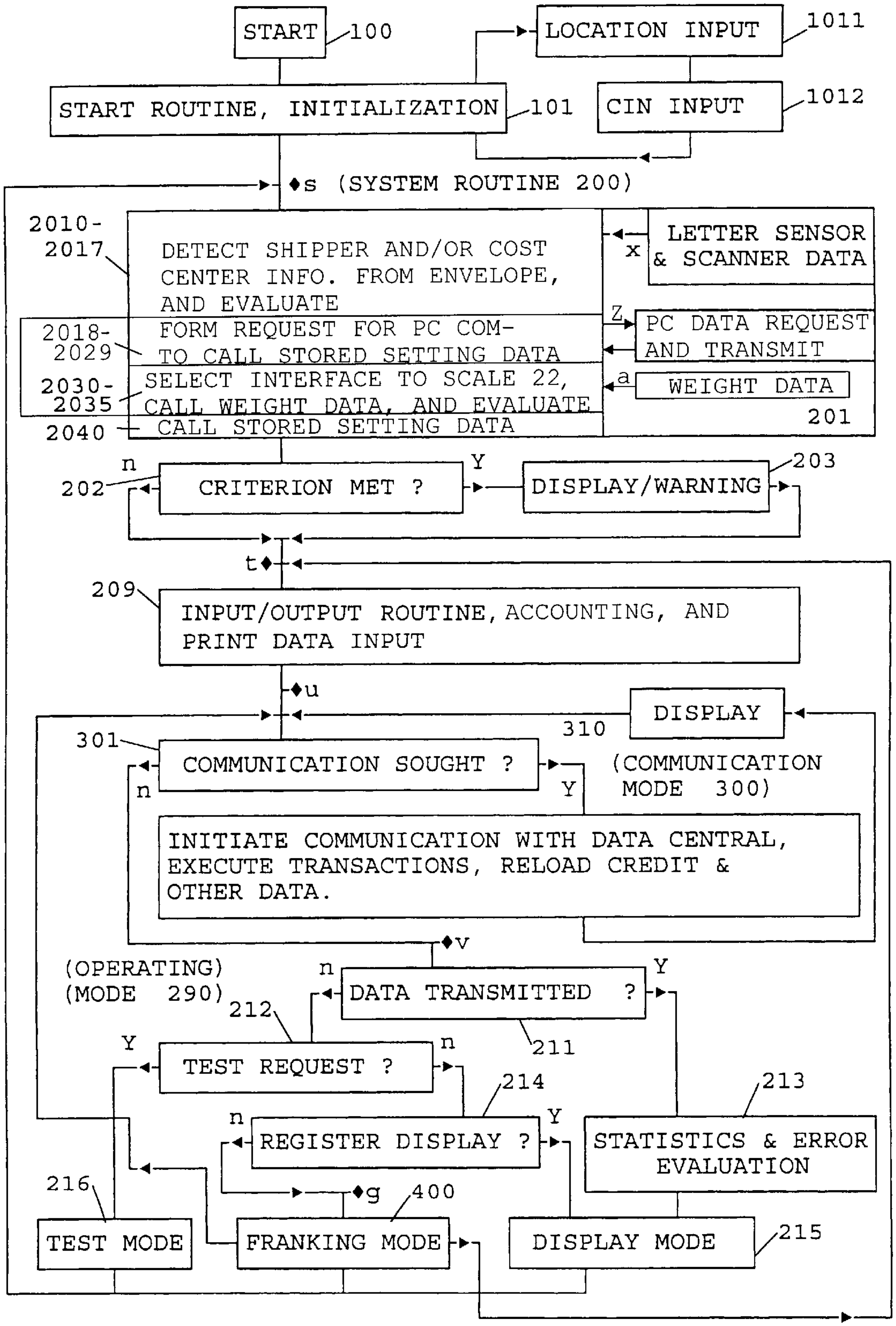
FIG. 3 is an overall flowchart of a postage meter machine with integrated postage calculation and with automatic data processing according to the first embodiment.

The overall flowchart for the postage meter machine of FIG. 2 is shown in FIG. 3. After a start 100, a start and initialization routine 101 is executed which includes a sub-step 1011. After turn-on, a communication requirement is formed in the sub-step 1011 in order to initiate an automatic communication with the data center, for example, via modem 23, and in order to implement a corresponding data transmission wherein the municipality name in the date stamp is modified corresponding to the current location.

The location-specific offering of data ensues optionally or corresponding to the existing postage meter machine type with a card-like transmission means or with corresponding reception means, ensuing from an external memory via a communication network (modem, mobile radiotelephone).

Given a location input with a chip card via a chip card reader/write unit 20, authorization must be obtained in advance. This is in fact more time-consuming but allows a location registration for the respective mail processing system in the data center DC.

In another version, an entry of the location is undertaken, for example, by the keyboard 2 instead of with a remote data transmission or instead of chip card when the postage meter machine is turned on, for example, by a new user after a change in location. After the turn-on, such an input possibility is afforded in sub-step 1011 of step 101 of the initialization, namely by entering the postal zip code into the postage meter machine.

During the initialization routine 101, there is also the possibility in addition to the input of the location to change the previous carrier constellation by definition of a new set of mail carriers, for example with an input of a carrier identification number (CIN) corresponding to the name of the mail carrier in sub-step 1012, as disclosed in European application No. 95 250 313.4, corresponding to co-pending U.S. application Ser. No. 08/579,059 filed Dec. 26, 1995, entitled "Method for Entering Data Into a Scale." When one of the carriers has been selected from the aforementioned set of mail carriers at a later time, only the carrier identification number (CIN) need be automatically communicated to the postage meter machine and the data stored in non-volatile fashion under the carrier identification number (CIN) in step 1012 need be accessed.

After the initialization routine 101, the program branches to a first step 201 a system routine 200 in order to at least call non-volatilely stored settings for the postage meter machine in sub-step 2040 when no piece of mail is detected in the mail delivery path.

A piece of mail possibly supplied in the meantime remains in a waiting period, preferably at the start of the delivery path, or possibly in the delivery path on the scale 22 until all manually required inputs have been actuated in the second step 209. The franking mode 400 is reached after further steps of the overall flowchart have been executed. It is recognized therein that the manual input has been terminated by a comparison of the loop traversals after the last input to a predetermined plurality of loop traversals, or a time duration is compared to a predetermined time duration after the last input. A switch is then first made into the standby mode before returning to the system routine 200 at s.

Inventively, data scanned by the scanner 26 positioned in the mail delivery path to the postage meter machine FM can be entered into the postage meter machine during the activated operating or standby condition of the postage meter machine when a first postal matter sensor 16 has detected a piece of mail that is being transported to the print head 1. A first flag is thereby set. A second flag is also set when the first postal matter sensor 16 is actuated. When, however, only the second postal matter sensor 16.1 by itself is actuated, or is actuated before the first postal matter sensor 16, this can be determined in an interrogation step 211 which then in turn leads to a branch into the error interpretation mode 213. When, for example, the postage meter machine is in the standby condition and only the second postal matter sensor 16.1 is activated, this does not lead to a franking however, an internal cost center printout or a printing of service data or of an advertising slogan can still be undertaken.

Following the initialization in steo 101, the overall flowchart for a postage meter machine with integrated postage calculation shown in FIG. 3 includes a number of sub-steps 2010 through 2017, 2018 through 2029 and 2030 through 2035 in the step 201 for an automatic data input into the postage meter machine according to the first embodiment of the mail processing system, as well as the aforementioned sub-step 2040 for calling non-volatilely stored settings.

The interfaces in the input/output control unit 4 are selected in order to recognize the connected peripheral means and in order to switch the postage meter machine as warranted into a required, pre-programmed operating mode that enables the collaboration and communication with the aforementioned peripheral means. For example, a detection of the scanned data can trigger a conveying of the piece of mail in the direction of the print head 1. The interface to the scanner 26 is selected in order to detect at least one cost center and/or carrier identifier in sub-steps 2010 through 2017 (explained in connection with FIG. 6*a*) in order to read valid data into the memory areas of the non-volatile memory of the postage meter machine provided for that purpose, so that a manipulation-proof, automatic setting can be achieved, which is also preserved in case of an outage of the operating voltage.

In the following sub-steps 2018 through 2029, a communication with one of the remote personal computers is implemented, as explained above, using the data line 24 shown in FIGS. 1 and 2. This communication includes at least transmitting request data from the postage meter machine FM to the personal computer in the office 21 at which a scanned letter was prepared, and calling the cost center information and the carrier information stored in that personal computer.

In sub-steps 2020 through 2035 (also shown in FIG. 6), the interface to the scale 22 is then selected, whereby a mode switching ensues if a scale 20 is connected for weight input. The postage meter machine FM is then in a slave condition in order to receive data from the peripheral means, i.e. the scanner 26 and the scale 22. The new setting for the automatically entered weight value is likewise non-volatilely stored, with the old setting data being overwritten.

In at least one following step 202, an interrogation is carried out to determine whether the scanned data yield meaningful information to determine at least one limit value is exceeded, i.e., whether a criterion was met that leads to a warning in a following step, for example a display that warns the user or displays an error. After a number of interrogations in further steps 202, 209, 301, 211, 212 and 214 have been executed in the program, the postage fee determined in the step 209 for a weighted piece of mail, or according to the setting, is accounted for or debited in the franking mode 400. Print data for printing are now offered from the pixel memory 7*c* in the RAM 7.

Moreover, an automatic print data generation with protected data also already ensues in the initialization routine 101 for preparing for a printout, as disclosed in greater detail in co-pending U.S. application Ser. No. 08/525,923 ("Method For Improving The Security Of Postage Meter Machines," Windel et al filed Sep. 8, 1995 and assigned to the present application ). Further security criteria can be interrogated at least in step 202 and can be displayed in the step 203 or can be edited for signaling. Even when no further inputs are undertaken, a stamp imprint can be generated and printed from the stored data protected against manipulation. The following, inventive, second step 209 is directed to a specific input and display routine. In the aforementioned step 209, the previously non-volatilely stored data can be overwritten or modified with the input means of the postage meter machine or other inputs can be manually actuated and displayed. A print data input is also provided for corresponding sub-images (window pixel data). The transport of the postal matter in the direction of the print head 1 may then be interrupted so that the input can be completed. When, however, no manual intervention ensues, the mail processing and franking is executed fully automatically.

After the second step 209, the point u, i.e., the beginning of a communication mode 300, is reached and an interrogation is made in a third step 301 to determine whether a transaction request is present. This is the case when request data were formed or when an input was undertaken for the purpose of reloading credit. When this is not the case, the communication mode 300 is exited and point v, i.e., the actual operating mode 290 of the postage meter machine, is reached. When relevant data were communicated in the communication mode, then a branch is made to the step 213 for data interpretation. A statistics and error evaluation is implemented in step 213 in order to acquire further current data that, after branching to the system routine 200, can likewise be called in the sub-step 2040 of the first step 201. Or, when the non-communication of data was found in at least step 211 following the communication mode in the third step 300, a branch is made to the next interrogation in step 212. A check is made in step 212 to determine whether corresponding inputs had been actuated in order to proceed into the test mode 216 given a test request, otherwise to proceed into a display mode 215 when a check 214 of the register status is intended. When this is not the case, the point g, i.e., the franking mode 400, is automatically reached. In the franking mode 400, a number of security interrogations are provided and the cost-center-related accounting only ensues shortly before the beginning of the printout of the franking format, with memory address data being employed that were already previously formed after their entry on the basis of a change in the cost center number. A higher security against manipulation is achieved with the aforementioned sequence of interrogations. With the program routine of the postage meter machines the branch is then made from the franking mode 400 to point u when a number S of credit items has been used. A communication with the data central DC is automatically undertaken in order to be able to continue to frank. A branch is repeatedly made to point t from the franking mode 400 in order, in the second step 209, to enable a data input with the postage meter machine keyboard 2. In a practical fashion, such manual inputs ensue when a signal for a print output request was not yet generated, this being derived from a corresponding postal matter sensor signal. When, however, postal matter was recognized and the print output request was generated after a predetermined time delay, a cost-center-dependent accounting and a franking of a piece of mail are implemented by program and a branch is then made back to point s.

Figure 4A:
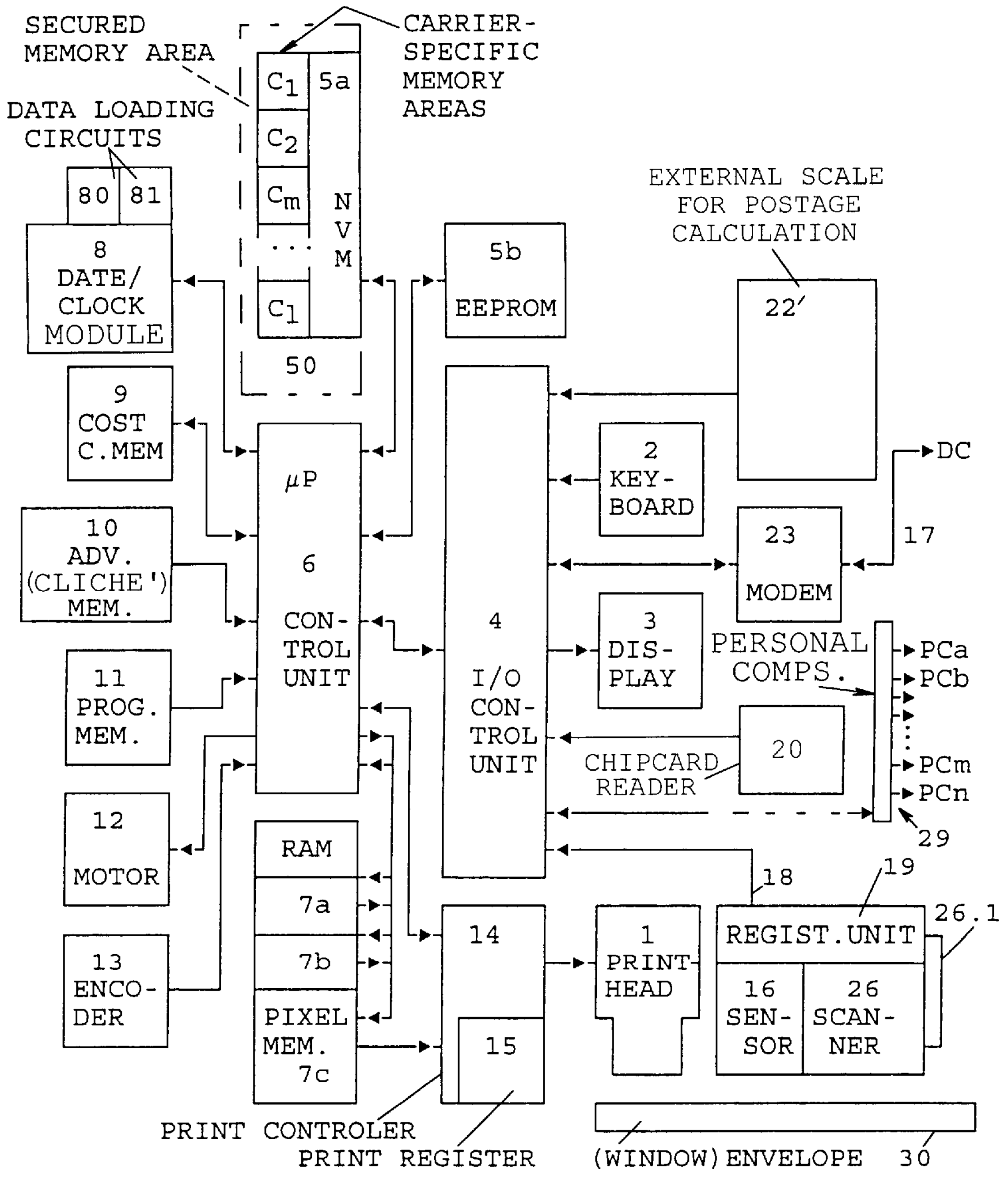
FIG. 4*a* is a block circuit diagram of a postage meter machine constructed and operating in accordance with the principles of the present invention with an external scale in which the postage calculation is conducted and with automatic data processing according to a second embodiment.

The block circuit diagram of a postage meter machine shown in FIG. 4*a* differs from that shown in FIG. 2 on the basis of an external scale for the postage calculation. The data input of the carrier information ensues so that at least one scanner 26, via a line 28, supplied scanned information initially into the external scale 22, differing from the exemplary embodiment shown in FIG. 2. The external scale 22 communicates the calculated postage value via a line 25 to the postage meter machine which is thus relieved of calculating the postage.

In the inventive arrangement for data input into a postage meter machine operating according to FIG. 4*a*, the input/output control unit is connected 4 to an internal or an external scale 22' for weight input, a register unit 19 for automatic input of data and for controlling connected periphery devices, as well as a modem 23 for communication to a remote data central and communication means to a personal computer (PC) in the office 21. A processor system contains a microprocessor 6 operating as the control unit that is programmed with a routine for interpreting the scanned data and that is programmed with a routine in order to find the data of a datafile of the personal computer (PC) in the office 21 among interrogated datafiles respectively allocated in that personal computer to letter contents. As a result, the mail carrier number (CIN) or the cost center number are automatically entered into the postage meter machine FM and are processed.

At least one scanner 26 is connected for this purpose to the register unit 19. It is provided that at least one scanner is arranged such in the mail delivery stream that different formats are also sensed. For other envelope formats, further scanners (not shown) for address scanning can be arranged in the mail delivery path of the scale 22' or in the mail delivery path of the postage meter machine FM and connected to the register unit 19.

Programs corresponding to the postal regulations for the position of the address and the other information exist in memories of the respective personal computers $PC_a$, $PC_b$ or $PC_c$. Processing means for the scanned information is preferably integrated into the postage meter machine FM in order to evaluate the address and other.

The scanner 26 together with the letter sensor 16 are connected to a register unit 19 that intermediately stores data and implements a parallel-to-serial conversion. The register unit 19 is electronically connected via the data line 18 to the input/output control unit 4 of the postage meter machine FM for serial data transmission.

The invention is not limited to this embodiment since, of course, the scale 22' or other peripheral input/output means can be connected to a shared, serial interface via the register unit 19 and the data line 18.

The scanner 26 contains an electronic circuit for image evaluation. A mark reader with subsequent image evaluation can be realized as disclosed, for example, in the German OS 43 44 471.

Alternatively, the electronic circuit in the scanner 26 may only obtain the pixel data, with an image evaluation ensuing in the postage meter machine FM. On the basis of the identified addresses, the carrier and/or the cost center is located in the personal computer on which a scanned letter was prepared, upon interrogation by the postage meter machine FM or the external scale 22'.

As a result, carrier information that is required for the carrier-specific fee calculation is entered into the scale, and carrier information that is required for a carrier-specific input of logo print data is automatically entered into the postage meter machine. The processor system of the postage meter machine FM contains a microprocessor operating as the control unit 6 that is programed with a routine stored in a memory area 81 of the clock/date module in order, as needed, to correspondingly load the data of the automatically set, new mail carrier in automatic routines.

Additionally, the microprocessor is programmed with a further routine in order, after turn-on, to initialize the postage meter machine FM in a location-specific manner and, as needed, in order to load further data into the postage meter machine FM. Also included are critical franking image data prescribed or required by the carrier, analogous to the sovereignty characters of the national, governmental mail carriers, as described in detail in German application 195 49 305.2.

This type of reloading is particularly provided for digital printing processes that allow a program-controlled embedding of variable or semi-variable window pixel field data in constant frame pixel field data. Such a method for controlling the column-by-column printing of a postage imprint character image in a postage meter machine is disclosed, for example, in European Application 578 042.

The arrangement for data entry into a postage meter machine has input and output means that are connected to a processor system. It is provided that the input means has first actuation means in order to set the postage meter machine FM to a different mail carrier. It is also provided that the input means has second actuation means for the specific setting of a new mail carrier. If the input means is formed by the keyboard 2, the first and second actuation means are formed by respective keys on the keyboard 2. The processor system contains a microprocessor that is programmed with a routine in order to correspondingly load the data of the new mail carrier that has been set in automatic routines 1000 of the communication mode 300 and in order to generate a change in the print format, whereby the generated change data are non-volatilely stored under a number and allocated to the respective mail carrier, or are non-volatilely stored allocated to a carrier identification number (CIN) corresponding to the selected mail carrier.

Figure 4B:
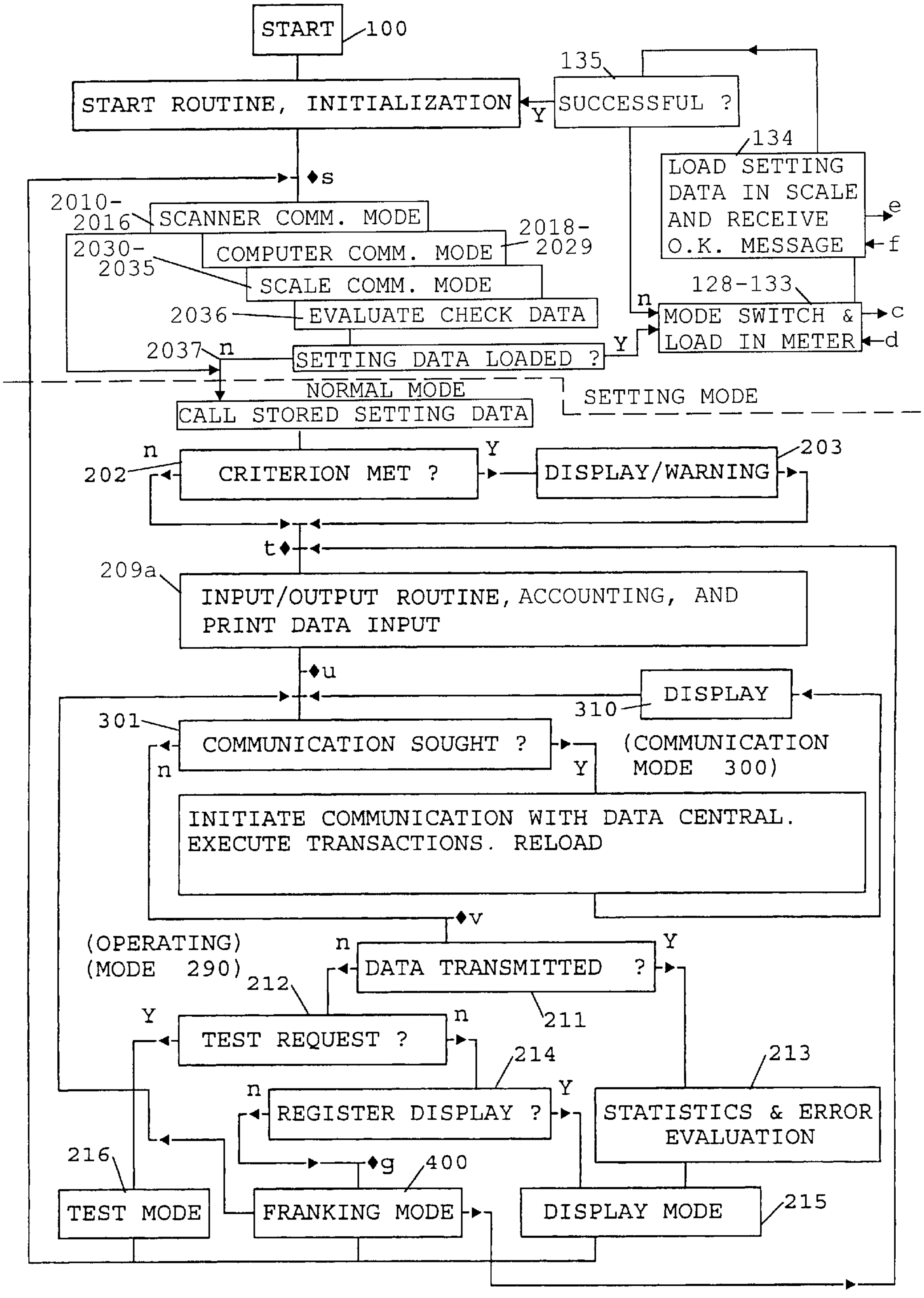
FIG. 4*b* is an overall flowchart for a postage meter machine with external scale for a postage calculation and with automatic data processing according to the second embodiment.

The overall flowchart for a postage meter machine with an external scale 22' for postage calculation shown in FIG. 4*b* contains an automatic data input according to a second version. After initialization in step 121, an updating mode (steps 128 through 135) may possibly ensue, this being followed by a normal mode disclosed in European application Serial No. 95 250 313.4, corresponding to the aforementioned co-pending U.S. application Ser. No. 08/579,059. In addition to sub-steps 2010 through 2017 in order to detect sensor signals, the first step 201 of a system routine 200 also includes sub-steps 2030 through 2035 for the reception of data that are communicated from the scale and further sub-steps 2036 through 2037 for interpretation as well as sub-step 2040 for calling data, including scale input data, which here include selected imprint, postage fee and carrier type.

The aforementioned further steps 2036 through 2037 for interpretation are required in order, if necessary, to update the fee schedule table data for individual carriers stored in the postage calculator of the scale 22'. A switch is then made from sub-step 2037 to the updating mode (steps 128 through 135). A communication of the corresponding check data that are communicated to the postage meter machine for checking the currentness of the carrier-related data stored in the external scale ensues during the scale communication mode (sub-steps 2030 through 2035).

When the postage fee is calculated in the scale 22', carrier-specific data must be communicated to the scale 22' and stored therein. As was already explained with reference to FIGS. 2 and 3 and as disclosed in European application No. 95 250 313.4, corresponding to the aforementioned co-pending U.S. application Ser. No. 08/579,059, it is thus possible to transmit fee schedule table data of selected carriers into the scale from an external memory for carrier data via the postage meter machine so that postage values can be determined in a current way corresponding to the respectively selected carrier. In the updating mode, steps 120 through 135 are executed in order to check the currentness of the fee schedule tables stored in the scale 22' and, if necessary, to restore them. In sub-step 2036, the postage meter machine first checks whether check data were communicated from the scale to the postage meter machine. Otherwise, given non-communication, a branch is made back to the start via a sub-step 2060 for an error message. When the sub-step 2036 for evaluating communicated check data has been successfully opened, a switch is made for forming request data in the postage meter machine, this having already been explained in greater detail in conjunction with the first version in FIG. 3. A determination as to whether the fee schedule table data of the selected carrier are still valid, and whether a reloading or updating is required, must ensue before a switch can be made to normal operation. When request data were formed in sub-step 2036, then new updating data are to be loaded and a branch is made from the interrogation sub-step 2037 to steps 128 through 133 in order to undertake a mode switching of the postage meter machine into the master status and to load the required updating data into the postage meter machine according to the request data. In the following step 134, a transmission of the updating data required by the scale 22' ensues to the scale 22. Whether updating of the data stored in the scale 22' was successful is determined in step 135 and a branch is then made back to the initialization routine, and the mode switching is canceled. In sub-steps 2010 through 2037, the postage meter machine is again in the slave status.

The scale input data communicated to the postage meter machine in sub-step 2033 relates to imprint selection, carrier identification number CIN, possibly to the minimum validity duration of the postage fee schedule table belonging to the CIN and the identified postage fee for a weighed piece of mail as well as, possibly, the measured weight value. When the minimum validity duration of the postage fee schedule table belonging to the CIN is present stored in the postage meter machine allocated to the CIN, the minimum validity duration need not be communicated from the scale. After a transmission of the selected CIN from the scale 22' to the postage meter machine an updatable allocation table realized in the memory units 5*a* and/or 5*b* or the module 8 is retrieved in order to determine the minimum validity duration or the validity time span, this being interpreted in step 2036 by comparison to the currently set date, or to the date stored in non-volatile fashion in the clock/date module 8. After an interrogation has been carried out in step 2037, and if no updating data are to be loaded, the normal mode is reached.

Figure 5A:
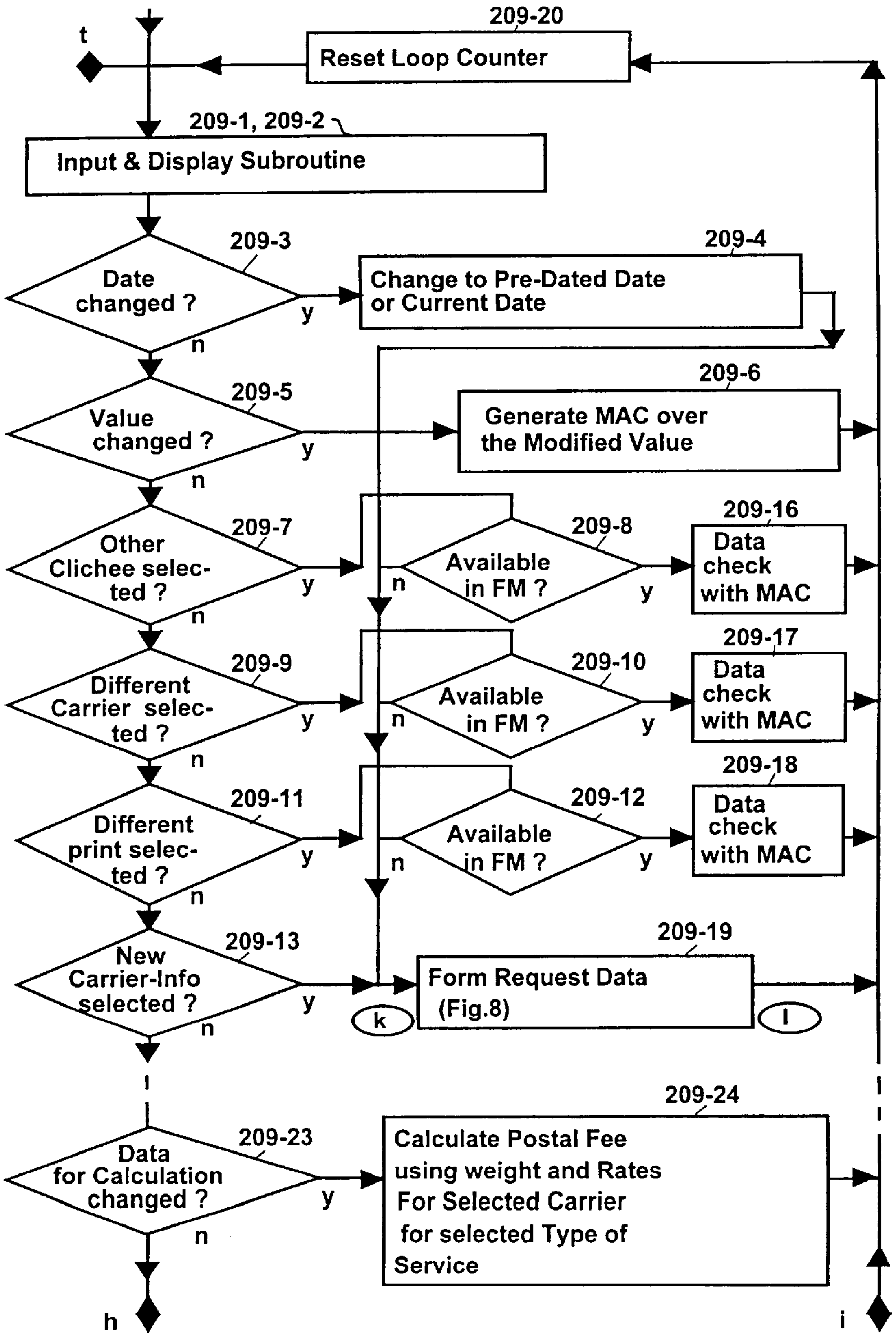
FIGS. 5*a*–5*c* together for a flowchart of evaluation of a data entry for the postage meter machine constructed and operating in accordance with the principles of the present invention in the framework of an input/display routine according to the first embodiment.

As shown in FIG. 5*a*, the modification of the setting with respect to the slogan (cliché), the mail carrier, and the services or selected imprints of the carrier, is undertaken by entry of an allocated number, with the respective functions being called by the actuated elements of the keyboard 2 in a sub-step 209-1 and determined in interrogation sub-steps 209-7, 209-9, 209-11. The formation of the request data is connected to the aforementioned modification of the setting of the mail carrier and/or connected with those data of the clock/date module 8 called in the step 201 but modified due to the passing of time. The modification can be identified by the control unit 6 in the sub-step 209-3. In the communication mode, the request data lead to the reloading of sub-image data or files pixel image data files that are either embedded as window pixel data into the frame data or modify the frame data of the franking format itself in a carrier-specific fashion.

It is also provided that the communicated sub-image data files, allocated to a carrier identification number (CIN) corresponding to the respectively selected mail carrier, are non-volatilely stored in the postage meter machine in order, given selection of a predetermined mail carrier number or CIN, to generate specific print formats. Moreover, the communicated sub-image data files, pixel image data files and the modified data generated by automatic or manual input are stored in non-volatile memory areas of write/read memories 5*a* and 6*b* and/or the module 8.

In step 209*a*, data can be overwritten or modified using the input means, such as the keyboard 2, of the postage meter machine FM, or other inputs can be manually actuated and displayed. In the overall flowchart for the postage meter machine FM having an external scale 22' shown in FIG. 4*b*, wherein the postage calculation takes place in the scale 22', however, no postage calculation takes place internally in the postage meter machine FM, differing from step 209 according to the first embodiment, shown in FIG. 3.

FIG. 5*a* shows a flowchart of a data entry for the postage meter machine according to the first embodiment. In the second step 209 for an input and display routine, specific interrogation steps are also utilized in addition to the standard ones. In the second step 209, for example, a pre-dating for future mail with the input means of the postage meter machine causes the previously non-volatilely stored date to be overwritten and displayed. To that end, the date displayed in the sub-step 209-2 is overwritten on the basis of a data input undertaken in the sub-step 209-1 with the input means before a corresponding, sub-step 209-3 for interrogation is reached. When a different date than that prescribed by the clock/date module 8 was set, then this is identified in the interrogation step 209-3 and a branch is made to the sub-step 209-4 in order to implement the change to a pre-dated date or the current date. After a rebranch, the new date is displayed in the second sub-step 209-2. Such a method for data setting for electronically controlled postage meter machines can ensue in a standard way. The second step 209 for an input and display routine has been supplemented by specific interrogation steps. Thus, a branch from the sub-step 209-4 for date change is made via further sub-steps, particularly a sub-step 209-19 in order to form request data and, via a sub-step 209-20 in order to reset the loop counter, to a point t at the input of the input and display routine (second step 209). A preferred method for data input into a postage meter machine was disclosed in detail in the aforementioned German application 195 49 305.2 and corresponding U.S. application Ser. No. 08/770,525.

When it is found in the interrogation in the sub-step 209-3 that no other date data were selected, the next interrogation in the sub-step 209-5 is reached. An interrogation is thereby made as to whether a different value was selected in the input. If this is the case, i.e., when a different value was selected in input, then a branch is made to the sub-step 209-6 in order to generate an encoded check code (MAC) over the selected value. A preferred method for securing data and program code has been disclosed in detail in German application No. 195 34 530.4, corresponding to co-pending U.S. application Ser. No. 08/525,923 filed Sep. 8, 1995, entitled "Method For Improving The Security Of Postage Meter Machines."

After the aforementioned sub-step 209-6, a branch is made back via the sub-step 209-20 in order to reset the loop counter to the point t at the input of the input and display routine (second step 209). If, however, this is not the case, further interrogation sub-steps 209-7 through 209-50 are sequenced.

A direct value input via the keyboard 2 is possible, for example entering known fee schedules, with the sub-step 209-1 even when no scale is connected. The basis for this form of presentation of the respective carrier-associated stamp format is a carrier-associated control data file that is suitable for determining or for modifying an allocation of sub-images to other variable image data files (window image data) or invariable sub-images image data files (frame image data). Such image data and control data files are presented in detail in European application No. 95 114 057.3, corresponding to co-pending U.S. application Ser. No. 08/706,504, filed Sep. 5, 1996, entitled "Method For Generating A Print Format That Is Printed On A Carrier In A Postage Meter Machine."

A check is made in the sub-step 209-7 to determine whether a different cliché was selected in the input in the sub-step 209-1. A check is made out in the sub-step 209-9 to determine whether a different carrier was selected automatically in step 201 (FIG. 4*a*) or during the input in first sub-step 209-1. A check is made in the sub-step 209-11 to determine whether a different selective imprint was selected during the input in the sub-step 209-1, this, of course, only representing a carrier-associated service performance in addition to special delivery, air mail, printed matter, return receipt, etc. The setting of the service performances can be automatically communicated to the postage meter machine as shipping data, just like the carrier data, and the setting data are preferably displayed in the display field for the selected imprint of the postage stamp and require further interrogation steps for manual modification, that have not been shown in FIG. 5*a* for clarity.

It is advantageous when an ongoing adaptation of the user specific input set to the user thereof is undertaken, as disclosed by German OS 42 17 478 and when a clear text illustration of the stamp to be printed ensues in the display, by means of a branch back to the display to the second sub-routine 209-2. A modification of the stamp format that has been undertaken can thus be easily monitored, particularly when change inputs relating to a different imprint, a different carrier or to a different selective imprint are manually or automatically undertaken.

In FIG. 5*a*, an interrogation criterion according to a carrier change is inventively satisfied in the sub-step 209-9 when a corresponding scanning of the mail has ensued during the framework of the input routine (first step 201 in FIG. 3) or when the calculated postage value and appertaining data about the carrier type are supplied by the external scale 22' (first step 201 in FIG. 4*b*), and thus a modified carrier information for accounting purposes was automatically entered into the postage meter machine.

The sub-step 209-24 for internal calculation of the postage value in the postage meter machine is eliminated given the version according to FIG. 4*b*, i.e. when the calculated postage value and appertaining data about the carrier type are supplied by an external scale 22, as already been explained on the basis of the step 201 in FIG. 4*b*.

A corresponding automatic input in the first step 201 (FIGS. 3, 4*b*, 4*d*) or manual input in the sub-step 209-1 being assumed, a branch is made to sub-step 209-10 when the sub-step for checking for carrier input (209-9) is reached in order to check the availability of the data in the postage meter machine. The absence of a concordance with respect to the data sets stored in the personal computers $PC_a$, $PC_b$, . . . $PC_m$ in the office 21 relative to the individual carriers can be determined with this check in sub-step 200-10. The data of the missing carrier or of a new carrier, can be stored in the postage meter machine after they are communicated.

Correspondingly, a branch is made from the sub-step 209-7 for checking for slogan input, or from the sub-step 209-11 for checking for selected imprint input respectively to sub-step 209-8 or sub-step 209-10 for checking the availability of the data in the postage meter machine. Within the framework of an automatic entry in the first step 201 (FIGS. 3, 4*b*) of a cost center number, an advertising slogan allocated to the cost center can likewise be automatically selected. It thus still remains up to the employee in the mail center to manually modify the selected imprint when this seems necessary from his other point of view and falls within the scope of his or her responsibility.

Given available data, a branch is made from the sub-steps 209-8, 209-10 and 209-12 for slogan, carrier or selected imprint input checking respectively to the allocated security checking steps 209-16, 209-17, 209-18, whereby an automatic print data input is undertaken given validity. A data check on the basis of an encoded check sum (MAC) prevents a manipulation with fraudulent intent, as was disclosed in detail in German application Serial No. 195 34 530.4, corresponding to the aforementioned co-pending U.S. application Ser. No. 08/525,923.

If, however, the other hand, the necessary data are not available in the postage meter machine, a branch is made at a point k to the nineteenth sub-step 209-19 in order to form request data. If actuation means for a new input of a carrier were actuated during the input routine ( sub-step 209-1), this is identified in an interrogation step (sub-step 209-13) and a branch is likewise made to point k of the sub-step 209-19 in order to form the request data. The aforementioned sub-step 209-19 shall be explained in greater detail below in conjunction with FIG. 8.

A number of interrogation steps that are not shown can lie between the interrogation step 209-13 and a point h in order to further interpret inputs such as, for example, those relating to service performances, shipping types, shipping forms or mail classes. If it is then found in a interrogation step 209-23 that the data required for a postage calculation are presently modified, a branch ensues to a sub-step 209-24 for calculating the postage value according to the fee schedule of the selected carrier for the selected service performances and other relevant inputs. Subsequently, a branch is made back via the sub-step 209-20 to the point t. The postage value modified on the basis of the postage calculation is again determined in the sub-step 209-5 and a branch is then made to the sub-step 209-6 for the purpose of generating an encoded check sum (MAC) over the modified postage value. This postage value secured in this way is now storable manipulation-proof together with the MAC and can be employed for accounting within the framework of the franking mode 400 that sequences chronologically later (7*b*). In such versions according to FIGS. 4*a* through 4*d* with external postage calculation, the interrogation sub-step 203-23 is eliminated, as is the associated sub-step 209-24 for the internal postage calculation.

User-specific or department-specific accounting requires cost center information in order to properly assign these accounting data. The cost center information scanned from the piece of mail or communicated from the personal computer in the aforementioned way can be utilized for a cost-center-dependent, automatic allocation of the accounting data, as well as for a cost-center-dependent, automatic setting of an advertising slogan in the franking format, shown in FIG. 5*b*. The user-relevant settings of the cost center and the advertising slogan via the keyboard 2 of the postage meter machine that are otherwise respectively required are thus advantageously eliminated. A prerequisite for this is the capability for non-volatile storage of a number of advertising slogans in the postage meter machine. A fixed number of advertising slogans, for example, can have been already non-volatilely stored by the factory of the manufacturer in an internal user memory 10 (EEPROM). This is a non-volatile memory for storing a number of advertising slogans, with each advertising slogan being respectively allocated to a cost center of the department. Alternatively, a number of advertising slogans can be subsequently loaded. The chip card write/read unit 20 enables a more frequent slogan change, by card, for a number of inputs. A further possibility is, for example, a password-protected function for deleting predecessor data for parts of the print format, or the allocation thereof to the cost center. The postage meter machine is therefore equipped with a corresponding program as well as with input and display means. A corresponding executive sequence for loading data or for updating is stored in further circuit or an area in the program memory 11 and in the non-volatile memory areas of the clock/date module 8 and/or in the memories 5*a* and 5*b* in order to load successor data into these memory areas previously occupied by deleted predecessor data, as well as in order to redefine their allocation to the cost center, as shall be described in greater detail below in conjunction with FIG. 5*b*.

Figure 5B:
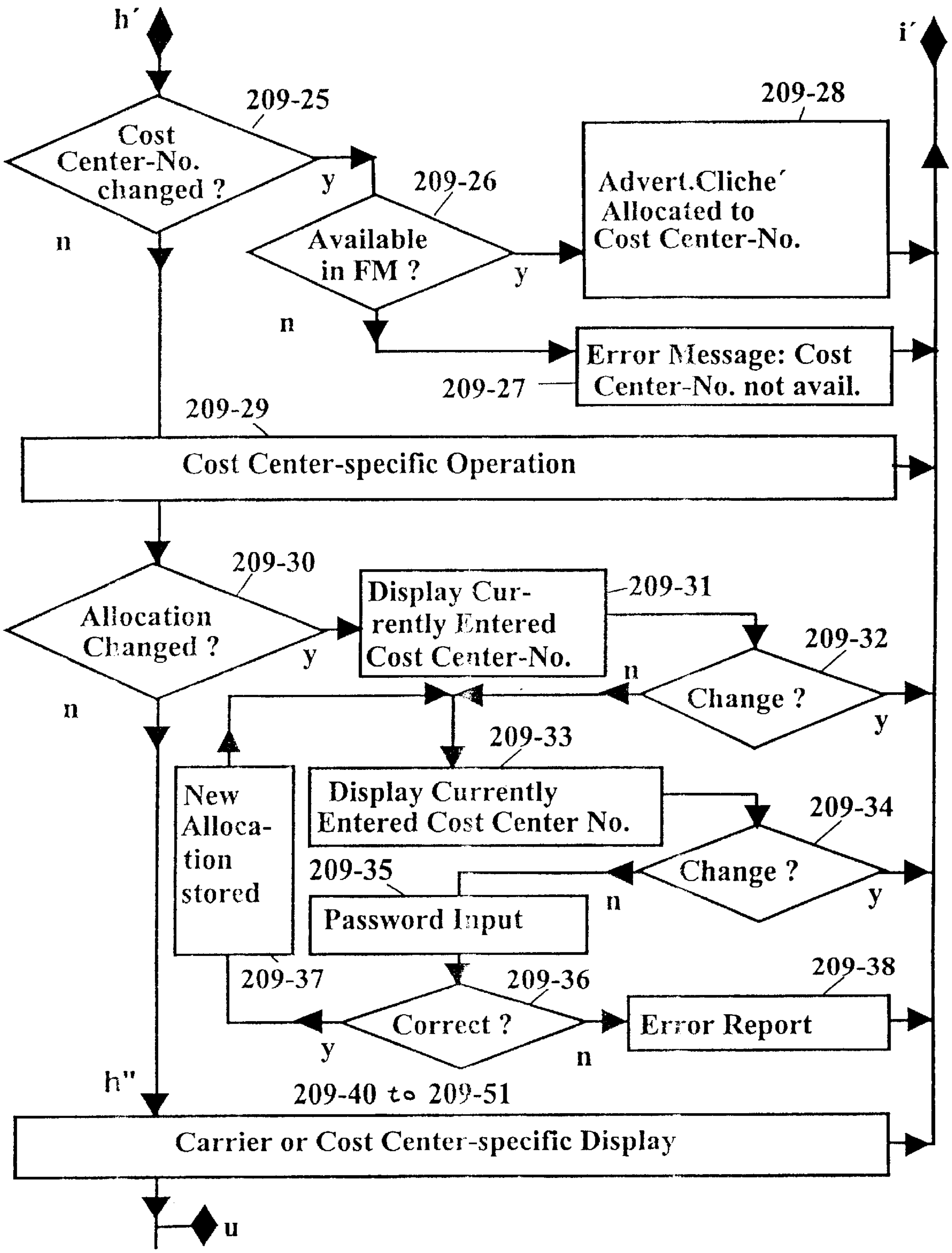

In FIG. 5*b*, an interrogation criterion about a change of cost center number is inventively satisfied in the sub-step 209-25 when a corresponding scanning of the mail within the framework of the input routine has ensued in order (first step 201 in FIGS. 3 and 4*b*) to enter cost center information for calculating purposes automatically into the postage meter machine. As a result of the interrogation in the sub-step 209-25, a sub-step 209-26 is reached when the cost center was modified. The availability of the cost center number is checked here. It is possible that a cost center number was deleted. Then a corresponding error message ensues in a sub-step 209-27 and a branch is subsequently made back via the sub-step 209-20 to the point t. Otherwise, a branch is made from the 26th sub-step 209-26 to a sub-step 209-28 when the availability of the cost center number is established. An advertising slogan allocated to the cost center number is automatically set in the sub-step 209-28. Cost-center specific operation 209-29 then is conducted.

An interrogation about a requested change of the allocation between cliché and cost center number ensues in a sub-step 209-30. If such a change has occurred, a branch is made to a sub-step 209-31 for displaying the currently input cost center number and, after the confirmation thereof, a branch is made to an interrogation step 209-32. If no confirmation previously ensued, then a branch is automatically made back via the sub-step 209-20 to the point t after a time lapse. There is then the possibility in the sub-step 209-7 of selecting a different imprint with the input of an imprint number before the aforementioned interrogation steps are run again up to the interrogation in the sub-step 209-30. Given confirmation with, for example, a specific acknowledgment key of the cost center number, a branch is made from the interrogation step 209-32 to the sub-step 209-33. The previously allocated cliché number is displayed in the sub-step 209-33, which identifies the semi-variable window data for an advertising slogan to be embedded into carrier-dependent frame data. After confirmation, a sub-step 209-35 is reached if, in an interrogation step 209-34, it was not found that a change was not acknowledged, this in turn then again automatically leading to the branch back to the point t via the sub-step 209-20 after a time lapse. This makes it possible to again select another imprint in the sub-step 209-7 (FIG. 5*a*). After executing the sub-steps 209-8 and 209-16, 209-20 209-1 through 209-23 that leads to the point h or h' in FIG. 5*b*, and after the sub-step 209-25 with the interrogation criterion about a change in cost center number—which of course, is not met—the sub-step 209-30 is again reached for asking about a desired change of the allocation between imprint and cost center number. After executing the sub-steps 209-31, 209-32, 209-33 and 209-34, a sub-step 209-35 comprising a password input routine is reached when the imprint setting in the 33rd sub-step 209-33 was confirmed after the display of the imprint number.

If an incorrect password was entered in the aforementioned sub-step 209-35, this is determined in the interrogation step 209-36 and, after an error message, a branch is made back to the point t in an interrogation step 209-38. If, however, it is found in the interrogation step 209-36 that the password input was correct, then a sub-step 209-37 is reached in order to then store the new allocation and to then branch to the imprint number display in the sub-step 209-33 or to the imprint number display in a separate sub-step (not shown) in order to then branch back via the sub-step 209-20 for resetting the loop counter to the point t. The new allocation to the cost center number has thus been entered into the postage meter machine and now continues to be available.

A number of other interrogation steps that must be executed before the point u is reached are arranged between the interrogation sub-steps 209-25 and 209-30 shown in FIG. 5*b*; for reasons of space, however, these have been shown as only sub-step 209-29 in FIG. 5*b*. A program and memory regions for executing cost-center-related operations is provided in an area of the special cost center memory 9. Thus, in addition to a basic cost center with the number zero allocated to the respective carrier, additional cost centers can also be setup or deleted under numbers other than zero. Values and piece numbers of individual cost centers other than that with the number zero can be edited or deleted without the security against manipulation being thereby affected. The carrier-related basic cost center with the number zero contains a sum of values of cost centers.

Figure 5C:
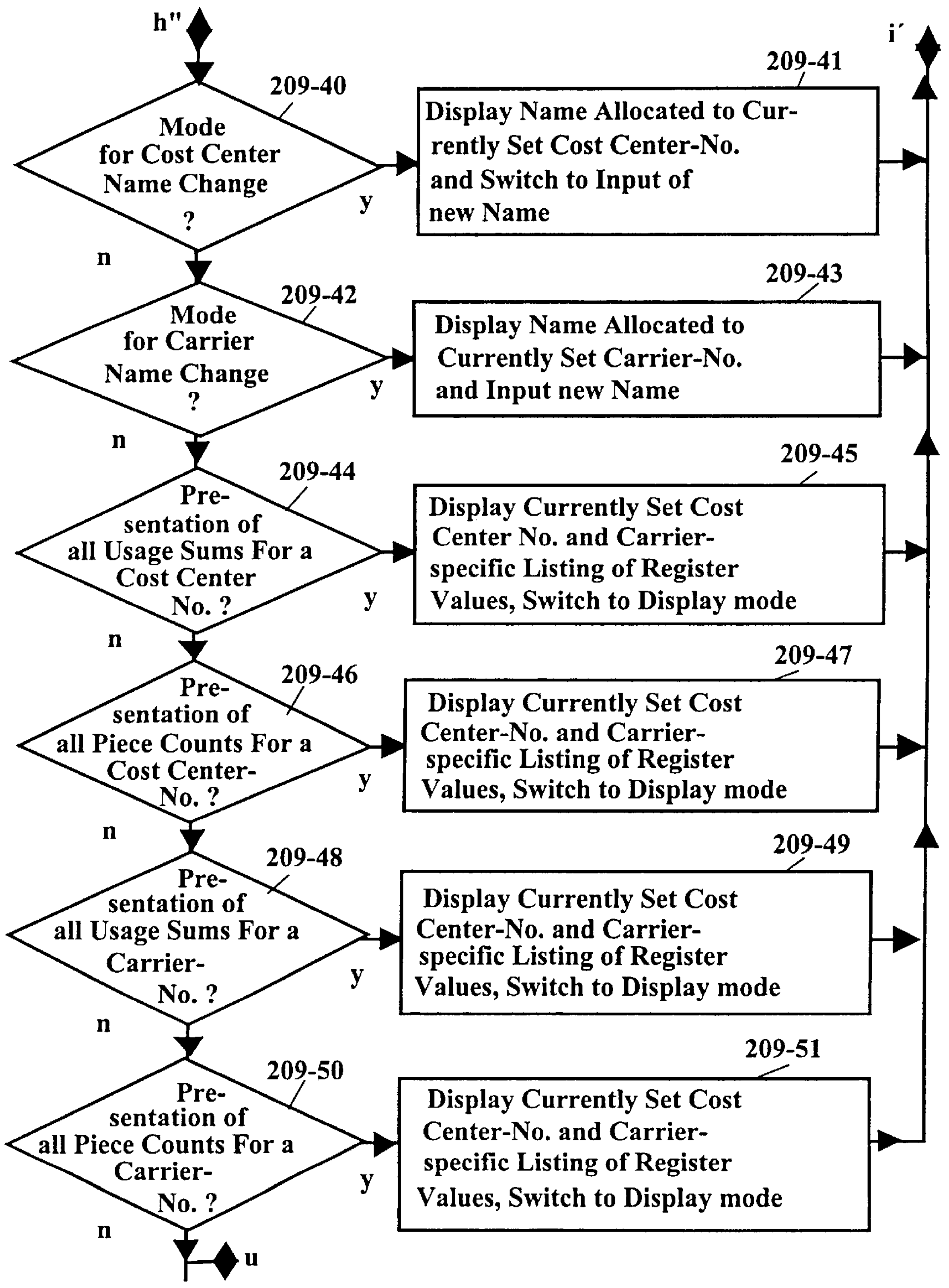

A number of further interrogation steps that must be executed but that were shown as sub-steps 209-40 through 209-51 in FIG. 5*c* for space reasons is arranged between the point h" of the interrogation step 209-30 shown in FIG. 5*b* and point u.

For simpler input, an allocation of numbers to the names of cost centers, or carriers ensues, as shown in FIG. 7*c*. Inventively, the name of the cost center which is standard among the departments of the office 21 can be modified if this should become necessary. When a corresponding input ensues, then this is recognized in the interrogation sub-step 209-40 and, after display of the allocated, currently set number, a switch is made to the input routine of the new name (sub-step 209-41). The carrier names which are standard among the carriers can also be modified if this should become necessary. When a corresponding input ensues, then this is recognized in the interrogation step 209-42 and, after display of the allocated, currently set number, a switch is made to the input routine of the new name (sub-step 209-43). The advantage is particularly useful given a large number of cost center names and/or carrier names.

Inputs in conjunction with operations related to cost centers can be interrogated in the aforementioned sub-step 209-29 in a way that is not shown in FIG. 5*b*. After selection of registers, a display of the stored values or item numbers ensues in the display mode 215 (FIGS. 2, 3 and 4*b*).

Further, the display of all used sums for an individual cost center can be useful in order to allow an overview given a plurality of private carriers. A production of the listing ensues for preparation of the display in the display mode 215. The listing ensues on the basis of a corresponding input. The storage thereof in the pixel memory 7*c* ensues for an internal printout of the postage meter machine. The printout likewise ensues on the basis of a corresponding, other input that, however, need not be explained in detail here.

A presentation or display of all carrier-related used sums for the cost center number that has been set is preceded by a corresponding input. When a corresponding input ensues, then this is recognized in the interrogation sub-step 209-44, and, after display of the allocated, currently set cost center number, a switch is then made to the listing routine for the selected register (sub-step 209-45).

A presentation or display of all carrier-related piece numbers for the cost center number that has been set is again preceded by a different, corresponding input. When a corresponding input ensues, then this is recognized in the interrogation sub-step 209-46, and after display of the allocated, currently set cost center number, a switch is then made to the listing routine for the selected register (sub-step 209-47).

A presentation or display of all carrier-related used sums is likewise enabled for all available cost center numbers when an interrogation sub-step 209-48 and a sub-step 209-49 are executed or, a presentation or display of all carrier-related piece numbers is enabled when an interrogation step 209-50 and a sub-step 209-51 are executed.

When an interrogation criterion is satisfied, a branch is made back via the aforementioned sub-step 209-20 to the point t at the input of the second step 209. In the sub-step 209-2, a display with an input possibility in the first sub-step 209-1 subsequently ensues, whereby a user specific input set can be advantageously utilized in order to enable a number of different inputs. A suitable user specific input set is disclosed in the aforementioned European application 94 120 314.3.

Figure 6A:
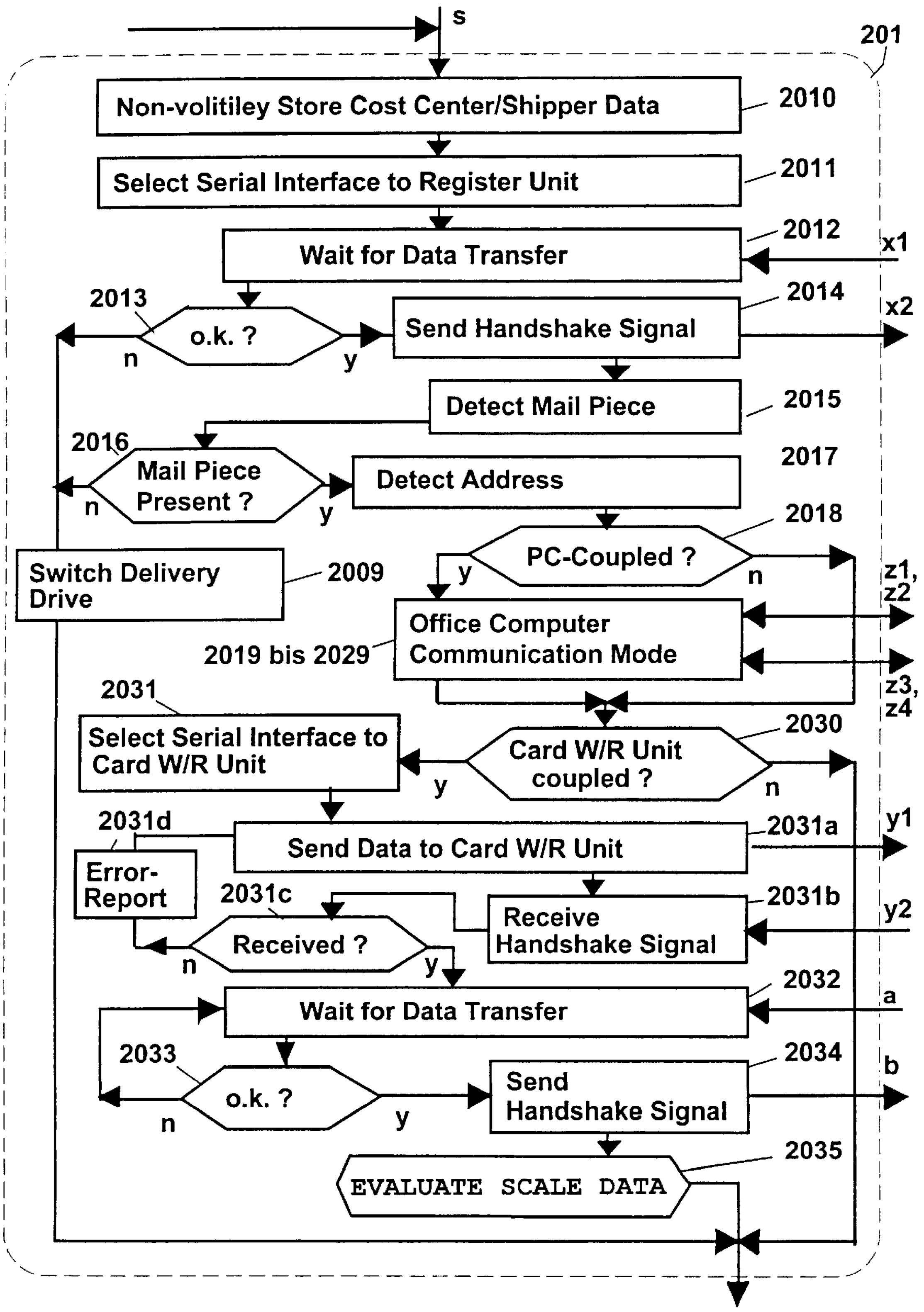
FIGS. 6*a* and 6*b* together from a flowchart for an automatic data entry in accordance with the invention on the basis of the scanned letter recipient address.
Figure 6B:
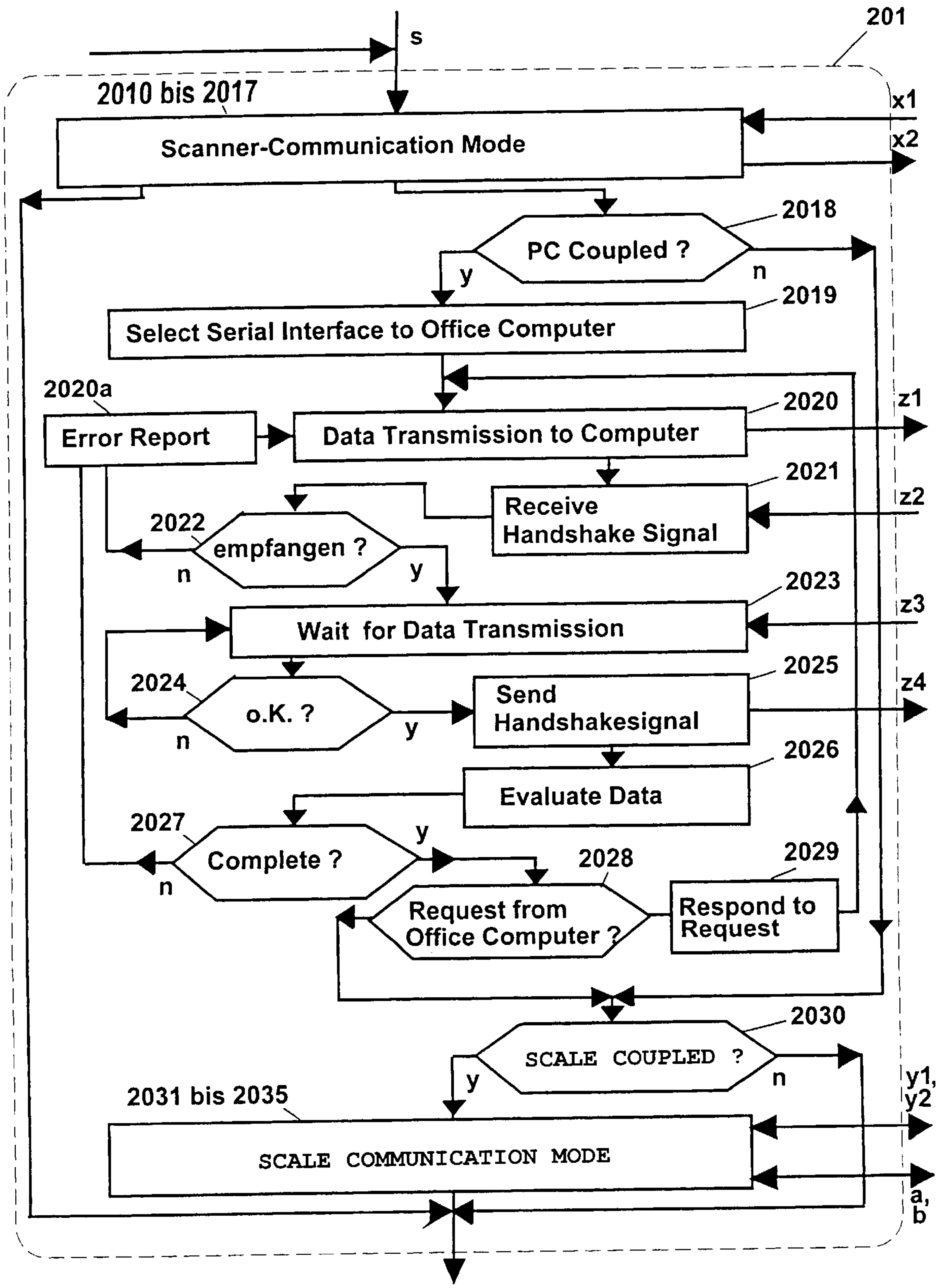

FIGS. 6*a* and 6*b* show a flowchart for an automatic data entry on the basis of the scanned letter recipient address. The first step 201 of the postage meter machine system routine 200 can be subdivided into a number of a communication modes. A chip card communication mode (sub-steps 2019 through 2027) that is not shown in detail in FIGS. 6*a* and 6*b* can also be included, whereby the chip card, for example, is employed as a key card. According to the version of the mail shipping system shown in FIGS. 2, 3, 4*a* and 4*b*, a communication connection exists (or can be set up) to each personal computer in the office 21. Sub-steps 2010 through 2016 for a scanner communication mode, sub-steps 2019 through 2029 for an office computer communication mode, and sub-steps 2031 through 2035 for a scale communication mode are executed in the first step 201.

First, a routine ensues in the sub-step 2010 that non-volatilely stores the cost center and/or shipping data, including carrier data, as prior data so that these data are available as comparison data when a decision is to be made whether a modification of individual data has ensued on the basis of an automatic data input. A deletion of the old, aforementioned data in the main memory of the postage meter machine takes place in connection therewith. In the following sub-step 2011, a serial interface is selected in order to then receive data x1 from one of the scanners (postal matter sensor 16) in the following sub-step 2012 before a branch is made to an interrogation sub-step 2013. In the interrogation step 2013, a branch is made to a sub-step 2014 when a data transmission has ensued in order to send a handshake signal to the aforementioned register unit 19 to which the aforementioned sensor together with other sensors is connected. From the interrogation step 2013, a branch is made via the sub-step 2009 to the sub-step 2040 when no sensor data were received. After sending the handshake signal to the aforementioned sensor, a detection of a piece of mail ensues in sub-step 2015. When the sensor 16 functions according to a mechanical working principle, the appertaining bit merely has to be stored in the simplest case. If the sensor 16 works according to an optical principle, this can ensue on the basis of a relatively simple image evaluation. When a recognition of a piece mail which is present in the delivery path has ensued, a branch is potentially made from the interrogation step 2016 to a sub-step 2017 for evaluating the other scanned data. It can be required, given a marking in the form of a bar code, to move the piece of mail further forward before an evaluation succeeds. Particularly given a version with a complete or partial image evaluation (bar code) in the postage meter machine, the completeness of the scanned data must be assured before an evaluation. If the data required for the detection, i.e., for finding and evaluating, are incomplete—this being determined in interrogation sub-step 2008–, a branch is made back to sub-step 2012 as a reaction thereto in order to wait for a further data transmission from the sensors via register unit 19 and data line 18. Otherwise, a branch is made directly to the next interrogation sub-step 2018. In a preferred version, the evaluation in the sub-step 2017 includes the detection of the mail (letter) recipient address.

If a recognition has not ensued, i.e., given the lack of a piece of mail in the delivery path, a branch is made from the interrogation sub-step 2016 to the sub-step 2040 for the purpose of calling stored, current data. Neither a chip card communication mode nor a scale communication mode is then executed. Further, a sub-step 2009 is executed in order to switch the delivery drive (not shown) off, i.e., to control motors in the delivery means (not shown) such that these motors are shut off as warranted when a piece of mail to be transported is not found in the delivery path given another run of the system routine 200. Only the input/display routine with print data input is then active and this enables a manual input or presetting of the postage meter machine. At the beginning of the first step 201 of the system routine 200, a number of sub-steps 2001 through 2007 (not shown separately) is again provided so that the operation of the peripheral devices in the mail center and parts of the appertaining conveyor means in the base can sequence controlled by the postage meter machine.

As noted above, an office computer communication mode (sub-steps 2019 through 2027) is also executed. A corresponding interrogation sub-step 2018 proceeds this office computer communication mode.

In all of the aforementioned versions, sub-steps 2031 through 2035 are executed for a scale communication mode when a scale coupling is found in the leading interrogation step 2030.

A serial interface is selected in sub-step 2031 in order to then undertake a data transmission y1 from the postage meter machine FM to the scale 22' in the following sub-step 2031*a*. This data transmission y1 includes the transmission of the carrier identification number CIN. When a data transmission has ensued, a handshake signal y2 sent from the scale 22 is received in the following sub-step 2031*b* and a branch is then made to the sub-step 2031*c* in order to produce an error message in the following sub-step 2031*d* and to branch back to the sub-step 2031*a* if no handshake signal was received from the scale 22'. Otherwise, a wait takes place in the following sub-step 2032 for a data transmission a from the scale 22 before a branch is made to an interrogation step 2033. In the case of the second version according to FIGS. 4*a* and 4*b*, this data transmission a contains the postage value that was determined externally of the postage meter machine FM according to the CIN transmission.

In the case of a first version according to FIGS. 2 and 3 with a postage calculation internally in the postage meter machine FM, the sub-steps 2031*a* through 2031*d* can be eliminated. A branch is made directly from the sub-step 2031 to the sub-step 2032 in order to enter at least the weight value determined by the scale 22 into the postage meter machine. The interrogation step 2033 is then reached. When a data transmission has ensued, a branch is made in the interrogation step 2033 to a sub-step 2034 in order to send a handshake signal to the aforementioned scale 22. Without the handshake signal, the scale 22 automatically repeats the data transmission. A branch is made back from the interrogation step 2033 to the sub-step 2032 to wait for the renewed data transmission. An evaluation of the scale data ensues in the sub-step 2035 after the transmission of the handshake signal to the aforementioned scale 22.

When, however, the flowchart shown in FIG. 6*a* is to be utilized for an automatic data input in step 201 on the basis of the scanned address information according to the second version, which applies to the embodiment according to FIG. 4*b*, suitable commands must be utilized in order to ensure that the sub-steps 2031*a* through 2031*d* are not executed. This can ensue in an initialization of the postage meter machine FM by setting a flag.

In the first step 201, the mail-shipping system, which contains a postage meter machine FM having a communication connection to at least one personal computer $PC_a$, $PC_b$, . . . , $PC_m$, $PC_n$ in the office 21, implements the automatic data input relating to the cost center and/or carrier information on-line via the aforementioned communication connection when corresponding request data were previously formed on the basis of the scanned letter recipient address. The flowchart shown in FIG. *6b* for an automatic data input in step 201 illustrates the office computer communication mode. The sub-step 2018 leads to a sub-step 2019 in order to select a serial interface to the personal computer in the office. A data transmission to the computer in the office 21 subsequently ensues in the sub-step 2020. A wait for a handshake signal from the computer in the office 21 takes place in the sub-step 2021 and a branch is then made to the interrogation step 2022. If a handshake signal was not received from the computer in the office 21, a branch is made to the interrogation step 2030. Such a case can occur when an office computer is turned off. If a handshake signal is received, a branch is made to the sub-step 2023 in order to wait for a data transmission from the computer in the office 21. IF and when this has ensued (sub-step 2024), a handshake signal is sent to the computer in the office 21 (sub-step 2025). Otherwise, a branch is made back to the sub-step 2023. An evaluation of the data ensues in the sub-step 2026 when the handshake signal was sent to the computer in the office 21 (sub-step 2025). If the data transmission was not terminated or was possibly, incomplete, then a branch is made back via the sub-step 202*a* for the error message to the sub-step 2020 for the data transmission of request data to the computer in the office 21. An interrogation as to whether the data transmission has been completed ensues in the sub-step 2027.

The sub-steps 2019 through 2027 for an office computer communication mode can also be expanded by further sub-steps 2028 and 2029 that implement the answering of an electronic message for a listing for a department-related accounting. A check is made in the sub-step 2028 to determine whether, in the evaluation of the data in the sub-step 2026, a corresponding request in the form of an electronic message was emitted by the personal computer in the office 21, before the request is processed in the sub-step 2029. A branch is then made back to the sub-step 2020 in order to implement a renewed communication until the message has been appropriately processed.

FIG. *7a* shows a flowchart for the franking mode given carrier-related and cost-center-related processing of accounting data. When no determination of a keyboard actuation or some other input request ensues in sub-step 401, a loop counter is incremented in sub-step 402 and an interrogation step 404 is reached. When a predetermined limit number G is reached by the loop counter, then a standby flag is set.

The standby mode is reached when no input or print request ensues over a predetermined time. The latter is the case when a known letter sensor (not shown in detail) does not detect a next envelope to be franked. The step 404 (shown in FIG. *7a*) in the franking mode 400 therefore also includes a further interrogation for a time lapse that, when the time (based on a loop count) is exceeded, ultimately leads back to the point t, and thus to the input routine according to the step 209. When the interrogation criterion is satisfied, a standby flag is set as in step 408 and a branch is made back to the point t without running the accounting and printing routine in step 406. The standby flag is interrogated later in the step 211 (see, for example, FIG. *4d*) and, after the check sum inspection in step 213, is reset if no manipulation attempt was recognized. The interrogation criterion in step 211 therefore is expanded by the question as to whether the standby flag is set, i.e., whether the standby mode has been reached. In this case, a branch is likewise made to step 213. The advantage of this procedure is that every attempt at manipulation is statistically acquired in step 213 before a branch is made back to the system routine at point s.

It is thus assured that the last input quantities are also preserved when the postage meter machine is shut off, so that, after it is again turned on, the postage value in the value stamp is automatically prescribed according to the last input before the postage meter machine was shut off and the date is automatically prescribed in the postmark according to the current date.

If a scale 22' that calculates the postage value is connected, the postage value is taken, for example, from a memory area of the EEPROM 5*b*. A check is made in step 401 to determine whether an input is present. Given a renewed input request in step 401, a branch is made back to step 209.

Otherwise, a branch is made via the steps 402 and 404 for incrementing a loop counter and for checking the number of runs through steps 405*a* and 405 in order to interrogate the print output request that is recognized by a standard mail sensor 16.1 upon introduction of a sheet of paper into the printing region upon a printer request. This mail sensor 16.1, for example, is connected to the register unit 19, just like the sensor 16, but is mechanically arranged in the proximity of the printing area and is also interrogated later in the sequence of method steps than the sensor 16. The letter to be franked is detected with the aforementioned mail sensor 16.1 and a print request is triggered after a time lapse. A branch can thus be made to the accounting and printing routine in step 406. When no print output request (step 405) is present, a branch is made back via the steps that lie at the start of the system routine, i.e., the between the point s and the point t, to the step 201 lying after the point t.

A communication request can be made or some other input according to the steps for data modification 209, test request 212, register check 214 as well as input request 401 at any time before the step 301 is reached. As shown in the version of FIG. *7a*, steps 401 through 404 are again run. Given a predetermined number of runs, a branch is made from the step 404 to the step 408. The alternative interrogation criterion can be interrogated in the step 405 in order to set a standby flag in the step 408 if a print output request is not yet present after a predetermined time. As already explained above, the standby flag can be interrogated in the step 211 following the communication mode 300. A branch is thus not made to the franking mode 400 before the check sum review has yielded the completeness of all or of at least selected programs.

When a print output request is recognized in the step 405, further interrogations are actuated in the following steps 401 through 420 as well as in step 406. For example, the presence of authentic register values is interrogated in step 409, and reaching a further piece number S criterion is interrogated in step 410, and the registered data involved in a known way for accounting are interrogated in the step 406. As already explained with reference to FIG. 5*a*, moreover, a securing of selected registers in the NVRAM of the postage meter machine is implemented by MAC formation. When the number of items predetermined for franking was used in the preceding franking, i.e., the number of pieces S is equal to 0, a branch is automatically made from step 410 to the point u in order to enter into the communication mode 300 so that a new, predetermined piece number S can be credited from the data center. When, however, the predetermined number of pieces was not yet used, a branch is made from the step 410 to the accounting and printing routine in step 406. A special sleeping mode counter is initiated to count one counting step more in step 406, i.e., during the accounting routine ensuing immediately before printing. The number of printed letters and current values in the postal registers are likewise registered in non-volatile memories 5*a* and 5*b* of the postage meter machine according to entered cost center in the accounting routine 406, and are available for a later interpretation.

The register values can be interrogated as needed in the display mode 215. It is likewise provided that the register values or other service data can be printed out with the printer head 1 of the postage meter machine for accounting or monitoring purposes. This, for example, can likewise ensue like the normal printing of the postage stamp, with, however, a different frame for fixed image data being selected at the start. The variable data according to the register values stored in the non-volatile memories 5*a* or 5*b* in the cost center memory 9 being inserted into this frame, similar to that already disclosed in German OS 42 24 955 for the formation and presentation in three multi-line information groups, or for a required switching into a corresponding mode. If a rotated presentation is requested, the data, contrary to the specific teaching in German OS 42 24 955, can already be directly deposited turned in the volatile memory, as required for the printing. The time-consuming routine of rotating the print data is only implemented once by the manufacturer for an additional picture element data file when the slogan/advertisement memory 10 is programmed, this merely requiring more memory space but no enhanced calculating performance in the postage meter machine.

Figure 7A:
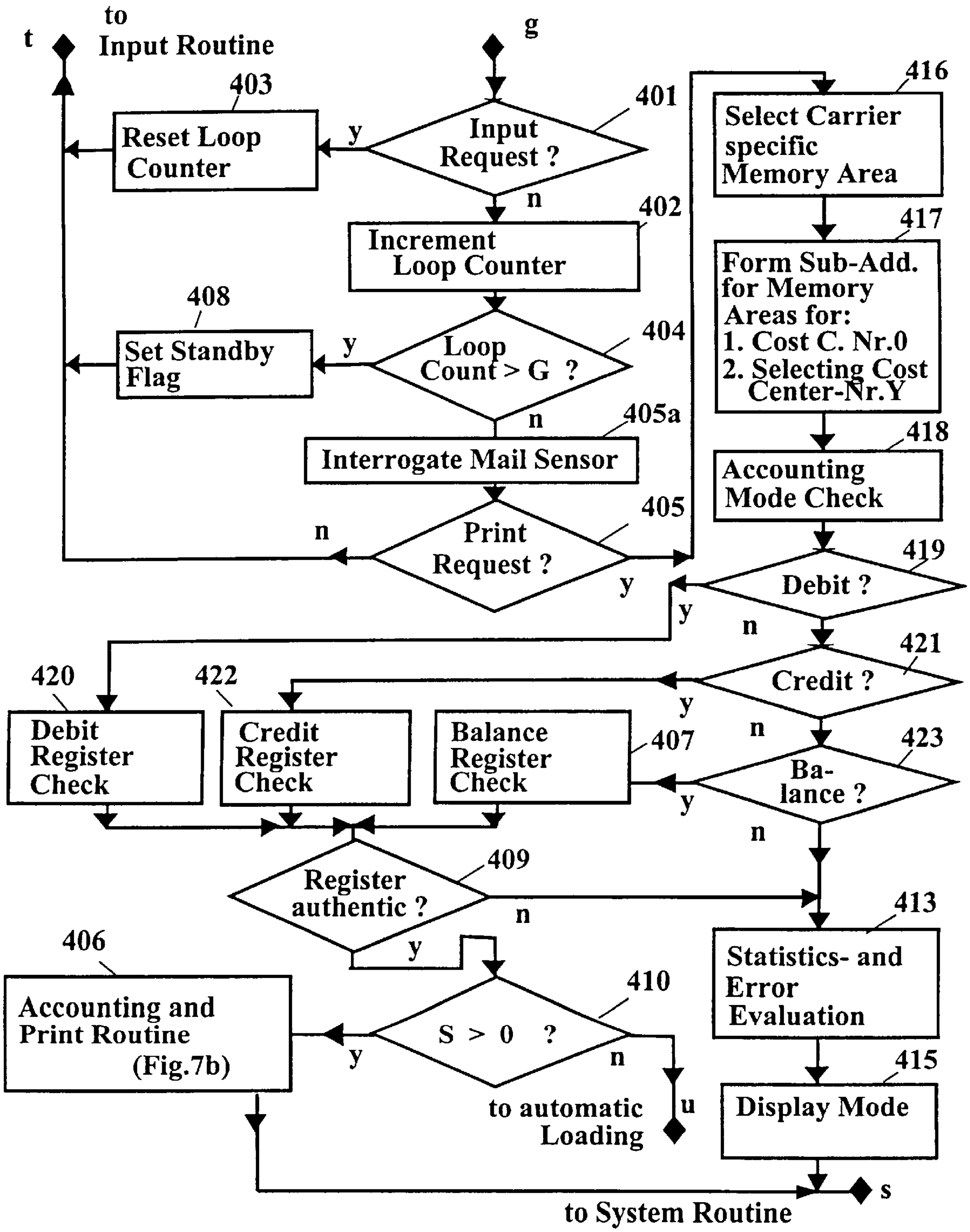
FIG. 7*a* is a flowchart for the franking mode with a carrier and cost-center-related processing of accounting data in a postage meter machine constructed and operating in accordance with the principles of the present invention.

The carrier and cost center information are employed for accounting in the franking mode 400 shown in FIG. 7*a*. When a print output request is recognized in step 405, the carrier-specific memory area is selected (step 416), and step 417 is then reached in order to form sub-addresses for the memory areas of, first, a cost center number 0 and, second, the selected cost center number that was set different from 0 (such as cost center No. Y) for the department-related accounting. An accounting without being split into individual cost centers or departments ensues under the cost center number 0 for the sum of all cost centers for the respectively selected, individual carrier m (with m=1 through I).

The step 417 for forming sub-addresses is required for selecting the memory areas during the accounting. An MAC protection is placed over all postal registers to be updated in each accounting, this being required in order to decide in the interrogation step 409 run later whether the register values are authentic. Since such a check is extremely time-consuming, particularly when the DES algorithm is employed for encoding the check sum, the only purpose for which this check is always implemented is for the accounting of the postal registers to be updated. This check therefore ensues in the aforementioned interrogation step 409 parallel to proceeding steps, the step 420 for a debit register check, the step 422 for a credit register check or the step 407 for a balance register check. Such a balance register check is disclosed in German application No. 195 34 530.4, corresponding to the aforementioned co-pending U.S. application Ser. No. 08/525,923. A further step (not shown) for checking the value card register can likewise possibly be included among the aforementioned, parallel preceding steps.

The debiting on a special chip card (similar to a telephone card or credit card) brought into contact with the postage meter machine FM and edited by a number of carriers takes place in another accounting version. Here, a prepaid amount is maintained as an electronic balance in the balance account of the chip card and is reduced by the postage value to be franked in the case of an intended franking. At the same time, a transfer of the debited postage value ensues into the accounting unit of the postage meter machine. The debiting with such a value card, which functions as an electronic purse, can ensue until the electronic purse is empty. The refilling of the value card ensues in special bank terminals in a remote credit institute up to a predetermined amount. When the refilled value card is brought into contact with the write/read unit of the postage meter machine, a communication with a special program module of the postage meter machine ensues. Both program module and value card generate crypto codes that are exchanged. The crypto codes are communicated from the postage meter machine to a data center of the postage meter machine manufacturer by modem. At the end of the day, preferably during the night, both of the aforementioned crypto codes and the data sets for every individual entry are communicated for checking to an inspection group of the remote credit institute.

The accounting mode is checked in a step 418 in order to form sub-addresses following the aforementioned step 417. If an accounting on the basis of a debit balance is present, then a branch is made from interrogation step 419 to a step 420 for debit register checking. When an accounting on the basis of a credit balance is present, then a branch is made from the interrogation step 421 to a step 422 for credit register checking. When, however, a standard crediting on the basis of a prepaid balance is present, then a branch is made from the interrogation step 423 to the step 407 for balance register checking. When, alternatively, an accounting on the basis of a prepaid balance in a value card is present, then a branch is correspondingly made from an interrogation step 425 to a corresponding step 426 for balance register checking in a value card. A check preferably ensues on the basis of the co-stored MAC. Interrogation step 409 is then reached and a branch is made if necessary to error interpretation step 413. A manipulation with fraudulent intent can only be precluded given authentic register data. Via step 410, the step 406 with the accounting and printing routine is then reached.

Figure 7B:
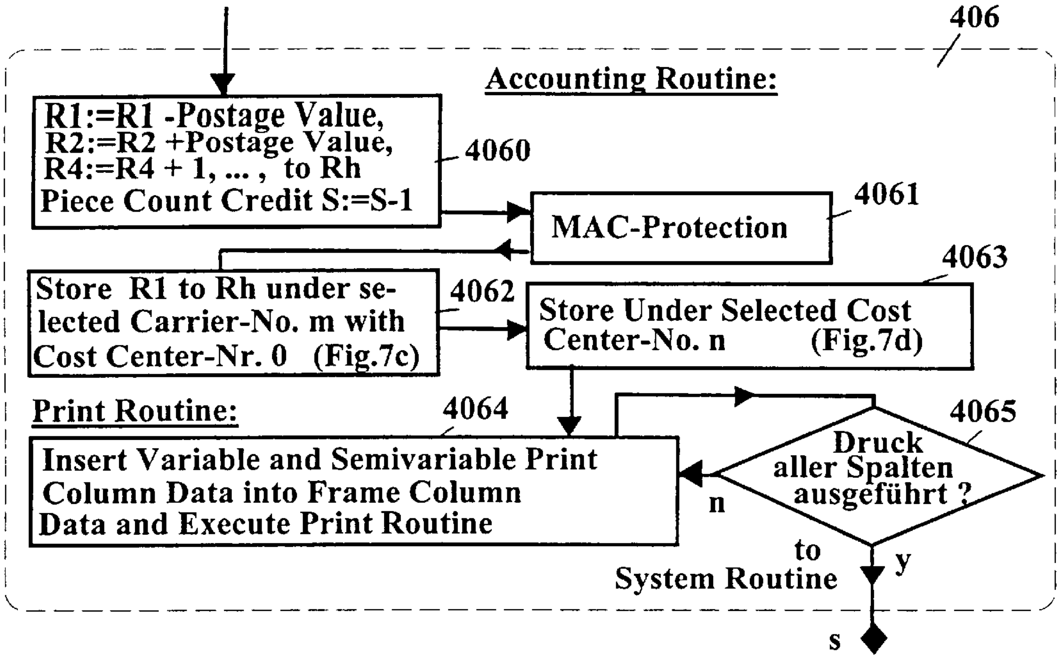
FIG. 7*b* is a flowchart for the accounting and printing routine in franking mode with carrier and cost-center-related accounting in a postage meter machine constructed and operating in accordance with the principles of the present invention.

The sub-flowchart for the accounting and printing routine in franking mode with carrier-related and cost-center-related accounting is shown in greater detail in FIG. 7*b*. A MAC protected postage value can be checked on the basis of the appertaining MAC in franking mode 400 at the beginning of the accounting routine (FIG. 7*a*). A check sum formation over the postage value and the encoding thereof then ensues. When the result is identical to the MAC value, one can assume the validity of the postage value and the actual accounting procedure can then be started. With an accounting unit that cannot be manipulated, a register R2 is incremented by the postage value in sub-step 4060 and another register R1 is reduced by the postage value. A comparable accounting ensues with the piece number data. An attachment of the MAC protection in sub-step 4061 also ensues after the accounting. In sub-step 4062 a storing then ensues under the selected carrier number and the cost center number 0. The storing under the department-related, selected cost center number n (with n=1 through k) additionally ensues in the cost center memory 9 in sub-step 4063. Only then is the printing routine with the sub-steps 4064 and 4065 reached.

FIG. 7*c* shows the result of the carrier-related accounting in the postal registers implemented in the manipulation-proof accounting module. In FIG. 7*c* (and in FIG. 7*d* as well)

the designation "KST" stands for "cost-center." A listing of postal register values Ri (with i=1 through h) for each carrier m (with m=1 through I) which is present in the memory area. When, for example, the postage meter machine operator has selected an accounting version with value card, an amount is first transferred from the value card into one of the registers R80 and the piece number for the bookings is counted in one of the registers R81 proceeding from 0. Independently of the selected cost center number, a booking in the registers R80 and R81 is undertaken in a carrier-specific manner in addition to the value card registers, whereby the amount from the value card is correspondingly reduced. When, however, the standard accounting from the balance loaded via the data center DC, for example by modem, is selected, then, independently of a selected cost center number, an accounting first ensues in the registers R1 through R8, correspondingly accumulated and related to a selected carrier.

The carriers have a name to which a number is allocated in order to call or set this more easily by pressing a key. The carriers also are identifiable by the carrier identification number (CIN) that is a multi-placed number for exact, automatic identification of the carriers, particularly during a communication with a data center of the postage meter machine manufacturer. This CIN makes it possible to load a set of carrier data into the postage meter machine. Further, a number for each cost center is likewise provided in order to call or set this independently of its name by pressing a key.

FIG. 7*d* shows a two-dimensional cost center/carrier matrix for the used sum amount (postage consumption p) respectively allocated to the cost centers in the ascending register R2 and for the used piece number z respectively allocated to the cost centers in the piece count register R4. A resetting to 0 both for the postage use p as well as for the piece count z ensues periodically or at freely selectable time spans after an accounting and output of a listing for a cost center. The output of such a listing can, for example, ensue as a cost center printout or as a carrier-related printout on a tape by the postage meter machine.

Figure 8:
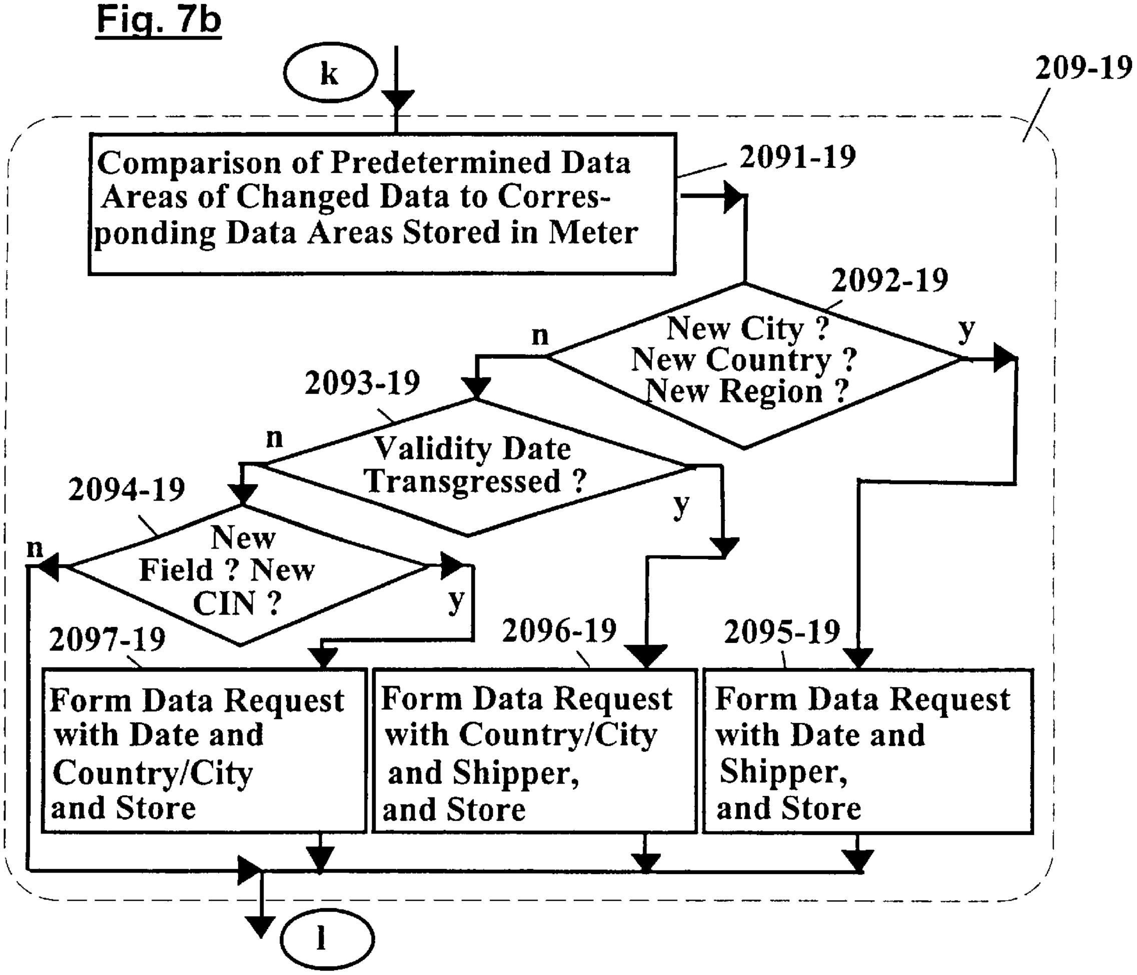
FIG. 8 is a flowchart for forming request data for a data transmission from a data center in accordance with the invention.

The routine 209-19 (shown in FIG. 5*a*) for checking stored data and for forming request data for a data transmission of fee schedule tables and auxiliary data from the data center DC to the postage meter machine is explained in greater detail with reference to FIG. 8. A comparison of predetermined data areas for checking data on the basis of predetermined, corresponding comparison data stored non-volatilely ensues in sub-step 1262 of FIG. 8 in order to be able to identify modifications that have occurred, or have been entered. Specific interrogations ensue in the following sub-steps 2092-19, 2093-19 and 2094-19 in order to form specific request data in the appertaining sub-steps 2093-13 through 2097-13. If the location was changed, whereby the country, the region and/or locality were newly entered, a branch is made from sub-step 2092-13 to the sub-step 2095-13 in order to form and store request data together with the current date and carrier. Transgression of the validity date that is allocated to every carrier-specific table is checked in sub-step 2093-19 in order to then form request data together with the current location and carrier and to store these items. A new entry of a field name is evaluated in sub-step 2094-19, where with tables and information are specifically identified before a branch is made to sub-step 2097-19 in order to specifically form and store request data. A branch is made directly to point I only when no changes were detected in the interrogations 2092-19 through 2094-19.

Such request data can be automatically formed in a constantly run step 209 (FIGS. 3 or 4*b*, 4*d* or, respectively 5) in front of point t and the request data are interpreted in step 301 according to FIGS. 3, 4*b* or 4*d* as communication requests in order to enter into a communication mode.

Figure 9:
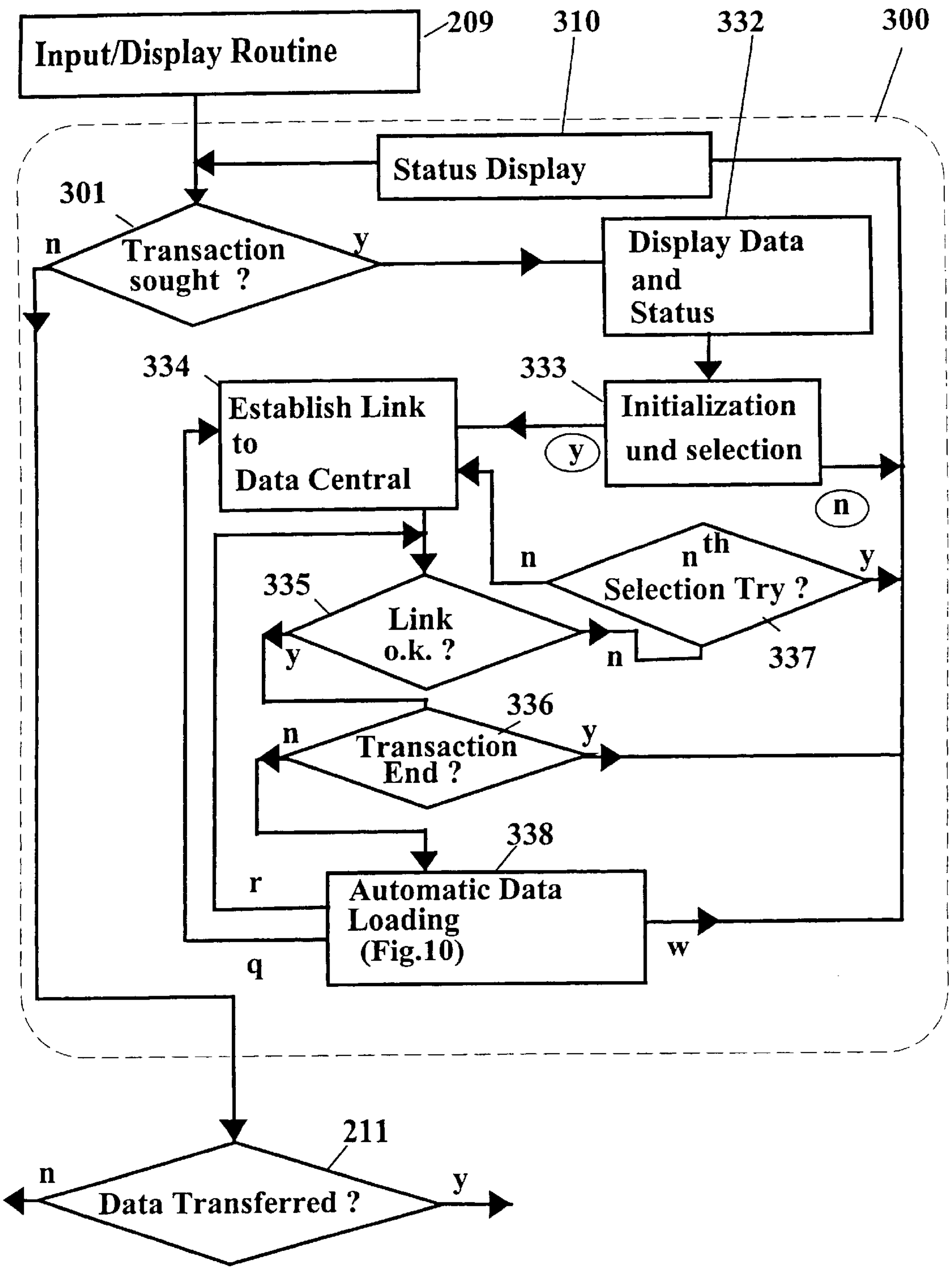
FIG. 9 is a flowchart for the communication mode for a postage meter machine constructed and operating in accordance with the principles of the present invention in order to implement a data transmission.

FIG. 9 shows the communication mode for the postage meter machine that is required in order to implement a data transmission that sequences largely automatically by modem. A recognized transaction request in sub-step 301 of step 300 leads to the display of data and of the status in the sub-step 332 in order, after an initialization of the modem and a selection of the data center (telephone number), to subsequently branch in the sub-step 333 to a sub-step 334 for setting up the connection to the data center. When an initialization of the modem and selection in sub-step 333 cannot be successfully implemented, a branch is made back via sub-step 310 for displaying the status to sub-step 301. A branch is likewise made back to sub-step 301 if it is found in a sub-step 335, after the sub-step 334, that the connection step up did not ensue properly and a determination is made in sub-step 337 that the connection subsequently still can not be setup after the $n^{th}$ redialing.

When, however, the call setup ensues properly and it is found in sub-step 336 that one of the transactions has not yet been terminated, an automatic reloading with data ensues in sub-step 338. Corresponding to the modification of the CIN that is stored in the postage meter machine, a reloading now ensues. If the CIN was not modified by the minimum validity duration for the fee schedules stored in the postage meter machine is transgressed or when a different set of mail carriers was defined, the data center is likewise automatically selected and an updating is accomplished.

A determination is made in sub-step 338 as to whether an error status has occurred that can be eliminated by a renewed connection setup to the data center in order to branch back via point q to the sub-step 334. A further determination is made in sub-step 338 as to whether an error status has occurred that cannot be eliminated in order to branch back via point w to the sub-step 310 for the purpose of a status display. If a transaction has been implemented, subsequent transactions then can be implemented, whereby a branch is made back via point r to the sub-step 335. When the connection is still intact, a check is made in sub-step 336 to determine whether all transactions have been implemented, or to determine whether the last transaction was ended in order to then branch back via the sub-step 310 to the sub-step 301. The flag for a transaction request is reset in sub-step 338 at the end of the last transaction. A branch is thus made from sub-step 301 to step 211 in order now to store and interpret the selected data communicated to the postage meter machine. The value of the transmitted CIN can be automatically classified (according to frequency or priority) in a predetermined way in the interpretation. The type of classification can be set. At least one actuation means is provided in order to set the type of classification. The automatic reloading with data in sub-step 338 includes at least one handling routine that is explained in greater detail in conjunction with FIG. 10.

Figure 10:
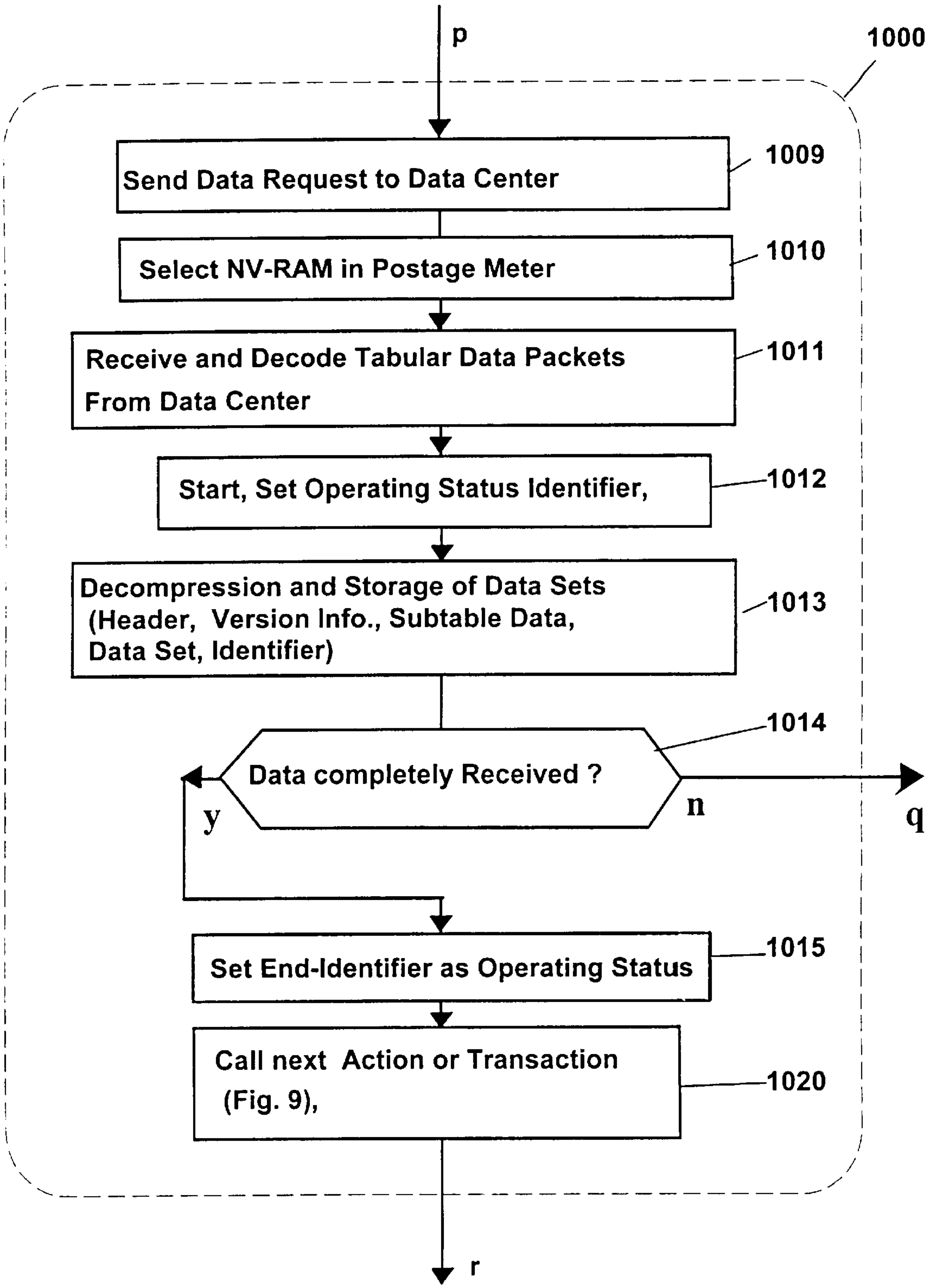
FIG. 10 is a flowchart for a routine for receiving and handling communicated service performance data in a postage meter machine constructed and operating in accordance with the principles of the present invention.

The routine 1000 shown in FIG. 10 for handling communicated table data in the postage meter machine includes a sub-step 1009 for sending request data to the data center. A sub-step 1010 is then implemented in order to select a non-volatile memory area in the postage meter machine in which the requested data can be intermediately stored later. After the sub-step 1010, a branch is made via the sub-step 1011 for receiving and decoding the data packet communicated from the data center to a sub-step 1012 in which a start processing status is set for a data processing. A first processing of the data then ensues in the sub-step 1013. The intermediate storage of the data is advantageous when data are communicated in a number of transactions or when a transaction must be repeated. After departing the communication mode 300, a determination is made in the interrogation step 211—shown in FIG. 3 and 4*b*—that data were communicated and a branch is then made to the statistics and error evaluation mode 213. Given freedom from error and validity of the communicated data, a non-volatile storage in the postage meter machine ensues in the aforementioned evaluation mode. After intermediate storage and, if necessary, after a following decompression given packed data in the sub-step 1013 and after executing further sub-steps 1014, 1015 and 1020, a storage of the data set that belongs to a complete postage fee set of a mail carrier ensues. Such a data set includes a header, version information, sub-table data and an end data set identifier.

In the sub-step 1014 for checking for complete reception of the communicated data packet, a branch is made to a sub-step 1015 given completeness in order to set an end identifier as the processing status. Such identifiers are required in order, even given a program abort, for example due to an interruption of operating voltage, to continue the program at this point after the voltage returns. In the following sub-step 1020, the next transaction or action is called, and thus a branch is made to the further execution of the executive sequence shown in FIG. 9 in order to non-volatilely store the intermediately stored updating data in a step 213 that follows later.

Given an improper execution, which is determined in sub-step 1014, the point q is reached. By branching to the sub-step 334 according to FIG. 9, a further attempt can be started in order to transmit the required sub-table data. The sub-steps 335 through 336 are thereby run and the point p according to FIG. 10 is reached.

Automatic reloading with data in the sub-step 338 includes specific handling routines that go beyond those explained in greater detail in conjunction with FIG. 10. This method disclosed in the aforementioned German application Serial No. 195 49 305.2 and corresponding U.S. application Ser. No. 08/770,525, supplies a location-specific offering of window data for the postage stamp or of auxiliary functions for the postage meter machine, as well as offering current information for permanent and/or temporary configuration of the postage meter machine on the basis of a communication network that contains a memory with the callable data blocks for reloading auxiliary functions and information into the postage meter machine, as well as updating data.

Figure 11:
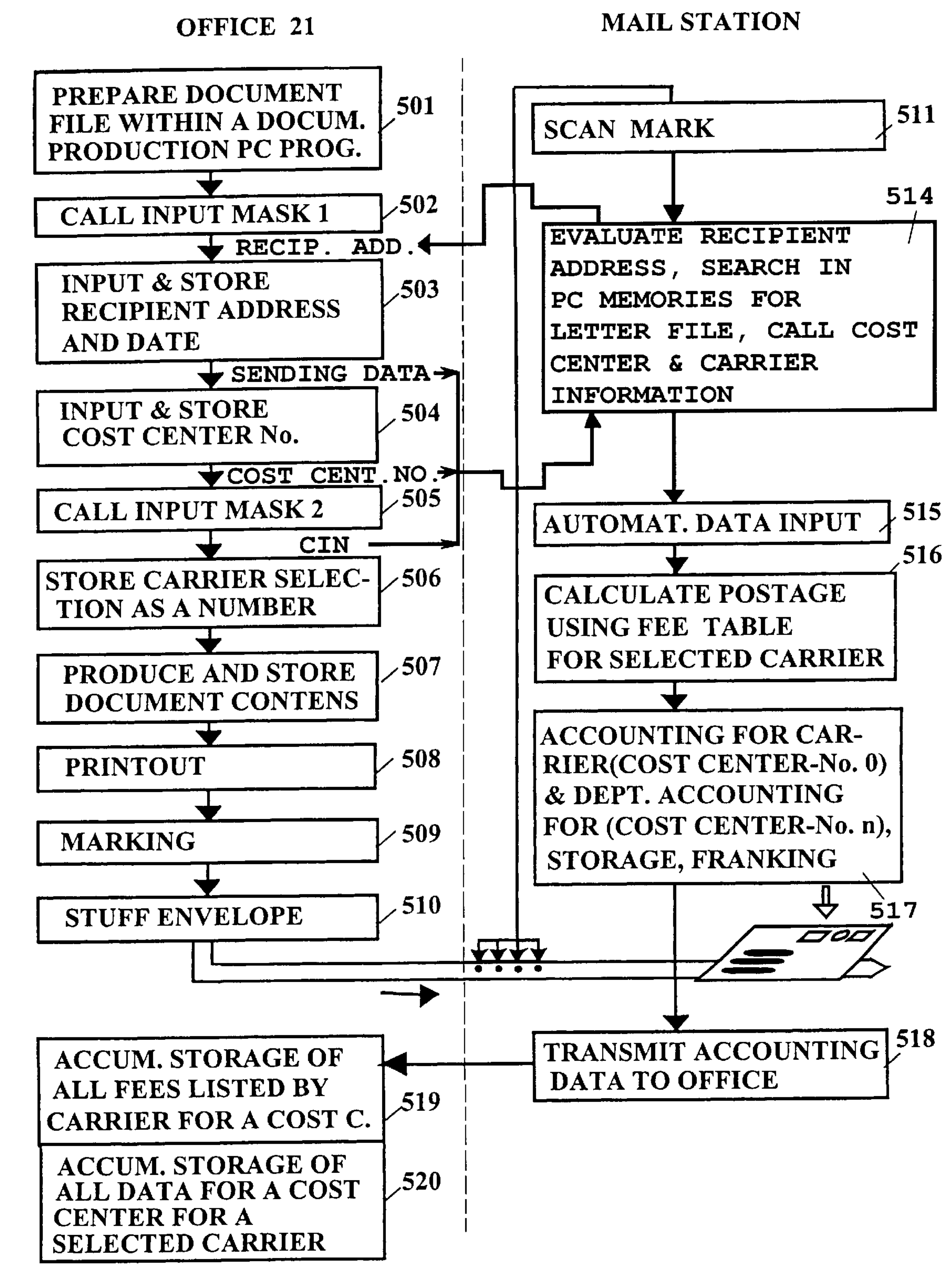
FIG. 11 is a flowchart for a method for operating a mail processing system employing the first embodiment of the inventive postage meter machine.

FIG. 11 shows a method according to a first embodiment of the inventive mail processing system. The method for data processing in a mail shipping system includes a number of steps that are implemented on a personal computer in the office 21 for preparing the printout of a letter together with address field and mark. These steps are as follows:

Step 501: creating a letter file within the framework of a letter production program;

Step 502: call first input mask;

Step 503: input and storing of the recipient address and of the date;

Step 504: input and store cost center number (optional);

Step 505: call second input mask;

Step 506: store carrier selection as number;

Step 507: producing and storing a letter content (optional);

Step 508: printout of the letter and, potentially, of the address of the recipient of the letter on the envelope;

Step 509: marking the letter or cover with a mark (optional);

Step 510: stuffing the letter into an envelope.

In a version of this embodiment a program routine for automatic entry of the cost center number sequences in conjunction with the first input mask in step 504. In another version, step 504 is entirely eliminated. Only the carrier selection is then stored as number and applied on the document, label, letter or envelope.

The addressing ensues either on the letter given printout of the letter in step 508, or in the following step 509. The marking in step 509 includes the calling of programs for the position of the address and/or information corresponding to the postal regulations for the position of the address and/or other information. Such a postal regulation may, for example, prescribe that a bar code be used as a mark identifying the address or the associated postal zip code be applied to a piece of mail (i.e., a letter if visible through a window envelope, or the envelope itself in the form of a separate mark.

Corresponding programs are loaded in the memories of the respective personal computer $PC_a$, $PC_b$ or $PC_c$ that are located in the office 21. In steps 508 and 509, a printer that is shared or separate printers, are correspondingly operated to print the aforementioned areas.

The aforementioned steps 503, 504 and 506 according to the first embodiment are executed in a sequence so that an allocation of the cost center and/or carrier data to the recipient address and to the date automatically ensues during storage of the letter contents in the personal computer, on the basis of a program routine employing the first and second input masks, so that it is not necessary to print the cost center number or the carrier information on the letter or on the envelope. The mark on the letter or envelope which is subsequently interpreted in the mail station contains only information identifying the recipient address. If it is assured, however, that a particular personal computer in the office 21 will be used only by the same department, the cost center number can be automatically appended to the stored letter contents and date.

The following steps are executed when scanning the mark in a mail center and when processing the data as well as when franking with a postage meter machine.

Step 511: scanning the mark;

Step 514: identify recipient address and date as well as access to the memory of the personal computer in order to identify the letter file and in order to call the cost center and carrier information.

Step 515: automatic data input for processing in the postage meter machine, comprising cost center and carrier information as well as a measured weight of the piece of mail;

Step 516: employ postage fee table of the selected carrier for calculating the postage value;

Step 517 first accounting according to a selected carrier m for a plurality of carriers under the cost center number 0 and department-by-department accounting classified according to selected cost center number n.

An optional step 518 is again provided in order, in response to a request, to send accounting data to the office 21. The method for data input into a mail shipping system further including the aforementioned optional steps 519 and 520 that are implemented on the personal computer in the office 21 at the end of a period, or as needed after the franking of a letter.

Figure 12:
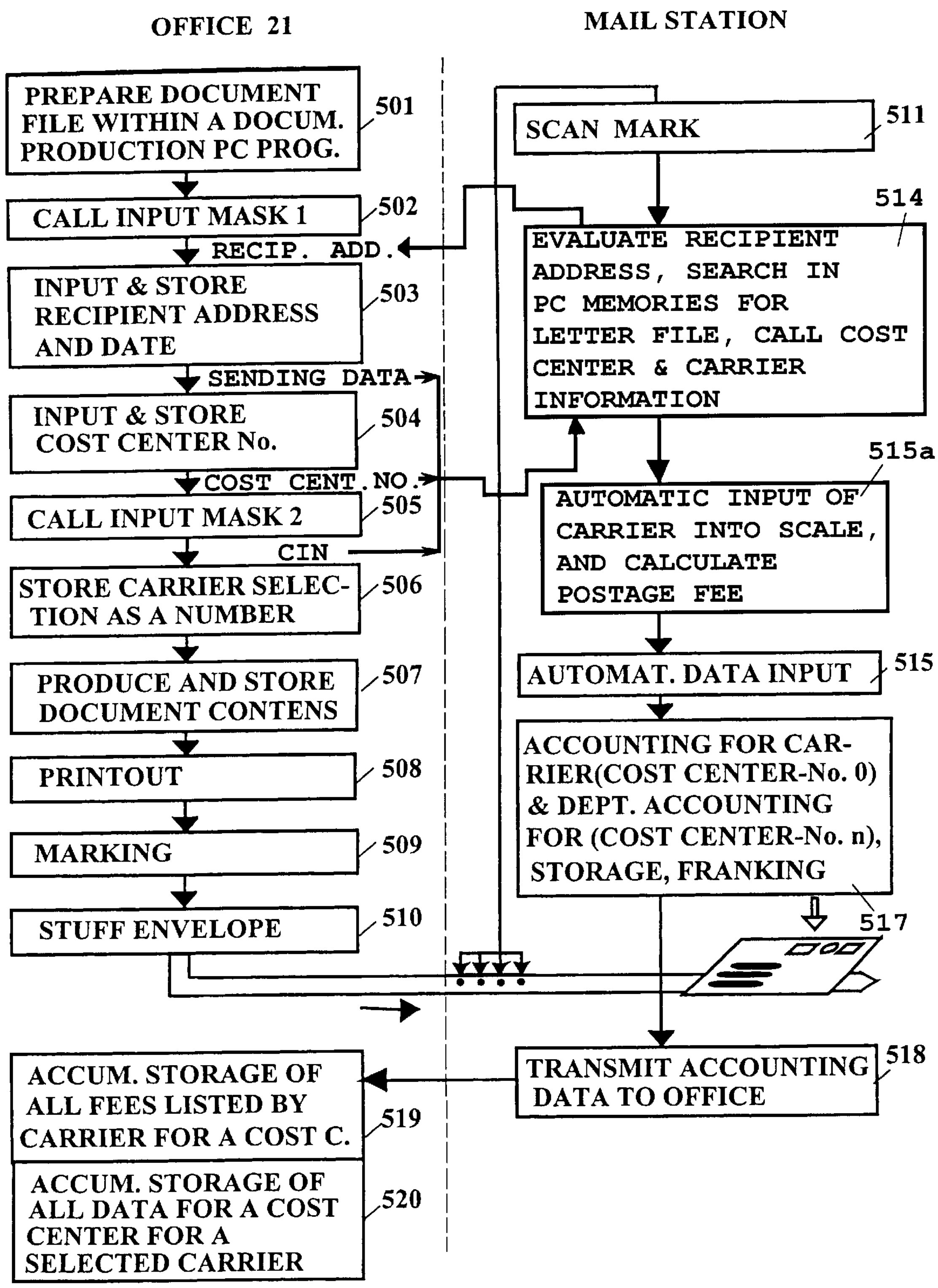
FIG. 12 is a flowchart for a method for operating a mail processing system employing the second embodiment of the inventive postage meter machine.

In a version (shown in FIG. 12) with external postage calculation that, for example, was described in the exemplary embodiment of FIGS. 4*a* and 4*b*, the step 516 for internal employment in the postage meter machine of the postage fee table of the selected carrier is eliminated. In addition to preparatory steps and steps for external postage value calculation, the following steps are provided in the method for data input into a mail shipping system:

Step 511: scanning the mark,

Step 514: identify recipient address and date as well as access to the memory of the personal computer in order to identify the letter file and in order to call the cost center and carrier information, Step 515*a*: automatic data entry for processing in the postage meter machine, including cost center and carrier information as well as the externally calculated postage value, Step 517: first accounting according to a selected carrier m from a number of carriers under the cost center number zero, and department-by-department accounting ordered according to selected cost center number n.

Optionally, the step 518 is again provided in order to send the accounting data to the office on demand. The method for data entry into a mail shipping system can further include aforementioned optional steps 519 and 520 that are implemented on the personal computer in the office 21 at the end of a period, or as needed, after the franking of a letter.

The communication takes place via the communication means, preferably the data line 24, via which the access to the memory of the personal computer is also undertaken in step 514 in order to identify the letter file.

The communication sequences via the communication means, preferably the data line 24 via which the access to the memories of the personal computer is also undertaken in step 514 in order to identify the letter file. Of course, a wireless communication can be alternatively used as the communication means. In a further version, the personal computer containing the relevant letter file is determined via the communication means itself, thereby shortening the search for letter files in the data bank distributed among a number of hard disks of the respective personal computer.

A program routine for the automatic entry of the cost center number is executed in a preparatory step in conjunction with a first input mask that is automatically called in the step 502 following the first preparatory step 502. A PC number for the identification can be advantageously stored allocated to a separate return address or to a cost center number. The appertaining personal computer with the relevant letter file can then be determined via the return address or by the PC number.

The following steps are conducted in the inventive method for data processing in a mail shipping system.

In a first step 201, a detection of a piece of mail in the transport path to the postage meter machine (such as by the sensor 16) takes place with scanning of the return address and/or of the mark for the return address (such as with the scanner 26) in step 511, An interrogation of the personal computer on which a scaled letter was prepared in the office 21 ensues in step 514 via the communication means from the postage meter machine FM for obtaining the cost center number stored allocated to the aforementioned scanned return address. As a result of the interrogation, the cost center number is automatically entered into the postage meter machine FM, and at least non-volatilely stored setting data are called in the step 515 for an automatic print data input into the postage meter machine FM.

A processing routine is executed in a second step 209, including at least one routine allowing for automatic modification of non-volatilely stored setting data, for automatic print data entry and inspection as well as for display, for automatic or manual input this routine contains a sub-routine for allocating a cost center number to a slogan number for automatic input of the slogan number upon entry of the cost center number.

The data are then processed in the franking mode with a cost-center-specified accounting ensuing before the franking.

When scanning the mark for the return address given pieces of mail supplied to the sensor 16 in the transport path to the print head 1 of the postage meter machine FM, the mail piece-producing personal computer in the office 21 can be determined indirectly via the department or company designation in the return address or directly when the contends in the mark includes an identifier (PC No.) for that personal computer in the office 21 that contains the relevant letter file in its memories. A version modified according to FIG. 11 requires a sender identifier indicating the sending department on (pre-printed) letter forms or on envelopes, and the subsequent interpretation thereof (FIG. 13) at the mail station.

Figure 13:
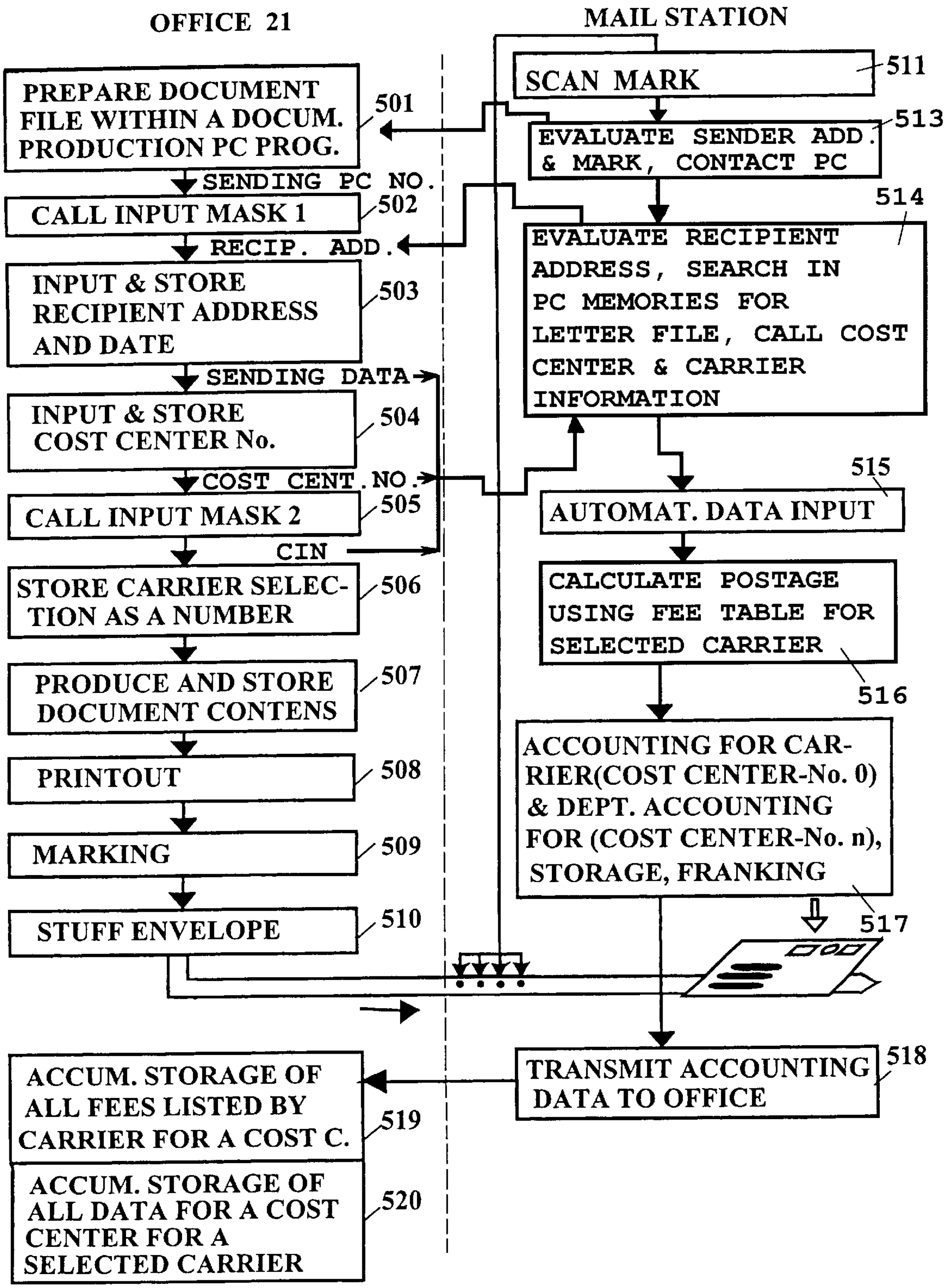
FIG. 13 is a flowchart for a method for operating a mail processing system employing a third embodiment of the inventive postage meter machine.

In a version with internal postage calculation in the postage meter machine FM shown in FIG. 13, the following steps are alternatively provided for a method for data processing in a mail shipping system.

In a first step 201, detection of a piece of mail in the transport path to the postage meter machine FM takes place (step 511) with scanning of the return address as well as of the letter recipient address and/or of the mark for the return address, given a piece of mail supplied to the sensor 16 in the transport path to the print head 1 of the postage meter machine FM. Interrogation of the personal computer in the office via a communication means by the postage meter machine FM for the return address and/or for determining the personal computer responsible for storing the letter file on the basis of the return address takes place in step 513.

Interrogation of the letter file in the identified personal computer via the communication means by the postage meter machine FM ensues in step 514 for an allocation of data about mail shipping or about accounting stored for (allocated to) the aforementioned letter recipient address. As a result of this interrogation, an information with respect to the carrier and the cost center is automatically entered into the postage meter machine FM in the step 515. At least non-volatilely stored setting data are called (retrieved) for an automatic print data entry into the postage meter machine.

A processing routine in the postage meter machine FM is executed in the second step 209, including at least one routine a flowing for automatic modification of non-volatilely stored setting data, for internal calculation of the postage value in the postage meter machine using the current postage table of the selected carrier (in a step 516). In this routine as well, request data for the reloading of selected carrier data and/or current carrier fee schedules of the selected carrier takes place if necessary. Also in this routine, a carrier-specific print format as a result of the selection of a predetermined mail carrier number (CIN) is called, this being used for an automatic print data input and also being available for inspection and for display, by automatic or manual input. This routine also contains sub-routine for the allocation of a cost center number to a slogan number for the automatic input into the postage meter machine FM of the slogan number given input of its allocated cost center number.

The data are processed in the franking mode with a cost center-specific and carrier-specific accounting being conducted before the franking.

Figure 14:
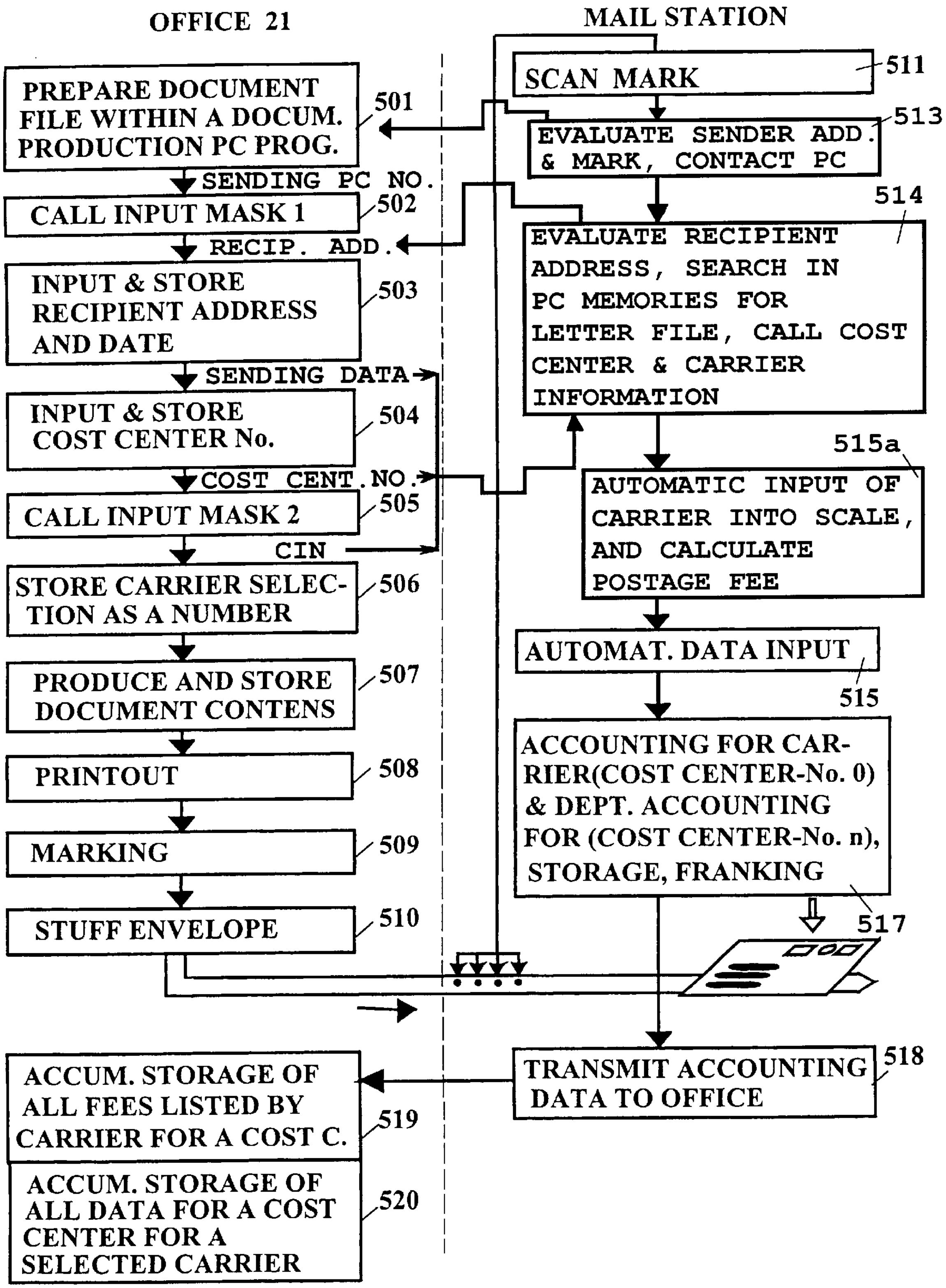
FIG. 14 is a flowchart for a method for operating a mail processing system employing a fourth embodiment of the inventive postage meter machine, with an external scale in which the postage calculation is conducted.

Another version, with external postage calculation, of the inventive method for data processing in a mail shipping system is shown in FIG. 14. The method for data processing in a mail shipping system includes preparatory steps that are implemented on a personal computer in the office 21 for editing and for printing out a letter together with an address field and mark, and steps for the external postage value calculation and steps that execute when scanning the mark in a mail station and when processing the data, as well as when franking with the postage meter machine FM. The following steps are conducted in this version.

In a first step 201, detection of a piece of mail in the transport path to the postage meter machine FM with scanning (step 511) of the return address as well as of the letter recipient address and/or of the corresponding mark for the return address, given a piece of mail supplied to the sensor 16 in the transport path to the print head 1 of the postage meter machine FM. Interrogation of the personal computer in the office via a communication means by the postage meter machine FM ensues in step 513 for the return address and/or for determining the personal computer responsible for storing of the letter file on the basis of the return address. Interrogation of the letter file in the identified personal computer via the communication means by the postage meter machine FM then ensues for an allocation of data about mail shipping or about accounting stored for the aforementioned letter recipient address. The data located in this manner are interpreted in step 514. In a step 515*a* preceding the external postage value calculation, the mail carrier number (CIN) is automatically entered into the scale 22', and as a result of the interrogation, information with respect to the carrier and the cost center as well as the postage value externally calculated in the scale 22' is automatically entered into the postage meter machine FM in the step 515. At least non-volatilely stored setting data are called for an automatic print data input in the postage meter machine FM.

A processing routine is executed in the postage meter machine FM in the second step 209, including at least one routine allowing for automatic modification of non-volatilely stored setting data, for the formation of request data for the reloading of selected carrier data and/or current carrier fee schedules of the selected carrier, for generating carrier-specific print formats as a result of the selection of a predetermined mail carrier number (CIN), for automatic print data input and inspection as well as for display, for automatic or manual input. This routine may contain a sub-routine for the allocation of a cost center number to a slogan number for the automatic entry of the slogan number given entry of the cost center number.

The data are process ed in the franking mode in the postage meter machine FM with a cost center-specific and a carrier-specific accounting being conducted before the franking.

A prerequisite is the printing of the mark on the letter in the address field or on the envelope in preparatory steps using the personal computer. Following a first preparatory step 501 for creating a letter file in the framework of a letter production program, further preparatory steps 502 through 507 sequence, and an allocation of the data of the printable letter required for the marking to the aforementioned address is fetchably stored in the personal computer.

The scanning of the return address as well as of the letter recipient address and/or of the corresponding mark for the return address is implemented with a single scanner 26 or with multiple scanners (schematically represented in FIGS. 11, 12, 13 and 14) that are connected in common with the letter sensor 16 to the register unit 19. At least one of the additional scanners is arranged such in the mail delivery path so that marks on different formats of postal matter can be scanned.

As a result of the interrogation, information about the print format can additionally be automatically entered into the postage meter machine by the personal computer in step 515. This information can include image data for a sub-image in order to generates a complete print format in the postage meter machine. The image data of the other sub-images are non-volatilely stored in the postage meter machine and are called in the course of the automatic print data input.

Although modifications and changes may be suggested by those skilled in the art, it is the intention of the inventor to embody within the patent warranted hereon all changes and modifications as reasonably and properly come within the scope of his contribution to the art.

We claim as our invention:

1. A method for data processing in a mail shipping system, said mail shipping system handling pieces of mail each having a recipient address field printed thereon comprising at least one of alphanumeric characters and each piece of mail having mail contents, said method comprising the steps of:

arranging at least one personal computer remote from a postage meter machine and providing communication means for bi-directional communication between said personal computer and said postage meter machine, said postage meter machine having a transport path leading to said postage meter machine via which said pieces of mail are transported to said postage meter machine, and said personal computer having a memory therein;

storing the respective mail contents of said pieces of mail in said memory of said personal computer in respective data files, with each mail contents being stored allocated to a selected carrier, among a plurality of carriers, for shipping that piece of mail;

detecting each piece of mail in said transport path including reading the recipient address field on each piece of mail, and for each detected piece of mail, executing an office computer communication routine in said postage meter machine between said postage meter machine and said personal computer via said communication means, including searching said memory of said personal computer, based on the recipient address field of the detected piece of mail, for locating the data file containing the mail contents of said detected piece of mail and for interrogating the data file containing the mail contents of said detected piece of mail to identify the selected carrier for said detected piece of mail, and supplying information identifying said selected carrier from said personal computer to said postage meter machine via said communication means and automatically entering said information identifying said selected carrier into said postage meter machine;

retrieving setting data non-volatilely stored in said postage meter machine for use in producing a franking imprint;

conducting a processing routine in said postage meter machine allowing for modification of said setting data for generating a carrier-specific print format, for said selected carrier, for said franking imprint; and conducting a carrier-specific accounting for a shipping cost for shipping said detected piece of mail using said selected carrier, and printing said franking imprint on said detected piece of mail at said postage meter machine with said carrier-specific print format for said selected carrier, including display of setting data at said postage meter machine.

2. A method as claimed in claim 1 comprising the additional steps of:

calling one of said settings for one of said carriers when no document is detected in said transport path, said setting for said one of said carriers comprising old data; and identifying said address and mark on said document by scanning said document in said transport path and overwriting said old data with new data comprising the print format for the carrier located by said searching.

3. A method as claimed in claim 1 wherein said mail shipping system includes a scanner, a chip card reader and a scale, each of which can communicate with said postage meter machine, and said method comprising the steps of executing a scanner communication routine, a chip card communication routine and a scale communication routine in said postage meter machine, in addition to send office computer communication mode, to determine which of said scanner, said chip card reader and said scale will interface with said postage meter machine.

4. A method as claimed in claim 1 wherein the step of producing said address field on said piece of mail comprises printing said address field on said piece of mail using said personal computer remote from said postage meter machine.

5. A method as claimed in claim 4 wherein the step of printing said address field using said personal computer comprises printing said address field and said mark on a sticker adhesively attachable to said piece of mail.

6. A method as claimed in claim 4 wherein the step of printing said address field and said mark using said personal computer comprises printing said address field on a preprinted letter envelope comprising said piece of mail.

7. A method as claimed in claim 1 comprising the additional steps of:

dependent on the carrier allocated in said mail contents, calculating a postage fee for shipping said piece of mail using said carrier allocated to said mail contents; and if necessary, modifying the setting data for said carrier allocated to said mail contents for producing said print format.

8. A method as claimed in claim 1 wherein said mail shipping system is used by a plurality of independent cost centers, and said method comprising the additional steps of:

storing data identifying each cost center in said postage meter machine;

identifying a cost center which produced said piece of mail;

in said accounting, debiting an account of said cost center, accessible by said postage meter machine, which produced said piece of mail by said cost of mailing; and allowing for modification of said cost center data in said postage meter machine upon a change relating to one of said cost centers.

9. A method as claimed in claim 1 comprising the additional step of checking data in said print format for said carrier allocated to said mail contents with an encoded check sum when said setting data for print format for the carrier allocated to said mail contents are called in said postage meter machine.

10. A method as claimed in claim 1 wherein said mail shipping system is used with a data center remote from said mail shipping system, and said method comprising the additional steps of:

if sufficient data are not available in said postage meter machine for generating said print format for said carrier allocated to said mail contents, forming a data request to said remote data center for data needed to complete generation of said print format;

establishing a communication between said postage meter machine and said remote data center and transmitting said data request from said postage meter machine to said remote data center; and transmitting said data needed to complete said print format from said remote data center to said postage meter machine, and generating said print format using said data needed to complete said print format in said postage meter machine.

11. A method as claimed in claim 10 wherein said print format includes frame data and pixel data, and wherein the step of generating said print format using said data transmitted from said remote data center to complete said print format comprises modifying at least one of said frame data and said pixel data.

12. A method as claimed in claim 1 wherein said mail shipping system is used by a plurality of independent cost centers, said method comprising the additional steps of:

respectively allocating a cliché number to each cost center;

respectively allocating a cost center number to each cost center;

providing an input unit in communication with said postage meter machine by which a cost center number can be entered into said postage meter machine; and entering a cost center number into said postage meter machine via said input unit and automatically, in said postage meter machine, entering the cliché number associated with the entered cost center number.

13. A method as claimed in claim 12 wherein each cost center has a name associated therewith, and said method comprising the additional step of allowing, via said input unit, for modification of a name of a cost center allocated to a cost center number.

14. A method as claimed in claim 1 wherein each of said carriers has a name associated therewith, and said method comprising the additional steps of:

providing an input unit in communication with said postage meter machine; and allowing for modification of a name of a carrier via said input unit.

15. A method as claimed in claim 1 comprising the additional steps of:

respectively allocating a carrier identification number to each carrier;

non-volatilely storing each carrier identification number in said postage meter machine;

in said office computer communication routine, supplying the carrier identification number as said information identifying the selected carrier, of the selected carrier allocation to the mail contents of said detected piece of mail from said personal computer to said postage meter machine, and entering said carrier identification number into said postage meter machine and thereby causing, in said postage meter machine, selection of the print format associated with the carrier corresponding to the entered carrier identification number; and allowing for modification of said carrier identification number and the carrier-specific print format corresponding to the carrier to which said carrier identification number is respectively allocated.

16. A method as claimed in claim 1 wherein said mail shipping system is used by a plurality of independent cost centers, and said method comprising the additional steps of:

respectively allocating a cost center number to each cost center;

providing an input unit in communication with said postage meter machine via which a selected cost center number can be entered into said postage meter machine; and upon entry of a cost center number into said postage meter machine via said input unit, displaying at said postage meter machine all shipping costs respectively associated with each carrier used by said cost center.

17. A method as claimed in claim 1 wherein said mail shipping system is used by a plurality of independent cost centers, and said method comprising the additional steps of:

respectively allocating a cost center number to each cost center;

providing an input unit in communication with said postage meter machine via which a selected cost center number can be entered into said postage meter machine; and upon entry of a cost center number into said postage meter machine via said input unit, displaying at said postage meter machine a number of mailed documents respectively mailed by each carrier used by said cost center.

18. A method as claimed in claim 1 wherein said mail shipping system is used by a plurality of independent cost centers, said method comprising the additional step of:

storing a matrix in said postage meter machine identifying, for each cost center, a running total of the shipping costs incurred by the cost center for each carrier, and a running total of a number of pieces of mail shipped by the cost center using each carrier.

19. A method as claimed in claim 18 comprising the additional steps of:

printing out said matrix after said accounting for each cost center; and after printing out said matrix, resetting each of the running total of the shipping costs and the running total of the number of shipped pieces of mail, for the cost center which the accounting was conducted, to zero.

20. A method as claimed in claim 19 further comprising periodically conducting an accounting for a cost center and printing out said matrix.

21. A method as claimed in claim 19 comprising conducting an accounting for a cost center and printing said matrix at a freely selectable time.

22. A method as claimed in claim 19 comprising the additional steps of:

for each cost center, storing any financial reloading data; and printing out said financial reloading data for a cost center together with the matrix for that cost center.

23. A method as claimed in claim 19 wherein each cost center has a personal computer and a connected computer printer associated therewith, and comprising the additional step of producing, at the personal computer for a cost center, a request for a printout of said matrix for the cost center associated with the personal computer, and wherein the step of printing out said matrix comprises printing out said matrix at the computer printer associated with the personal computer which produced said request.

24. A method as claimed in claim 19 wherein the step of printing out said matrix comprises printing out said matrix at a printhead of said postage meter machine.

25. A method for data processing in a mail shipping system, said mail shipping system handling pieces of mail each having a recipient address field printed thereon comprising at least one of alphanumeric characters and each piece of mail having mail contents, said method comprising the steps of:

arranging at least one personal computer remote from a postage meter machine and providing communication means for bi-directional communication between said personal computer and said postage meter machine, said postage meter machine having a transport path leading to said postage meter machine via which said pieces of mail are transported to said postage meter machine, and said personal computer having a memory therein;

storing the respective mail contents of said pieces of mail in said memory of said personal computer in respective data files, with each mail contents being stored allocated to a selected cost center, among a plurality of cost centers, for paying for shipping that piece of mail;

detecting each piece of mail in said transport path including reading the recipient address field on each piece of mail, and for each detected piece of mail, executing an office computer communication routine in said postage meter machine between said postage meter machine and said personal computer via said communication means, including searching said memory of said personal computer, based on the recipient address field of the detected piece of mail, for locating the data file containing the mail contents of said detected piece of mail and for interrogating the data file containing the mail contents of said detected piece of mail to identify the selected cost center for said detected piece of mail, and supplying information identifying said selected cost center from said personal computer to said postage meter machine via said communication means and automatically entering said information identifying said selected cost center into said postage meter machine;

retrieving setting data non-volatilely stored in said postage meter machine for use in producing a franking imprint;

conducting a processing routine in said postage meter machine allowing for modification of said setting data; and conducting a cost center-specific accounting for a shipping cost for shipping said detected piece of mail, and printing said franking imprint on said detected piece of mail at said postage meter machine.

26. A method as claimed in claim 25 comprising the additional steps of:

calling one of said settings for one of said cost centers when no piece of mail is detected in said transport path, said setting for said one of said cost centers comprising old data for generating a cost center-specific print format, for said selected cost center, for said franking imprint, including display of setting data at said postage meter machine; and identifying said address field on said piece of mail by scanning said detected piece of mail in said transport path and overwriting said old data with new data comprising the print format for the cost center located by said searching with said carrier-specific print format for said selected carrier.

27. A method as claimed in claim 25 wherein said mail shipping system includes a scanner, a chip card reader and a scale, each of which can communicate with said postage meter machine, and said method comprising the steps of executing a scanner communication routine, a chip card communication routine and a scale communication routine in said postage meter machine, in addition to said office computer communication routine, to determine which of said personal computer, said scanner, said chip card reader and said scale will interface with said postage meter machine.

28. A method as claimed in claim 25 wherein the step of producing said address field on said piece of mail comprises printing said address field on said piece of mail using said personal computer remote from said postage meter machine.

29. A method as claimed in claim 28 wherein the step of printing said address field using said personal computer comprises printing said address field and said mark on a sticker adhesively attachable to said piece of mail.

30. A method as claimed in claim 28 wherein the step of printing said address field using said personal computer comprises printing said address field and said mark on a pre-printed letter envelope comprising said piece of mail.

31. A method as claimed in claim 25 comprising the additional steps of:

storing said mail contents in said data file also allocated to a selected carrier among a plurality of available carriers for shipping said piece of mail;

dependent on the selected carrier allocated to said mail contents, calculating a postage fee for shipping said piece of mail using said selected carrier; and if necessary, modifying the setting data to identify said selected carrier in said print format.

32. A method as claimed in claim 25 comprising the additional step of:

in said accounting, debiting an account of said cost center, accessible by said postage meter machine, allocated to said mail contents, by said cost of shipping said piece of mail.

33. A method as claimed in claim 25 comprising the additional step of checking print data in said print data format for the cost center allocated to said mail contents with an encoded check sum when said setting data for the cost center allocated to said mail contents are retrieved in said postage meter machine.

34. A method as claimed in claim 25 wherein said mail shipping system is used with a data center remote from said mail shipping system, and said method comprising the additional steps of:

if sufficient data are not available in said postage meter machine for generating said print format for said cost center allocated to said mail contents, forming a data request to said remote data center for data needed to complete generation of said print format;

establishing a communication between said postage meter machine and said remote data center and transmitting said data request from said postage meter machine to said remote data center; and transmitting said data needed to complete said print format from said remote data center to said postage meter machine, and generating said print format using said data needed to complete said print format in said postage meter machine.

35. A method as claimed in claim 34 wherein said print format includes frame data and pixel data, and wherein the step of generating said print format using said data transmitted from said remote data center to complete said print format comprises modifying at least one of said frame data and said pixel data.

36. A method as claimed in claim 25 comprising the additional steps of:

respectively allocating a cliché number to each cost center;

providing an input unit in communication with said postage meter machine by which a cost center number can be entered into said postage meter machine; and entering a cost center number into said postage meter machine via said input unit and automatically, in said postage meter machine, entering the cliché number associated with the entered cost center number.

37. A method as claimed in claim 36 wherein each cost center has a name associated therewith, and said method comprising the additional step of allowing, via said input unit, for modification of a name of a cost center allocated to a cost center number.

38. A method as claimed in claim 25 comprising the additional steps of:

respectively allocating a carrier identification number to each cost center;

non-volatilely storing each cost center identification number in said postage meter machine;

in said office computer communication routine, supplying the cost center number, as said information identifying the selected cost center, of the selected cost center allocated to the mail contents of said detected piece of mail from said personal computer to said postage meter machine, and entering a selected cost center identification number via said input unit into said postage meter machine and thereby causing, in said postage meter machine, selection of the print format associated with the cost center corresponding to the entered cost center identification number; and allowing for modification of said cost center identification number and the cost center-specific print format corresponding to the cost center to which said carrier identification number is respectively allocated.

39. A method as claimed in claim 25 wherein each of said carriers has a name associated therewith, and said method comprising the additional step of:

providing an input unit in communication with said postage meter machine; and allowing for modification of a name of a carrier via said input unit.

40. A method as claimed in claim 25 comprising the additional steps of:

providing an input unit in communication with said postage meter machine via which a selected cost center number can be entered into said postage meter machine; and upon entry of a cost center number into said postage meter machine via said input unit, displaying at said postage meter machine all shipping costs respectively associated with each carrier used by said cost center.

41. A method as claimed in claim 40 comprising the additional step of:

allowing for display of all mailing costs for all cost centers, with each shipping cost displayed matched to a cost center number for the cost center which incurred the shipping cost.

42. A method as claimed in claim 25 for shipping via a selected one of a plurality of carriers, said method comprising the additional steps of:

providing an input unit in communication with said postage meter machine via which a selected cost center number can be entered into said postage meter machine; and upon entry of a cost center number into said postage meter machine via said input unit, displaying at said postage meter machine a number of shipped pieces of mail respectively shipped by each carrier used by said cost center.

43. A method as claimed in claim 25 for shipping via a selected one of a plurality of carriers, and said method comprising the additional step of:

storing a matrix in said postage meter machine identifying, for each cost center, a running total of the shipping costs incurred by the cost center for each carrier, and a running total of a number of pieces of mail shipped by the cost center using each carrier.

44. A method as claimed in claim 43 comprising the additional steps of:

printing out said matrix after said accounting for each cost center; and after printing out said matrix, resetting each of the running total of the shipping costs and the running total of the number of shipped pieces of mail, for the cost center which the accounting was conducted, to zero.

45. A method as claimed in claim 44 further comprising periodically conducting an accounting for a cost center and printing out said matrix.

46. A method as claimed in claim 44 comprising conducting an accounting for a cost center and printing said matrix at a freely selectable time.

47. A method as claimed in claim 44 comprising the additional steps of:

for each cost center, storing any financial reloading data; and printing out said financial reloading data for a cost center together with the matrix for that cost center.

48. A method as claimed in claim 44 wherein each cost center has a personal computer and a connected computer printer associated therewith, and comprising the additional step of producing, at the personal computer for a cost center, a request for a printout of said matrix for the cost center associated with the personal computer, and wherein the step of printing out said matrix comprises printing out said matrix at the computer printer associated with the personal computer which produced said request.

49. A method as claimed in claim 44 wherein the step of printing out said matrix comprises printing out said matrix at a printhead of said postage meter machine.

50. A method for data processing in a mail shipping system, said mail shipping system handling pieces of mail each having a recipient address field printed thereon comprising at least one of alphanumeric characters and each piece of mail having mail contents, said method comprising the steps of:

arranging at least one personal computer remote from a postage meter machine and providing communication means for bi-directional communication between said personal computer and said postage meter machine, said postage meter machine having a transport path leading to said postage meter machine via which said pieces of mail are transported to said postage meter machine, and said personal computer having a memory therein;

storing the respective mail contents of said pieces of mail in said memory of said personal computer in respective data files, with each mail contents being stored allocated to a selected carrier, among a plurality of carriers, for shipping that piece of mail and allocated to a selected cost center, among a plurality of cost centers, for paying for shipping said piece of mail;

detecting each piece of mail in said transport path including reading the recipient address field on each piece of mail, and for each detected piece of mail, executing an office computer communication routine in said postage meter machine between said postage meter machine and said personal computer via said communication means, including searching said memory of said personal computer, based on the recipient address field of the detected piece of mail, for locating the data file containing the mail contents of said detected piece of mail and for interrogating the data file containing the mail contents of said detected piece of mail to identify the selected carrier and the selected cost center for said detected piece of mail, and supplying information identifying the selected carrier and the selected cost center from said personal computer to said postage meter machine via said communication means and automatically entering said information identifying the selected carrier and the selected cost center into said postage meter machine;

retrieving setting data non-volatilely stored in said postage meter machine for use in producing a franking imprint;

conducting a processing routine in said postage meter machine allowing for modification of said setting data for generating a carrier-specific print format for said franking imprint for said selected carrier and said selected cost center, for said franking imprint; and conducting a carrier-specific and cost center-specific accounting for a shipping cost for shipping said piece of mail using said selected carrier printing said franking imprint on said detected piece of mail with said carrier specific print format for said selected carrier and said selected cost center.

51. A method as claimed in claim 49 comprising the additional steps of:

calling one of said settings when no document is detected in said transport path, said one of said settings comprising old data, including display of setting data at said postage meter machine; and identifying said address field said piece of mail by scanning said piece of mail in said transport path and overwriting said old data with new data comprising the print format for the carrier and cost center located by said searching.

52. A method as claimed in claim 50 wherein said mail processing system includes a scanner, a chip card reader and a scale, each of which can communicate with said postage meter machine, and said method comprising the steps of executing a scanner communication routine, a chip card communication routine and a scale communication routine in said postage meter machine, in addition to said office computer communication routine, to determine which of said personal computer, said scanner, said chip card reader and said scale will interface with said postage meter machine.

53. A method as claimed in claim 50 wherein the step of producing said address field on said piece of mail comprises printing said address field and said mark on said document using said personal computer remote from said postage meter machine.

54. A method as claimed in claim 53 wherein the step of printing said address field using said personal computer comprises printing said address field and said mark on a sticker adhesively attachable to said piece of mail.

55. A method as claimed in claim 53 wherein the step of printing said address field using said personal computer comprises printing said address field and said mark on a pre-printed letter envelope comprising said piece of mail.

56. A method as claimed in claim 50 comprising the additional steps of:

dependent on the carrier allocated to said mail contents, calculating a postage fee for shipping said piece of mail using said carrier allocated to said mail contents; and if necessary, modifying the setting data for said carrier allocated to said mail contents for producing said print format.

57. A method as claimed in claim 50 comprising the additional step of:

in said accounting, debiting an account of said cost center allocated to said mail contents, accessible by said postage meter machine, by said cost of shipping.

58. A method as claimed in claim 50 comprising the additional step of checking print data in said print format for said carrier and cost center allocated to said mail contents with an encoded check sum when said setting data for said print format data are retrieved in said postage meter machine.

59. A method as claimed in claim 50 wherein said mail processing system is used with a data center remote from said mail processing system, and said method comprising the additional steps of:

if sufficient data are not available in said postage meter machine for generating said print format for said carrier and cost center allocated to said mail contents, forming a data request to said remote data center for data needed to complete generation of said print format;

establishing a communication between said postage meter machine and said remote data center and transmitting said data request from said postage meter machine to said remote data center; and transmitting said data needed to complete said print format from said remote data center to said postage meter machine, and generating said print format using said data needed to complete said print format in said postage meter machine.

60. A method as claimed in claim 59 wherein said print format includes frame data and pixel data, and wherein the step of formulating said print format using said data transmitted from said remote data center to complete said print format comprises modifying at least one of said frame data and said pixel data.

61. A method as claimed in claim 50 comprising the additional steps of:

respectively allocating a cliché number to each cost center;

providing an input unit in communication with said postage meter machine by which a cost center number can be entered into said postage meter machine; and entering a cost center number into said postage meter machine via said input unit and automatically, in said postage meter machine, entering the cliché number associated with the entered cost center number.

62. A method as claimed in claim 61 wherein each cost center has a name associated therewith, and said method comprising the additional step of allowing, via said input unit, for modification of a name of a cost center allocated to a cost center number.

63. A method as claimed in claim 61 wherein each of said carriers has a name associated therewith, and said method comprising the additional steps of:

providing an input unit in communication with said postage meter machine; and allowing for modification of a name of a carrier via said input unit.

64. A method as claimed in claim 50 comprising the additional steps of:

respectively allocating a carrier identification number to each carrier and a cost center identification number to each cost center;

non-volatilely storing each carrier identification number and each cost center identification number in said postage meter machine;

in said office computer communication routine, supplying the carrier identification number, as said information identifying the selected carrier, and the cost center identification number as the information identifying the selected cost center, of the selected carrier and the selected cost center allocated to the mail contents of said detected piece of mail from said personal computer to said postage meter machine, and entering said selected carrier identification number and said selected cost center identification number into said postage meter machine and thereby causing, in said postage meter machine, selection of the print format associated with the carrier and the cost center respectively corresponding to the entered carrier identification number and cost center identification number; and allowing for modification of said carrier identification number and the carrier-specific print format corresponding to the carrier to which said carrier identification number is respectively allocated, and allowing for modification of the cost center identification number and the cost center-specific print format corresponding to the cost center to which said cost center identification number is respectively allocated.

65. A method as claimed in claim 50 comprising the additional steps of:

providing an input unit in communication with said postage meter machine via which a selected cost center number can be entered into said postage meter machine; and upon entry of a cost center number into said postage meter machine via said input unit, displaying at said postage meter machine all shipping costs respectively associated with each carrier used by said cost center.

66. A method as claimed in claim 50 comprising the additional steps of:

providing an input unit in communication with said postage meter machine via which a selected cost center number can be entered into said postage meter machine; and upon entry of a cost center number into said postage meter machine via said input unit, displaying at said postage meter machine a number of shipped pieces of mail respectively shipped by each carrier used by said cost center.

67. A method as claimed in claim 50 comprising the additional steps of:

storing a matrix in said postage meter machine identifying, for each cost center, a running total of the mailing costs incurred by the cost center for each carrier, and a running total of a number of pieces of mail shipped by the cost center using each carrier.

68. A method as claimed in claim 67 comprising the additional steps of:

printing out said matrix after said accounting for each cost center; and after printing out said matrix, resetting each of the running total of the shipping costs and the running total of the number of shipped pieces of mail, for the cost center which the accounting was conducted, to zero.

69. A method as claimed in claim 68 further comprising periodically conducting an accounting for a cost center and printing out said matrix.

70. A method as claimed in claim 68 comprising conducting an accounting for a cost center and printing said matrix at a freely selectable time.

71. A method as claimed in claim 68 comprising the additional steps of:

for each cost center, storing any financial reloading data; and printing out said financial reloading data for a cost center together with the matrix for that cost center.

72. A method as claimed in claim 68 wherein each cost center has a personal computer and a connected computer printer associated therewith, and comprising the additional step of producing, at the personal computer for a cost center, a request for a printout of said matrix for the cost center associated with the personal computer, and wherein the step of printing out said matrix comprises printing out said matrix at the computer printer associated with the personal computer which produced said request.

73. A method as claimed in claim 68 wherein the step of printing out said matrix comprises printing out said matrix at a printhead of said postage meter machine.

74. A method for data processing in a mail shipping system, said mail shipping system handling pieces of mail each having a recipient address field printed thereon comprising at least one of alphanumeric characters and each piece of mail having mail contents, said method comprising the steps of:

arranging at least one personal computer remote from a postage meter machine and providing communication means for bi-directional communication between said personal computer and said postage meter machine, said postage meter machine having a transport path leading to said postage meter machine via which said pieces of mail are transported to said postage meter machine, and said personal computer having a memory therein;

storing the respective mail contents of said pieces of mail in said memory of said personal computer in respective data files, with each mail contents being stored allocated to instructional data providing instructions for at least one of shipping that piece of mail and for conducting an accounting for charging a cost for shipping that piece of mail;

detecting each piece of mail in said transport path including reading the recipient address field on each piece of mail, and for each detected piece of mail, executing an office computer communication routine in said postage meter machine between said postage meter machine and said personal computer via said communication means, including searching said memory of said personal computer, based on the recipient address field of the detected piece of mail, for locating the data file for locating the data file containing the mail contents of said detected piece of mail and for interrogating the data file containing the mail contents of said detected piece of mail to identify the instructional data allocated to mail contents of the detected piece of mail, and supply said instructional data from said personal computer to said postage meter machine via said communication means and automatically entering the instructional data into said postage meter machine into said postage meter machine;

retrieving setting data non-volatilely stored in said postage meter machine for use in producing a franking imprint;

conducting a processing routine in said postage meter machine allowing for modification of said setting data for generating a print format dependent on said instructional data; and conducting an accounting for a charge for shipping said piece of mail and printing said franking imprint on said piece of mail dependent on said instructional data.

75. A method as claimed in claim 74 comprising the additional steps of:

calling one of said settings when no document is detected in said transport path, said one of settings comprising old data; and identifying said address and mark on said document by scanning said document in said transport path and overwriting said old data with new data comprising the print format dependent on the instructional data located by said searching, including display of said setting data at said postage meter machine.

76. A method as claimed in claim 74 wherein said mail shipping system includes a scanner, a chip card reader and a scale, each of which can communicate with said postage meter machine, and said method comprising the steps of executing a scanner communication routine, a chip card communication routine and a scale communication routine in said postage meter machine, in addition to said office computer communication routine, to determine which of said personal computer, said scanner, said chip card reader and said scale will interface with said postage meter machine.

77. A method as claimed in claim 74 wherein the step of producing said address field on said piece of mail comprises printing said address field on said piece of mail using said personal computer remote from said postage meter machine.

78. A method as claimed in claim 77 wherein the step of printing said address field using said personal computer comprises printing said address field and said mark on a sticker adhesively attachable to said piece of mail.

79. A method as claimed in claim 77 wherein the step of printing said address field using said personal computer comprises printing said address field and said mark on a pre-printed letter envelope comprising said piece of mail.

80. A method as claimed in claim 74 comprising the additional steps of:

dependent on the carrier identified in said instructional data allocated to said mail contents, calculating a postage fee for mailing said piece of mail using said carrier instructional data allocated to said mail contents; and if necessary, modifying the setting data for said carrier identified in said address field and mark for producing said print format.

81. A method as claimed in claim 74 comprising the additional step of:

in said accounting, debiting an account of a cost center instructional data allocated to said mail contents, accessible by said postage meter machine, by said cost of shipping.

82. A method as claimed in claim 74 comprising the additional step of checking data in said print format for a carrier and a cost center instructional data allocated to said mail contents with an encoded check sum when said setting data for said print format are retrieved in said postage meter machine.

83. A method as claimed in claim 74 wherein said mail shipping system is used with a data center remote from said mail shipping system, and said method comprising the additional steps of:

if sufficient data are not available in said postage meter machine for generating said print format for said instructional data allocated to said mail contents, forming a data request to said remote data center for data needed to complete generation of said print format;

establishing a communication between said postage meter machine and said remote data center and transmitting said data request from said postage meter machine to said remote data center; and transmitting said data needed to complete said print format from said remote data center to said postage meter machine, and generating said print format using said data needed to complete said print format in said postage meter machine.

84. A method as claimed in claim 83 wherein said print format includes frame data and pixel data, and wherein the step of generating said print format using said data transmitted from said remote data center to complete said print format comprises modifying at least one of said frame data and said pixel data.

85. A method as claimed in claim 74 wherein said mail shipping system is used with a personal computer remote from said mail shipping system, and said method comprising the additional steps of:

if sufficient data are not available in said postage meter machine for generating said print format for said instructional data allocated to said mail contents, forming a data request to said remote personal computer for data needed to complete generation of said print format;

establishing a communication between said postage meter machine and said remote personal computer and transmitting said data request from said postage meter machine to said remote personal computer; and transmitting said data needed to complete said print format from said remote personal computer to said postage meter machine, and generating said print format using said data needed to complete said print format in said postage meter machine.

86. A method as claimed in claim 85 wherein said print format includes frame data and pixel data, and wherein the step of generating said print format using said data transmitted from said remote personal computer to complete said print format comprises modifying at least one of said frame data and said pixel data.

87. A method for processing data in a mail shipping system having a postage meter machine, said method comprising the steps of:

(a) creating a document file in a memory of a personal computer within the framework of a document producing program executed in said personal computer;

(b) calling a first input mask in said personal computer;

(c) entering and storing in said document file an address of a recipient of said document and a date of said document using said first input mask;

(d) calling a second input mask in said personal computer;

(e) selecting instructional data from said second input mask including at least one of shipping instructions and accounting instructions, and storing said instructional information in said document file;

(f) producing said document using said personal computer, said document having document contents, and storing said document contents in said document file allocated to said instructional information and said address of said recipient for allowing searching of said memory of said personal computer by said postage meter machine based on said address of said recipient to locate said instructional data;

(g) printing out said document and providing said document with an envelope and printing said address of said recipient on at least one of said document and said envelope; and (h) inserting said document into said envelope.

88. A method as claimed in claim 87 wherein mailing of said document is regulated by a postal authority, and said method comprising the additional steps of:

loading a program into said personal computer for automatically positioning said address and said mark on at least one of said letter and said envelope in accordance with regulations established by said postal authority; and automatically printing said address of said recipient on at least one of said letter and said envelope and printing said mark on at least one of said letter and said envelope in accordance with said postal regulations in said personal computer.

89. A method as claimed in claim 87 comprising the additional step of printing a mark identifying said recipient, in addition to said address of said recipient, on at least one of said document and said envelope.

90. A method as claimed in claim 89 wherein the step of printing a mark comprises printing said mark on at least one of said letter and said envelope using a further printer, connected to said personal computer, separate from said printer used in step (g) for printing said document.

91. A method as claimed in claim 89 wherein said envelope comprises a window envelope, wherein step (g) comprises printing said address of said recipient only on said document, wherein the step of printing a mark comprises printing said mark only on said document, and wherein step (h) comprises inserting said document into said window envelope with said address of said recipient and said mark visible through said window envelope.

92. A method as claimed in claim 89 comprising the additional steps of:

scanning at least one of said address and said mark at said postage meter machine;

establishing a communication between said postage meter machine and said personal computer;

searching said memory of said personal computer by said postage meter machine and thereby locating said instructional data and entering said instructional data into the postage meter machine;

franking said document at said postage meter machine according to said instructional data, and thereby incurring a fee;

transmitting said fee from said postage meter machine to said personal computer; and maintaining a running total of all fees for all carriers in said personal computer for documents produced using said personal computer.

93. A method as claimed in claim 92 wherein the step of maintaining a running total comprises maintaining a running total, separated according to said instructional data, for fees for all documents produced at said personal computer.

94. A method as claimed in claim 92 comprising the additional steps of:

maintaining a running total in said postage meter machine for all fees separated according to said instructional data; and upon a request from said personal computer, making the running total available to the personal computer.

95. A method as claimed in claim 87 wherein said mail shipping system is used by a plurality of independent cost centers, said personal computer and said printer being located at one of said cost centers, and said method comprising the additional steps of:

respectively allocating said cost center numbers to said cost centers; and automatically entering and storing a cost center number allocated to the cost center at which said personal computer and said printer are located into said personal computer using said first input mask, after step (b).

96. A method for data processing a mail shipping system used by a plurality of independent cost centers, each cost center having an advertising cliché associated therewith, said method comprising the steps of:

respectively allocating a cost center identification number to each cost center;

respectively allocating a cliché number to each advertising cliché, and allocating each cliché number to the cost center number having the advertising cliché allocated to the cliché number;

arranging at least one personal computer at a cost center remote from a postage meter machine and providing communication means for bi-directional communication between said personal computer and said postage meter machine, said postage meter machine having a transport path leading to said postage meter machine via which pieces of mail, each having an address field thereon and having mail contents associated therewith, are transported to said postage meter machine, and said personal computer having a memory therein;

storing respective mail contents for a plurality of pieces of mail respectively in data files in said memory of said personal computer, with each memory content being stored allocated to the cost center number for the cost center at which said personal computer is located;

detecting said pieces of mail in said transport path and, upon detection of a detected piece of mail, reading the address thereon and executing an office computer communication mode in said postage meter machine including searching said memory of said personal computer by said postage meter machine via said communication means for locating, based on said address, said one of said data files containing the mail contents for the detected piece of mail and for interrogating said one of said data files to identify the cost center number allocated thereto, and supplying said cost center number to said postage meter machine via said communication means and automatically entering said cost center number into said postage meter machine;

non-volatilely storing in said postage meter machine a plurality of setting data sets respectively for said plurality of advertising clichés, each setting data set being stored allocated respectively to said cliché numbers;

automatically retrieving the setting data set among said plurality of setting data sets having the cliché number allocated to the cost center number entered into said postage meter machine;

conducting a processing routine in said postage meter machine allowing for modification of the retrieved setting data set for generating a print format incorporating the advertising cliché allocated to the entered cost center number for producing a franking imprint, and including display of said setting data set allocated to the cost center number entered into said postage meter machine; and conducting a cost center-specific accounting in said postage meter machine using said cost center number and printing said franking imprint on said detected piece of mail.

97. A method for data processing in a mail shipping system, said mail shipping system handling pieces of mail each having a recipient address field printed thereon comprising at least one of alphanumeric characters and each piece of mail having mail contents, said method comprising the steps of:

arranging at least one personal computer remote from a postage meter machine and providing communication means for bi-directional communication between said personal computer and said postage meter machine, said postage meter machine having a transport path leading to said postage meter machine via which said pieces of mail are transported to said postage meter machine, and said personal computer having a memory therein;

storing the respective mail contents of said pieces of mail in said memory of said personal computer in respective data files, with each mail contents being stored allocated to a selected carrier, among a plurality of carriers, for shipping that piece of mail;

detecting each piece of mail in said transport path including reading the recipient address field on each piece of mail, and for each detected piece of mail, executing an office computer communication routine in said postage meter machine between said postage meter machine and said personal computer via said communication means, including searching said memory of said personal computer, based on the recipient address field of the detected piece of mail, for locating the data file containing the mail contents of said detected piece of mail and for interrogating the data file containing the mail contents of said detected piece of mail to identify the selected carrier for said detected piece of mail, and supplying information identifying said selected carrier from said personal computer to said postage meter machine via said communication means and automatically entering said information identifying said selected carrier into said postage meter machine;

retrieving setting data non-volatilely stored in said postage meter machine for use in producing a franking imprint;

conducting a processing routine in said postage meter machine allowing for modification of said setting data for generating a carrier-specific print format, for said selected carrier, for said franking imprint, including display of setting data at said postage meter machine;

providing a scale externally of said postage meter machine with a data connection between said scale and said postage meter machine;

supplying said scale with said information identifying said selected carrier via said data line;

calculating a shipping cost in said scale for shipping said piece of mail using said selected carrier and supplying a signal identifying said shipping cost to said postage meter machine via said data line; and conducting a carrier-specific accounting for said shipping cost for shipping said piece of mail using said selected carrier, and printing said franking imprint on said piece of mail at said postage meter machine with said carrier-specific print format for said selected carrier.

98. An arrangement for data processing in a mail shipping system comprising:

scale means for weighing a document to be shipped and for emitting a weight signal identifying a weight of said document, said document having address information printed thereon identifying a recipient of said document;

scanner means for scanning said document for identifying the recipient;

means for interrogating a personal computer based on said recipient to identify a carrier, from among a plurality of carriers, for shipping said document;

calculator means for calculating a fee required for shipping said document by said carrier for shipping said document dependent on the weight of said document, said calculator means generating a fee signal identifying said fee; and means for producing a franking imprint on said document embodying said fee and a print format uniquely associated with the carrier to be used for shipping said document.

99. An arrangement as claimed in claim 98 further comprising a postage meter machine containing said means for producing a franking imprint and said means for interrogation, and wherein said scale means is disposed remote from said postage meter machine and said arrangement comprising a data connection between said scale means and said postage meter machine supplying data identifying said carrier for shipping said document to said scale means via said data connection, and wherein said scale means contains said calculation means and supplies said fee signal to said postage meter machine via said data connection.

100. An arrangement as claimed in claim 98 wherein said scanner means comprises means for recognizing different formats of said carrier information.

101. An arrangement as claimed in claim 100 wherein at least one of said formats comprises a format regulated by a postal authority which specifies a position for information within said at least one of said formats, and wherein a personal computer comprises memory means for storing said position for information in said at least one of said formats for printing information on said document according to said at least one of said formats.

102. An arrangement as claimed in claim 98 further comprising a postage meter machine containing said means for producing a franking imprint and means contained in said postage meter machine for processing information scanned by said scanner means.

103. An arrangement as claimed in claim 98 further comprising register means, supplied with a signal from said scanner means, for intermediately storing information scanned by said scanner means and for conducting a parallel-to-serial conversion of said information, said register means being connected to said means for producing a franking imprint.

104. An arrangement as claimed in claim 98 wherein said means for interrogating comprises means for interrogating said personal computer to identify a cost center to be changes said fee, in addition to identifying said carrier, and further comprising means for using said cost information for conducting a cost center-specific accounting for said fee.

105. An arrangement as claimed in claim 98 further comprising a postage meter machine containing said means for producing a franking imprint, and wherein said scale means comprises a scale external to and remote from said postage meter machine, and wherein said scanner means for identifying said recipient information is coupled to said external scale.

106. An arrangement as claimed in claim 98 wherein said scanner means for identifying said recipient information comprises an electronic image interpretation circuit.

* * * * *